(12) United States Patent
Guan et al.

(10) Patent No.: US 11,551,631 B2
(45) Date of Patent: Jan. 10, 2023

(54) DISPLAY PANEL AND DISPLAY DEVICE

(71) Applicant: Xiamen Tianma Microelectronics Co., Ltd., Xiamen (CN)

(72) Inventors: Linyan Guan, Xiamen (CN); Hailiang Wang, Xiamen (CN); Yaying Li, Xiamen (CN); Weipeng Wang, Xiamen (CN); Suxia Xu, Xiamen (CN); Junyi Li, Xiamen (CN)

(73) Assignee: Xiamen Tianma Microelectronics Co., Ltd., Xiamen (CN)

( * ) Notice: Subject to any disclaimer, the term of this patent is extended or adjusted under 35 U.S.C. 154(b) by 0 days.

(21) Appl. No.: 17/680,750

(22) Filed: Feb. 25, 2022

(65) Prior Publication Data

US 2022/0180836 A1 Jun. 9, 2022

(30) Foreign Application Priority Data

Jun. 28, 2021 (CN) .......................... 202110719917.7

(51) Int. Cl.
  *G09G 3/36* (2006.01)
  *G02F 1/133* (2006.01)
  *G02F 1/1362* (2006.01)

(52) U.S. Cl.
  CPC ....... *G09G 3/3696* (2013.01); *G02F 1/13306* (2013.01); *G02F 1/136286* (2013.01); *G09G 2310/0297* (2013.01)

(58) Field of Classification Search
  CPC ............. H04L 63/0263; H04L 63/0236; H04L 41/0816; H04L 43/028; H04L 61/4511; H04L 61/5007; G09G 3/36–3696; G09G 2300/0456–046
  See application file for complete search history.

(56) References Cited

U.S. PATENT DOCUMENTS

| 2007/0097305 | A1* | 5/2007 | Lin | .......................... G02F 1/141 349/141 |
| 2007/0211198 | A1* | 9/2007 | Nagai | ............... G02F 1/133528 349/114 |
| 2009/0059107 | A1* | 3/2009 | Nagai | .................. G09G 3/3648 349/114 |

FOREIGN PATENT DOCUMENTS

| CN | 111708230 A | 9/2020 |
| CN | 112099256 A | 12/2020 |
| CN | 112987360 A | 6/2021 |
| CN | 113009739 A | 6/2021 |

* cited by examiner

*Primary Examiner* — Sanghyu Park
(74) *Attorney, Agent, or Firm* — KDB Firm PLLC

(57) ABSTRACT

A display panel includes a first display region and a second display region. The light transmittance of the first display region is greater than the light transmittance of the second display region. The first display region includes a plurality of first sub-pixels. At least one of the first sub-pixels includes an electrode group. The electrode group includes a first electrode and a second electrode. In the first direction, the orthographic projection of the first electrode at least partially overlaps the orthographic projection of the second electrode. The first direction is parallel to the light-emitting surface of the display panel. In the stage of capturing, the voltage difference between the first electrode and the second electrode is greater than zero volts. The phase of a voltage difference of the first electrode to the second electrode is reversed as a frame is reversed.

20 Claims, 33 Drawing Sheets

DISPLAY PANEL AND DISPLAY DEVICE

CROSS-REFERENCE TO RELATED APPLICATION

This application claims priority to Chinese Patent Application No. 202110719917.7 filed Jun. 28, 2021, the disclosure of which is incorporated herein by reference in its entirety.

TECHNICAL FIELD

The present disclosure relates to the field of display technology and, in particular, to a display panel and a display device.

BACKGROUND

As for a display panel with the function of capturing images, with an aim of increasing the screen-to-body ratio of the panel, a high light-transmitting region is disposed in the display region of the panel and an imaging component is disposed in the high light-transmitting region. For example, when a liquid-crystal display panel captures an image, the liquid-crystal molecules in the high light-transmitting region rotate under the action of the electric field formed by pixel electrodes and common electrodes. The ambient light passes through the liquid-crystal molecules and comes into the imaging component. In this case, the ambient light is collected and thus imaging is implemented.

However, based on the structure of a related liquid-crystal display panel, relatively obvious diffraction is generated after the ambient light comes in, thus having a bad effect on the quality of imaging.

SUMMARY

The present disclosure provides a display panel and a display device to reduce the effect of diffraction on the quality of imaging.

In a first aspect, embodiments of the present disclosure provide a display panel. The display panel includes a first display region and a second display region. The light transmittance of the first display region is greater than the light transmittance of the second display region.

The first display region includes a plurality of first sub-pixels. One of at least part of the first sub-pixels includes an electrode group. The electrode group includes a first electrode and a second electrode. In a first direction, the orthographic projection of the first electrode at least partially overlaps the orthographic projection of the second electrode. The first direction is parallel to the light-emitting surface of the display panel. In the stage of capturing, the voltage difference between the first electrode and the second electrode is greater than zero volts. The phase of a voltage difference of the first electrode to the second electrode is reversed as a frame is reversed.

In a second aspect, embodiments of the present disclosure provide a display device. The display device includes the display panel described in the first aspect.

DETAILED DESCRIPTION

Figure 1:
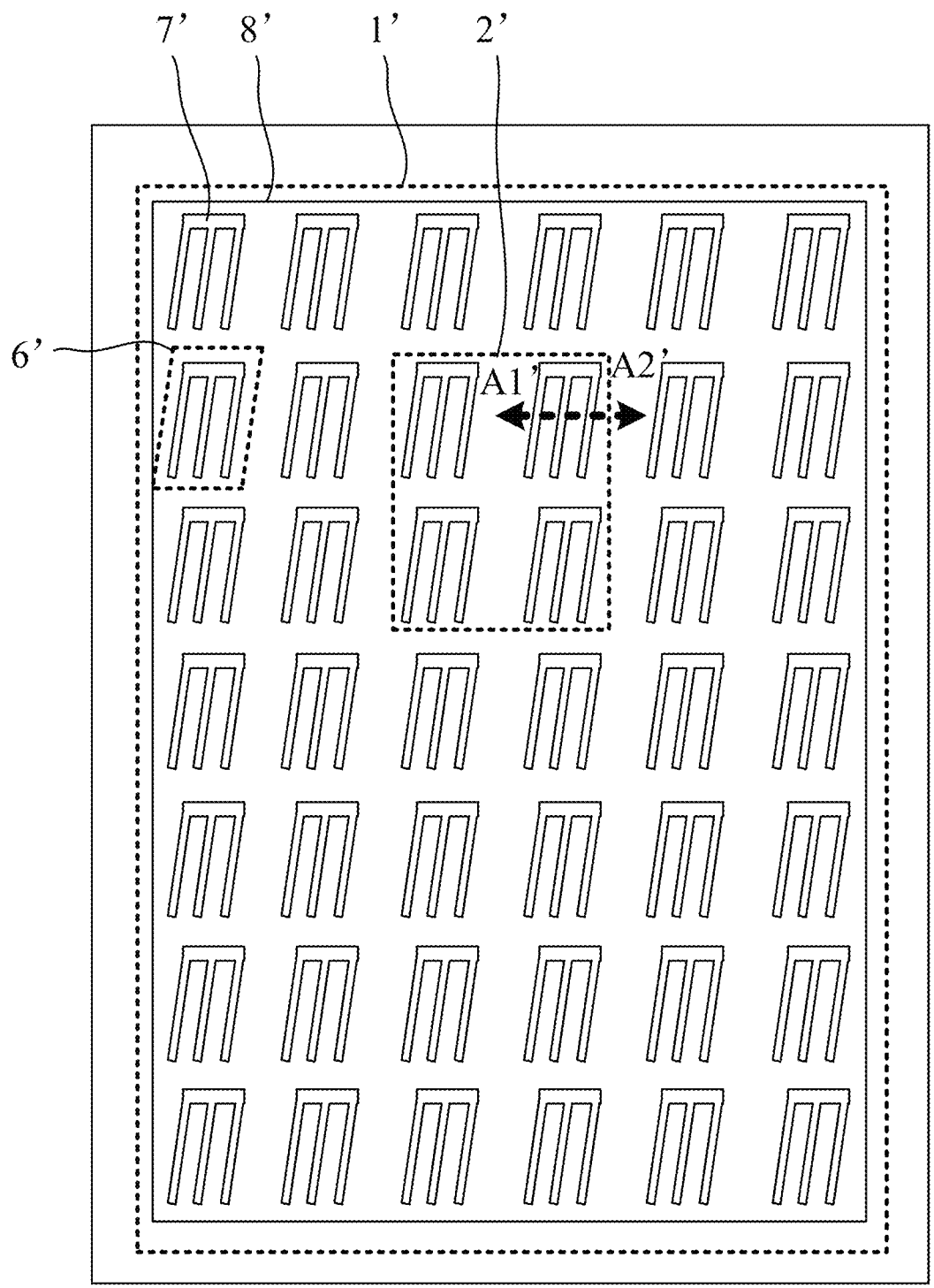
FIG. 1 is a top view of a liquid-crystal display panel in the related art.

The present disclosure is further described hereinafter in detail in conjunction with drawings and embodiments. It is to be understood that the embodiments described herein are merely intended to explain the present disclosure and not to limit the present disclosure. Additionally, it is to be noted that for ease of description, merely part, not all, of the structures related to the present disclosure are illustrated in the drawings.

Figure 2:
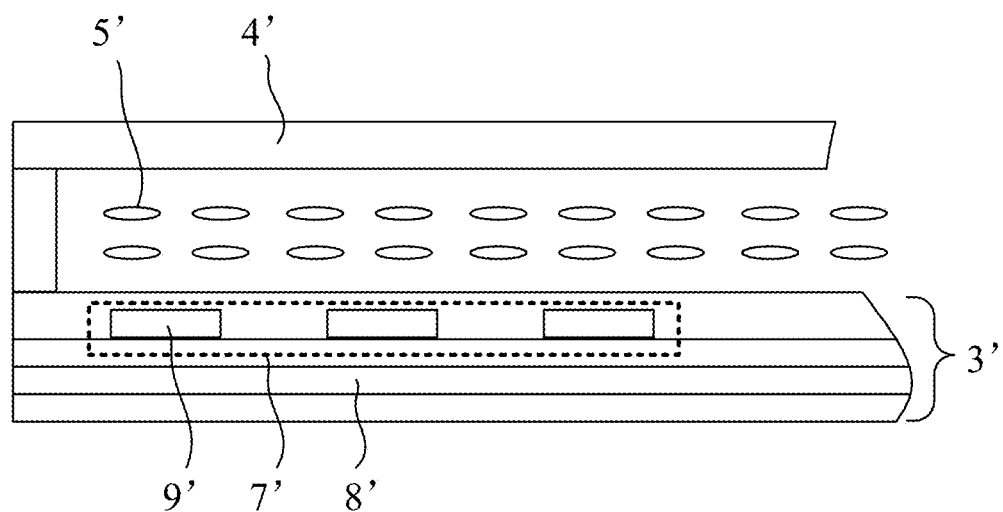
FIG. 2 is a section view taken along direction A1'-A2' of FIG. 1.

As shown in FIGS. 1 and 2, FIG. 1 is a top view of a liquid-crystal display panel in the related art; FIG. 2 is a section view taken along direction A1'-A2' of FIG. 1. A display region 1' of the liquid-crystal display panel includes a high light-transmitting region 2' provided with an imaging component. The liquid-crystal display panel includes an array substrate 3' and a color filter substrate 4' that are disposed opposite to each other. Liquid-crystal molecules 5' are disposed between the array substrate 3' and the color filter substrate 4'. A plurality of pixel units 6' are disposed in the array substrate 3'. A pixel unit 6' includes a pixel electrode 7' and a common electrode 8'.

When the liquid-crystal display panel performs capturing, the pixel electrode 7' in the high light-transmitting region 2' receives a driving voltage; the liquid-crystal molecules 5' rotate under the action of the electric field formed by the pixel electrode 7' and the common electrode 8'; the ambient light passes through the liquid-crystal molecules 5' and comes into the imaging component.

Figure 3:
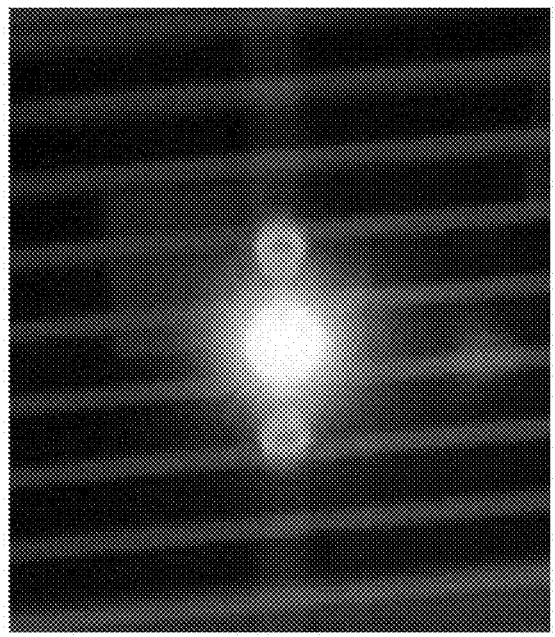
FIG. 3 is a view of diffraction fringes generated when electrodes are not energized in the related art.

Opening regions of original pixel units 6' in the high light-transmitting region 2' are arranged periodically. Even if the electrodes are not energized, the ambient light may generate diffraction after entering the periodical arrangement. Diffraction fringes are shown in FIG. 3. After the electrodes are energized, the liquid-crystal molecules 5' may take on a more densely periodical rotation arrangement. After the ambient light enters the more densely periodical arrangement, diffraction is more obvious.

The fringe-field switching (FFS) mode is taken as an example. In this mode, referring to FIGS. 1 and 2, the pixel electrode 7' and the common electrode 8' overlap each other in the direction perpendicular to the plane in which the display panel is located. The pixel electrode 7' is a comb structure and includes a plurality of electrode bars 9' spaced apart. After the pixel electrode 7' is energized, each electrode bar 9' in the pixel electrode 7' forms electric fields in different directions with common electrodes 8' on both sides. The liquid-crystal molecules 5' rotate in different directions under the action of the electric fields in different directions. Multiple rows of liquid-crystal molecules 5' take on a densely periodical rotation arrangement. When the ambient light enters the densely periodical arrangement of the liquid-crystal molecules 5', the emitted light has a certain phase difference, making the periodical interference more prone to occur in the subsequent transmission process and aggravating diffraction.

Figure 4:
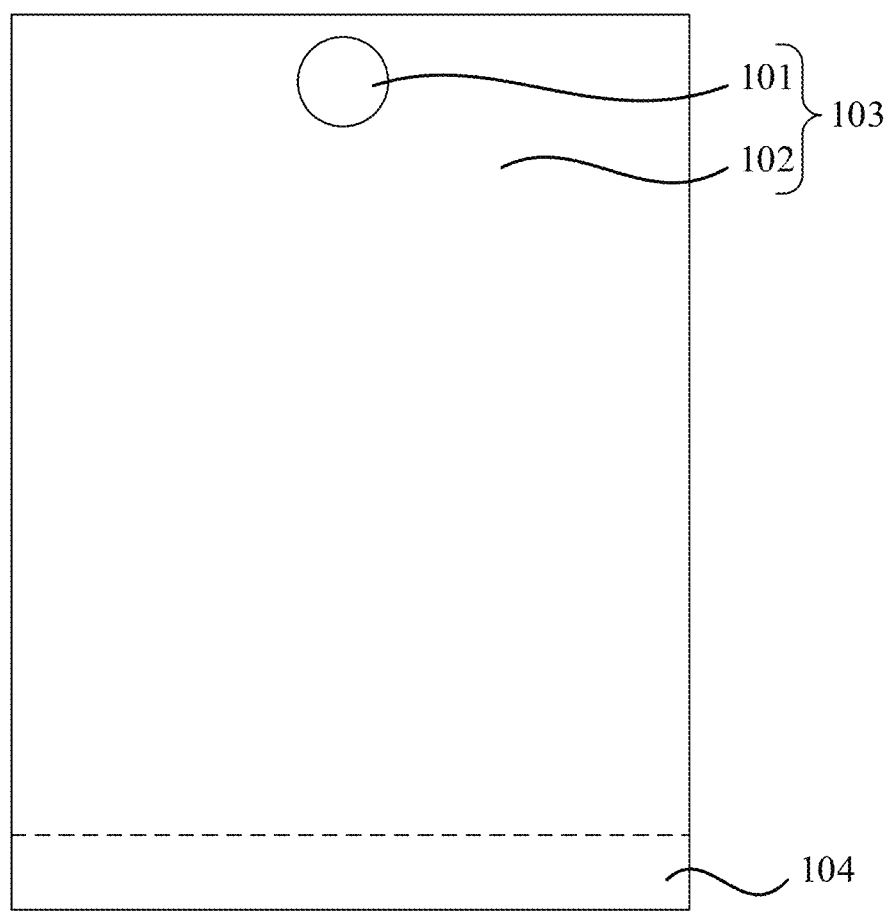
FIG. 4 is a top view of a display panel according to an embodiment of the present disclosure.
Figure 5:
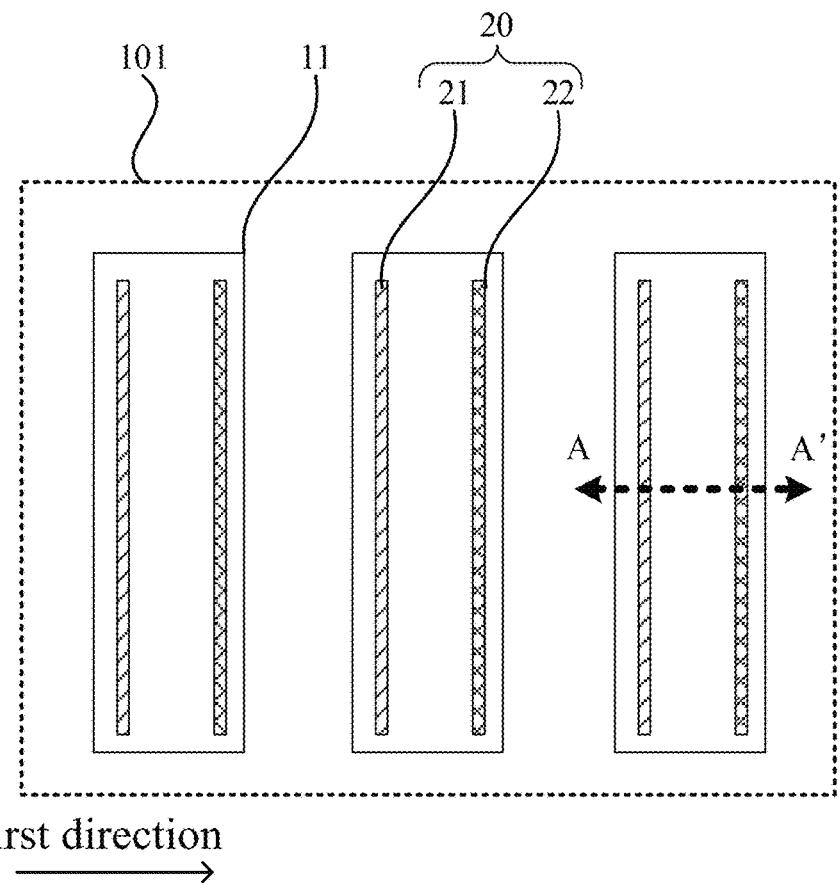
FIG. 5 is a top view illustrating the structure of a first display region of FIG. 4.

FIG. 4 is a top view of a display panel according to an embodiment of the present disclosure. FIG. 5 is a top view illustrating the structure of a first display region of FIG. 4. Referring to FIGS. 4 and 5, the display panel includes a first display region 101 and a second display region 102. The light transmittance of the first display region 101 is greater than the light transmittance of the second display region 102. The first display region 101 is a high light-transmitting region disposed in the display region 103. An imaging component may be disposed in the high light-transmitting region. The first display region 101 includes a plurality of first sub-pixels 11. At least one of the first sub-pixels 11 includes an electrode group 20. The electrode group 20 includes a first electrode 21 and a second electrode 22. In one embodiment, any one of the first sub-pixels 11 includes a first electrode 21 and a second electrode 22. In another embodiment, as for part of the first sub-pixels 11, a first sub-pixel 11 includes at least one of a first electrode 21 or a second electrode 22; as for another part of the first sub-pixels 11, a first sub-pixel 11 is not provided with a first electrode 21 or a second electrode 22. In a first direction, the orthographic projection of the first electrode 21 at least partially overlaps the orthographic projection of the second electrode 22. The first direction is parallel to the light-emitting surface of the display panel. That is, the first direction is parallel to the plane in which the display panel is located. In the stage of capturing, the voltage difference between the first electrode 21 and the second electrode 22 is greater than zero volts. The phase of a voltage difference of the first electrode 21 to the second electrode 22 is reversed as a frame is reversed.

In this embodiment of the present disclosure, in the direction parallel to the plane in which the display panel is located, the projection of the first electrode 21 overlaps the projection of the second electrode 22. That is, the projection of the first electrode overlaps the projection of the second electrode on a plane perpendicular to the plane in which the display panel is located. A horizontal electric field may be formed between the first electrode 21 and the second electrode 22. In this case, the rotation directions of the liquid-crystal molecules between the first electrode 21 and the second electrode 22 are consistent with each other. Accordingly, the arrangement directions of the liquid-crystal molecules rotating along with the direction of the electric field are consistent with each other. This arrangement avoids two angles of liquid-crystal molecules caused by a symmetrically arcuate electric field in the related art and avoids a grating structure formed by the two angles of liquid-crystal molecules. Accordingly, after passing through liquid-crystal molecules with the same angle, the ambient light has the same phase; light waves may not form obvious diffraction fringes after superposition; thus the effect of diffraction fringes on the quality of imaging is effectively mitigated. In this embodiment of the present disclosure, the electric field formed by the first electrode 21 and the second electrode 22 under the action of the voltage difference is a transverse electric field of uniform intensity. The rotation degrees of liquid-crystal molecules at different positions tend to be the same. In this case, the difference in rotation degrees among the liquid-crystal molecules is lessened effectively and the light-transmitting uniformity of the first display region 101 is enhanced. Moreover, under the driving of the transverse electric field, the angles of the liquid-crystal molecules after rotating tend to be the same as the preset rotation angle corresponding to the voltage difference so that the overall light transmittance of the first display region 101 may be further improved. Accordingly, when the first display region 101 performs screen display, the luminance of the first display region 101 and the luminance uniformity of the first display region 101 are enhanced, and the screen display effect is optimized; when the first display region 101 performs capturing, the volume of the ambient light coming through the first display region 101 is increased, and the imaging effect is optimized. Further, in the stage of capturing, the phase of a voltage difference of the first electrode 21 to the second electrode 22 is reversed as a frame is reversed. That is, as an assumption, in one frame, the direction of the electric field is directed from the first electrode 21 to the second electrode 22 in the first direction; in the next frame, the direction of the electric field is directed from the second electrode 22 to the first electrode 21 in the first direction; the direction of the electric field acting on the liquid-crystal molecules is reversed as the frame is reversed, thus avoiding the occurrence of the polarization phenomenon of the liquid-crystal molecules. Accordingly, the liquid crystals are prevented from losing rotation characteristics gradually and affecting the display effect in the stage of screen display. It is to be noted that a first sub-pixel 11 includes an opening region and a non-opening region disposed surrounding the opening region. The position of the preceding first electrode 21 and the position of the preceding second electrode 22 may overlap the opening region, as shown in FIG. 5, or may overlap the non-opening region. When the position of the first electrode 21 and the position of the second electrode 22 overlap the opening region, the first electrode 21 and the second electrode 22 are made of a transparent conductive material. Such arrangement may enable the opening region to maintain high light transmittance and prevent the first electrode 21 and the second electrode 22 from affecting normal light emission in the opening region.

The electric field formed between the first electrode 21 and the second electrode 22 is a horizontal electric field. In this case, a larger opposing surface area of the first electrode 21 and the second electrode 22 indicates a higher intensity of the horizontal electric field formed between the first electrode 21 and the second electrode 22. In this case, the rotation states of liquid-crystal molecules at more positions are consistent with each other and the transmittance of light rays at different positions is closer to each other. Particularly, when the height of the first electrode 21 and the height of the second electrode 22 are equal to the spacing between an array substrate and a color filter substrate, the difference in the transmittance of light rays at the positions between the first electrode 21 and the second electrode 22 is relatively small. Thus the number of ambient light coming from each position tends to be the same. Accordingly, the arrangement in which the height of the first electrode 21 and the height of the second electrode 22 are increased in the direction perpendicular to the plane in which the display panel is located may extend the distribution range of the transverse electric field, fully guarantee that the liquid-crystal molecules rotate under the action of the transverse electric field, and enable the first display region 101 to maintain relatively high light transmittance. In the case where the opposing length is unchanged, a greater height of the first electrode 21 in the light-emitting direction of the display panel and a greater height of the second electrode 22 in the light-emitting direction of the display panel indicate a larger opposing area. The case where the height of the first electrode 21 and the height of the second electrode 22 are relatively great in the direction perpendicular to the plane in which the display panel is located may extend the distribution range of the transverse electric field, fully guarantee that the liquid-crystal molecules rotate under the action of the transverse electric field, and enable the first display region 101 to maintain relatively high light transmittance. The arrangement in which the height of the first electrode 21 and the height of the second electrode 22 are stacked in the direction perpendicular to the plane in which the display panel is located is a means to achieve the preceding technical effect. However, other embodiments may be used for achieving the preceding object. For example, the height of the first electrode 21 and the height of the second electrode 22 are increased by providing auxiliary supports.

Figure 6:
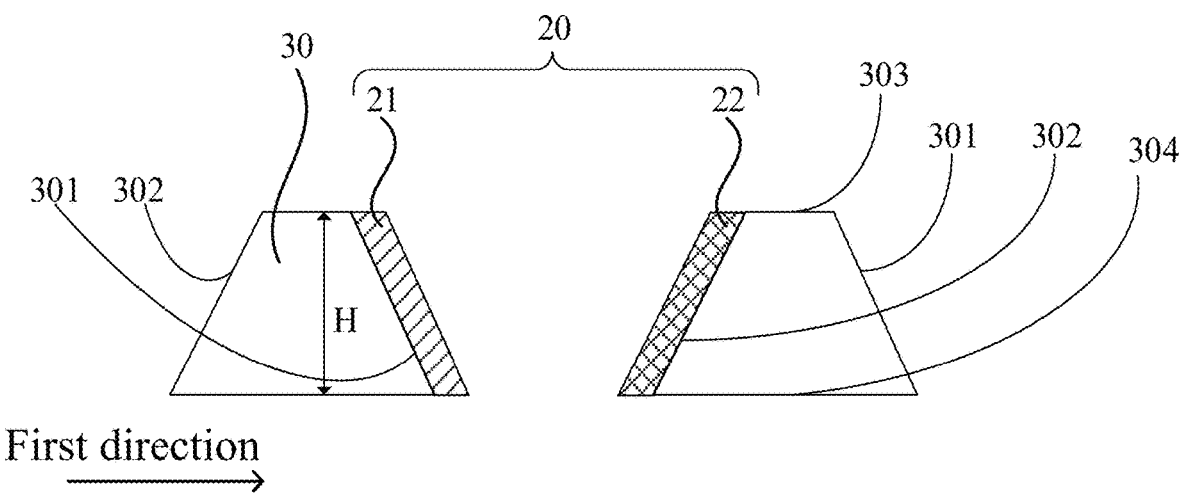
FIG. 6 is a section view taken along AA' of FIG. 5.

FIG. 6 is a section view taken along AA' of FIG. 5. Referring to FIGS. 4 to 6, the display panel further includes a plurality of bosses 30 disposed in the first display region 101. In the first direction, a boss 30 includes a first side surface 301 and a second side surface 302 that are disposed opposite to each other. In the same electrode group 20, the first electrode 21 at least partially covers the first side surface 301, and the second electrode 22 at least partially covers the second side surface 302. In this embodiment of the present disclosure, a plurality of bosses 30 are disposed in the first display region 101 of the display panel. The first side surface 301 of the boss 30 and the second side surface 302 of the boss 30 provide inclined surfaces for the first electrode 21 and the second electrode 22. The first electrode 21 and the second electrode 22 are disposed on the first side surface 301 and the second side surface 302 respectively. Limited by the current electrode process capability, electrodes (including the first electrode 21 and the second electrode 22) cannot be made too high when formed by using a conductive material directly. The arrangement of the boss 30 may enlarge the opposing surface area of the first electrode 21 and the second electrode 22. Additionally, since the first electrode 21 and the second electrode 22 only need to be deposited on the surface of the boss 30, the electrodes may be formed by covering a conductive layer at the surface of the protrusion portion. The heights of the electrodes are no longer limited by the electrode process capability, resulting in a more flexible height design and contributing to the application in a display panel with great cell thickness. The thickness of the first electrode 21 and the thickness of the second electrode 22 may be reduced. To a certain degree, the difficulty of the manufacturing process of the first electrode 21 and the second electrode 22 is reduced. The material consumption of the first electrode 21 and the material consumption of the second electrode 22 are further saved. Further, since the first electrode 21 and the second electrode 22 are disposed on the first side surface 301 of the boss 30 and the second side surface 302 of the boss 30 respectively, the first side surface 301 of the boss 30 and the second side surface 302 of the boss 30 provide support for the first electrode 21 and the second electrode 22; thus the structural stability of the first electrode 21 and the structural stability of the second electrode 22 are enhanced. In other embodiments, in the same electrode group 20, the first electrode 21 at least partially covers the second side surface 302, and the second electrode 22 at least partially covers the first side surface 301.

Figure 7:
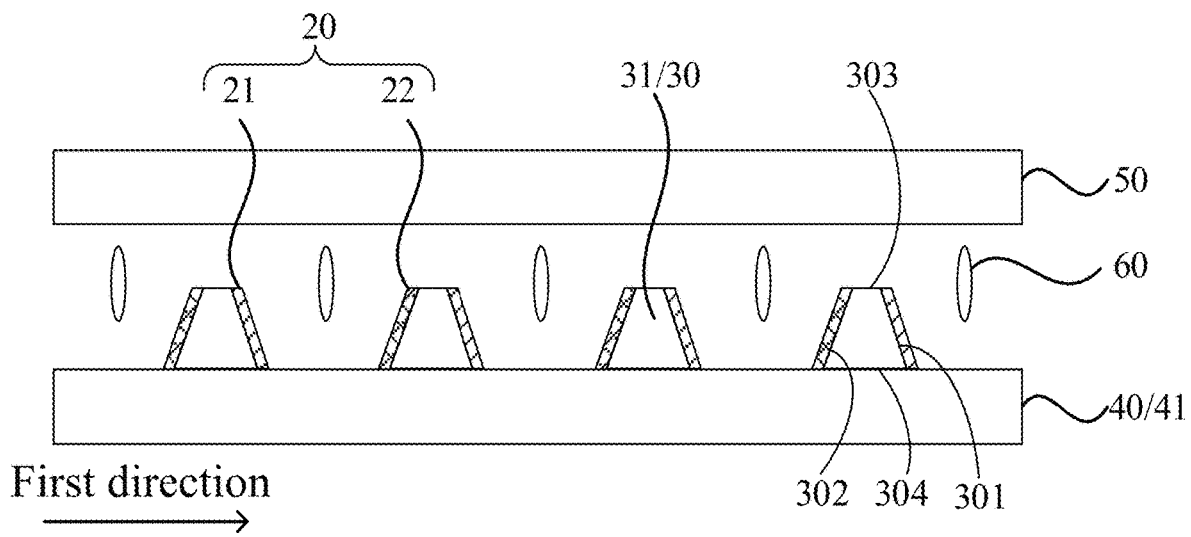
FIG. 7 is a section view illustrating the structure of a display panel according to an embodiment of the present disclosure.

FIG. 7 is a section view illustrating the structure of a display panel according to an embodiment of the present disclosure. Referring to FIG. 7, the display panel includes an array substrate 40, an opposing substrate 50, and a liquid-crystal layer 60. The liquid-crystal layer 60 is disposed between the array substrate 40 and the opposing substrate 50 and includes liquid-crystal molecules. In the stage of capturing, the liquid-crystal molecules rotate under the driving of the electric field between the first electrode 21 and the second electrode 22 and are used for projecting the ambient light onto the photosensitive element for imaging. The bosses 30 may be disposed on at least one of the array substrate 40 or the opposing substrate 50. The first electrode 21 may be disposed on at least one of the array substrate 40 or the opposing substrate 50. The second electrode may be disposed on at least one of the array substrate 40 or the opposing substrate 50.

Referring to FIG. 7, the bosses 30 include first bosses 31 disposed on the surface of the array substrate 40 facing the opposing substrate 50. The first electrode 21 and the second electrode 22 are both disposed on the array substrate 40. It is to be understood that various driving transistors and signal lines are disposed in the array substrate 40. Accordingly, the first electrode 21 and the second electrode 22 are both disposed on the array substrate 40. In the case where a signal is transmitted to an electrode by using a driving transistor or a driving signal line, the first electrode 21 and the second electrode 22 can be electrically connected to a corresponding driving transistor or a connection line through a via. The processing difficulty is relatively low and the connection reliability is higher. Moreover, many insulating layers for spacing the signal lines are provided on the array substrate 40. At least one of the insulating layers may be selected for manufacturing the first bosses 31 so as to meet the height requirement for the first bosses 31 and simplify the manufacturing process. The bosses 30 may be manufactured by using an organic layer in the related panel, for example, a planarization layer or an optical adhesive. Alternatively, the bosses 30 may be made of an inorganic material, for example, silicon nitride.

Figure 8:
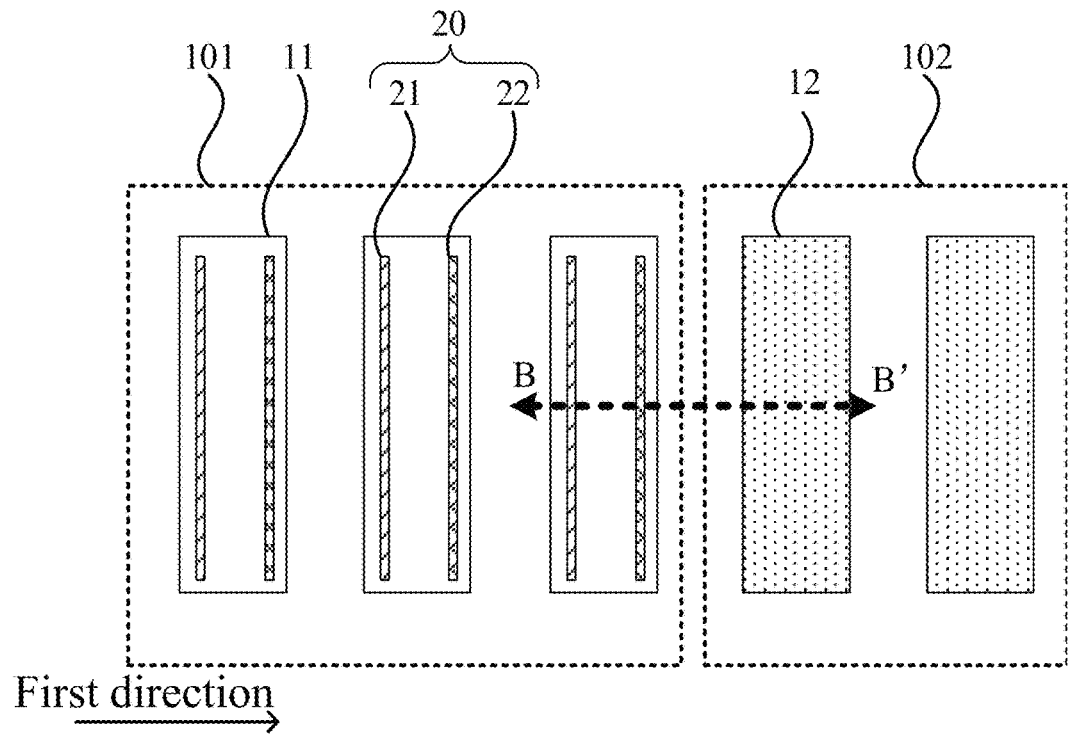
FIG. 8 is a top view illustrating the structure of a display region according to an embodiment of the present disclosure.
Figure 9:
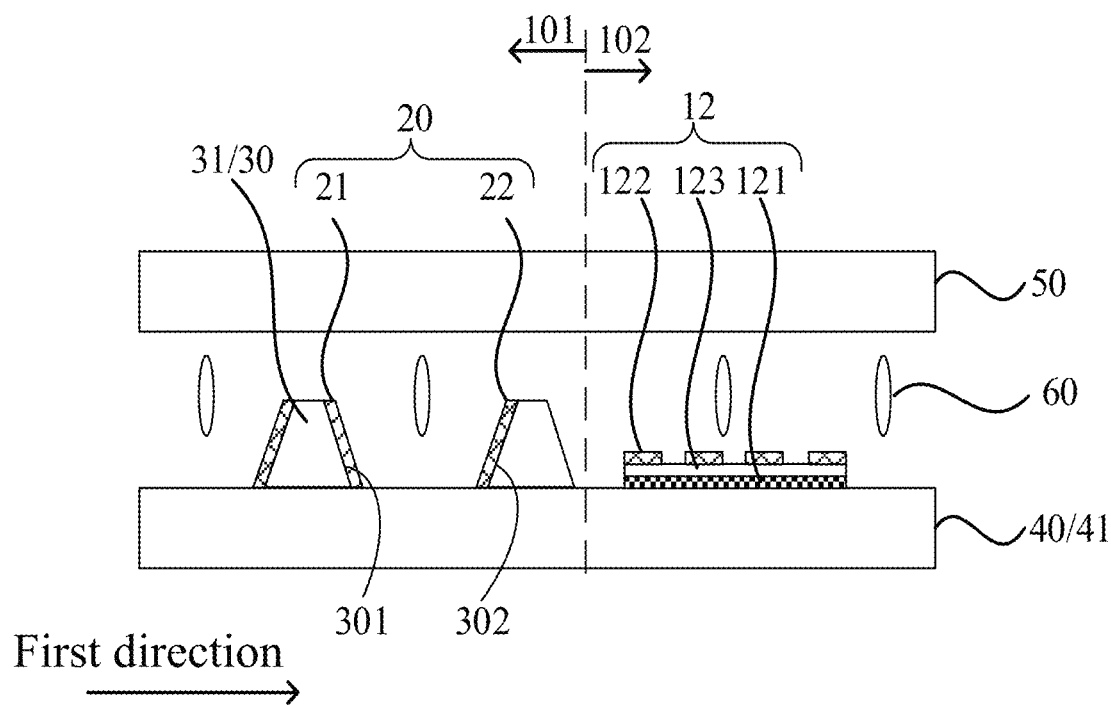
FIG. 9 is a section view taken along BB' of FIG. 8.

FIG. 8 is a top view illustrating the structure of a display region according to an embodiment of the present disclosure. FIG. 9 is a section view taken along BB' of FIG. 8. Referring to FIGS. 8 and 9, the second display region 102 includes a plurality of second sub-pixels 12. A second sub-pixel 12 includes a common electrode 121 and a pixel electrode 122. The common electrode 121 and the pixel electrode 122 are each disposed on the array substrate 40. In the stage of display, the liquid-crystal molecules rotate under the driving of the electric field between the common electrode 121 and the pixel electrode 122 so as to perform a normal screen display. The first electrode 21 and the second electrode 22 are formed in a same film process as at least one of the common electrode 121 or the pixel electrode 122. That is, the first electrode 21 and the second electrode 22 may be formed in the same film process as the common electrode 121; the first electrode 21 and the second electrode 22 may also be formed in the same film process as the pixel electrode 122; the first electrode 21, the second electrode 22, the common electrode 121, and the pixel electrode 122 may be formed in the same film process. In this embodiment of the present disclosure, the first electrode 21 and the second electrode 22 are formed in a same film process as at least one of the common electrode 121 or the pixel electrode 122, with no need for providing a separate film process for the first electrode 21 and the second electrode 22. Accordingly, the manufacturing process is simplified.

Figure 10:
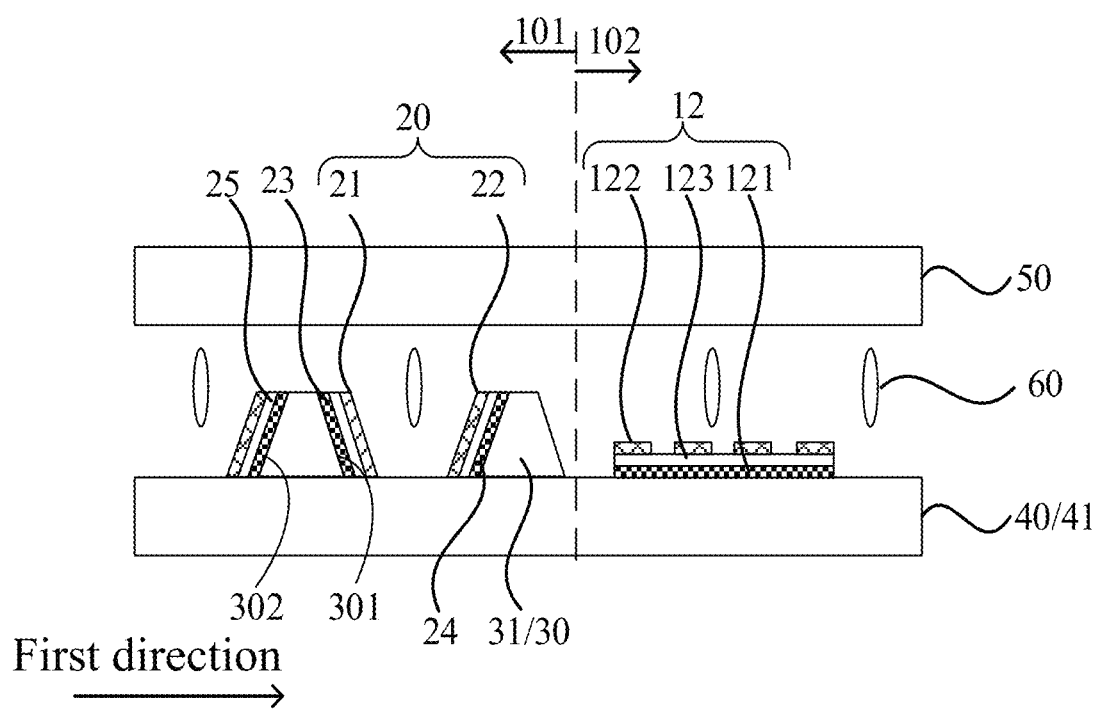
FIG. 10 is a section view illustrating the structure of another display panel according to an embodiment of the present disclosure.

FIG. 10 is a section view illustrating the structure of another display panel according to an embodiment of the present disclosure. Referring to FIG. 10, the array substrate 40 further includes a first substrate 41 as the base of the array substrate 40. Structures including a pixel driving circuit in the array substrate 40 may be formed on the first substrate 41. The first substrate 41 may be a rigid substrate or a flexible substrate. The common electrode 121 is disposed between the first substrate 41 and the pixel electrode 122. The display panel further includes a third electrode 23 and a fourth electrode 24. The third electrode 23 is disposed between the first side surface 301 of the boss 30 and the first electrode 21. The fourth electrode 24 is disposed between the second side surface 302 of the boss 30 and the second electrode 22. The first electrode 21, the second electrode 22, and the pixel electrode 122 are formed in the same film process. The third electrode 23, the fourth electrode 24, and the common electrode 121 are formed in the same film process. In this embodiment of the present disclosure, when the common electrode 121 is formed, the third electrode 23 and the fourth electrode 24 are formed by using the same film process. When the pixel electrode 122 is formed, the first electrode 21 and the second electrode 22 are formed by using the same film process. Accordingly, the manufacturing process is simplified. In another aspect, the storage capacitor formed by the third electrode 23 and the first electrode 21 may maintain the voltage on the first electrode 21 for some time; the storage capacitor formed by the fourth electrode 24 and the second electrode 22 may maintain the voltage on the second electrode 22 for some time. Thus in the stage of capturing, it is unnecessary to energize the first electrode 21 and the second electrode 22 at all times, which enhances the stability of imaging.

Optionally, referring to FIG. 10, the display panel further includes a passivation layer 123 and electrode spacing layers 25. The passivation layer 123 is disposed between the common electrode 121 and the pixel electrode 122 so as to electrically insulate the common electrode 121 from the pixel electrode 122. An electrode spacing layer 25 is disposed between the first electrode 21 and the third electrode 23; another electrode spacing layer 25 is disposed between the second electrode 22 and the fourth electrode 24. The electrode spacing layer 25 disposed between the first electrode 21 and the third electrode 23 electrically insulates the first electrode 21 from the third electrode 23. The electrode spacing layer 25 disposed between the second electrode 22 and the fourth electrode 24 electrically insulates the second electrode 22 from the fourth electrode 24. The electrode spacing layers 25 and the passivation layer 123 are formed in the same film process. When the passivation layer 123 is formed, the electrode spacing layers 25 are formed by using the same film process, with no need for providing a separate film process for the electrode spacing layers 25. Accordingly, the manufacturing process is simplified.

Figure 11:
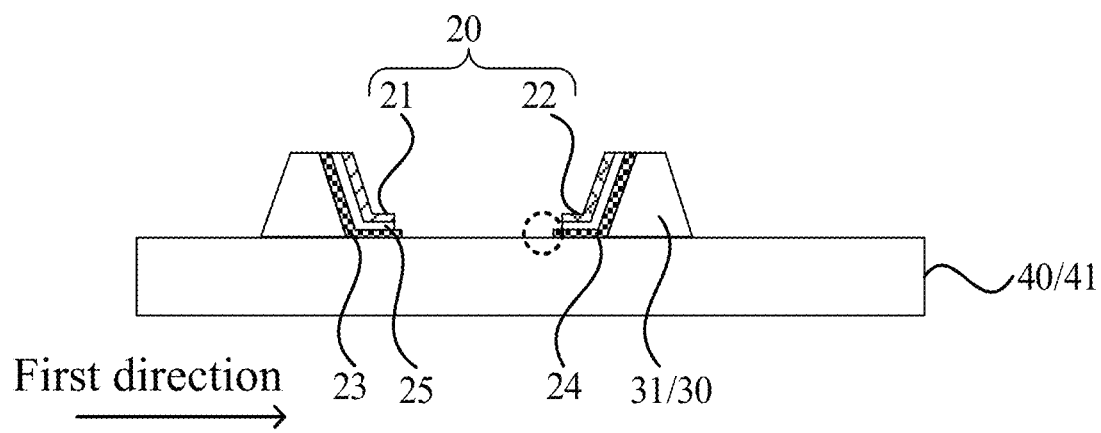
FIG. 11 is a section view illustrating the structure of a display panel as a comparative example according to an embodiment of the present disclosure.

FIG. 11 is a section view illustrating the structure of a display panel as a comparative example according to an embodiment of the present disclosure. Referring to FIG. 11, in the direction perpendicular to the first substrate 41, the first electrode 21 completely covers the end of the third electrode 23 facing the first substrate 41. The extensive range of the third electrode 23 on an end facing the first substrate 41 exceeds the coverage range of the first electrode 21. In the direction perpendicular to the first substrate 41, the second electrode 22 completely covers the end of the fourth electrode 24 facing the first substrate 41. The fourth electrode 24 extends beyond the coverage range of the second electrode 22 (as shown by a dotted circle in FIG. 11). The portion of the third electrode 23 extending beyond the first electrode 21 and the portion of the fourth electrode 24 extending beyond the second electrode 22 form fringing electric fields, which affects the formation of the horizontal electric field.

With continued reference to FIG. 10, the vertical projection of the end of the third electrode 23 close to the first substrate 41 on the light-emitting surface of the display panel is located in the vertical projection of the first electrode 21 on the light-emitting surface of the display panel; the vertical projection of the end of the fourth electrode 24 close to the first substrate 41 on the light-emitting surface of the display panel is located in the vertical projection of the second electrode 22 on the light-emitting surface of the display panel. In this embodiment of the present disclosure, in the direction perpendicular to the first substrate 41, the first electrode 21 completely covers the end of the third electrode 23 facing the first substrate 41; the second electrode 22 completely covers the end of the fourth electrode 24 facing the first substrate 41. Accordingly, the fringing electric fields are prevented from being formed at the end of the third electrode 23 facing the first substrate 41 and the end of the fourth electrode 24 facing the first substrate 41; the uniformity of the liquid-crystal molecules is enhanced in the stage of capturing; the periodical arrangement of the liquid-crystal molecules is further destroyed; light waves may not form obvious diffraction fringes after superposition; the quality of imaging is enhanced in the stage of capturing.

Figure 12:
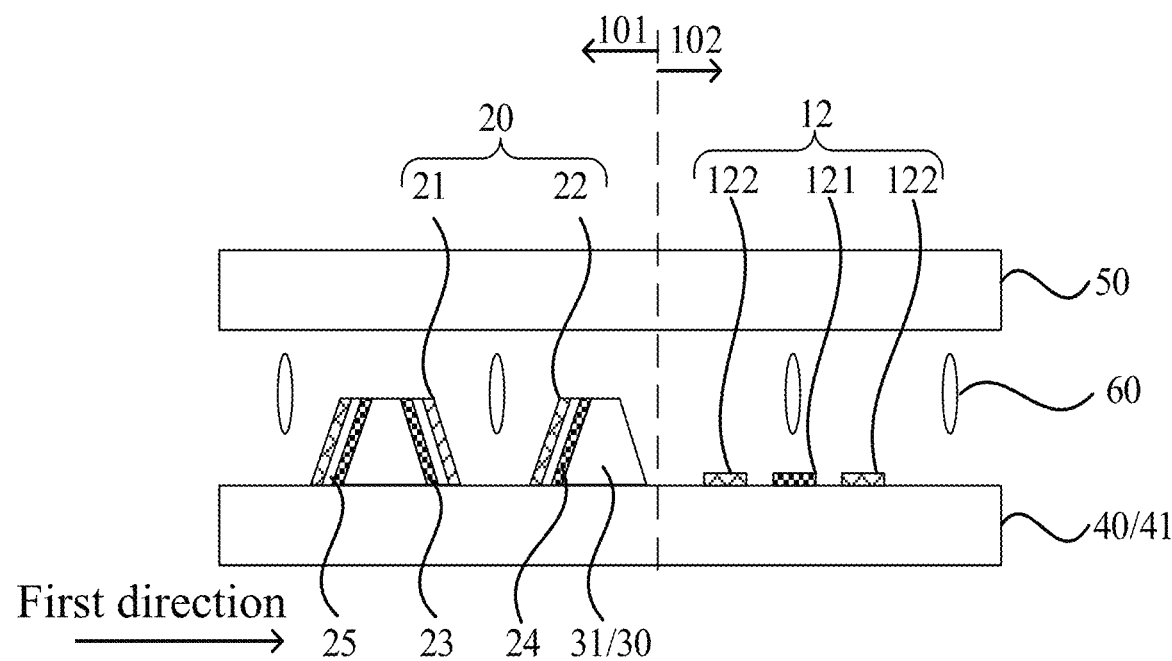
FIG. 12 is a section view illustrating the structure of another display panel according to an embodiment of the present disclosure.

FIG. 12 is a section view illustrating the structure of another display panel according to an embodiment of the present disclosure. Referring to FIG. 12, the second display region 102 includes a plurality of second sub-pixels 12. A second sub-pixel 12 includes a common electrode 121 and a pixel electrode 122. The common electrode 121 and the pixel electrode 122 are both disposed on the array substrate 40 and are disposed in the same layer. In one embodiment, the third electrode 23, the fourth electrode 24, and the common electrode 121 are formed in the same film process; the first electrode 21, the second electrode 22, and the pixel electrode 122 are formed in the same film process. In another embodiment, the first electrode 21, the second electrode 22, and the common electrode 121 are formed in the same film process; the third electrode 23, the fourth electrode 24, and the pixel electrode 122 are formed in the same film process. In another embodiment, the first electrode 21, the second electrode 22, the common electrode 121, and the pixel electrode 122 are formed in the same film process. In another embodiment, the third electrode 23, the fourth electrode 24, the common electrode 121, and the pixel electrode 122 are formed in the same film process.

Figure 13:
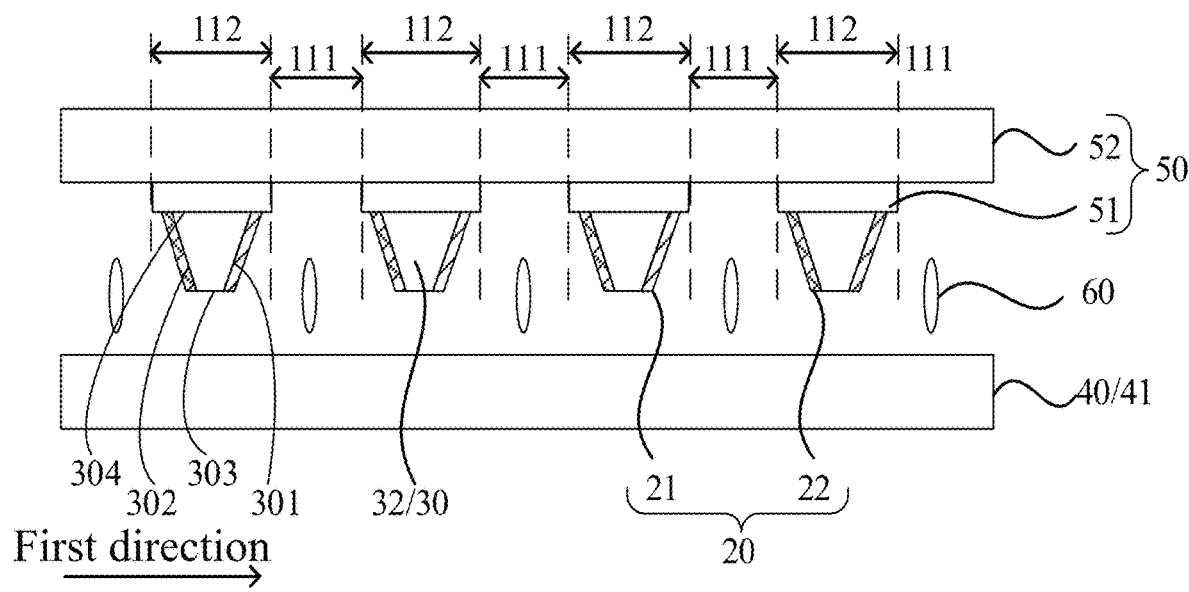
FIG. 13 is a section view illustrating the structure of another display panel according to an embodiment of the present disclosure.

FIG. 13 is a section view illustrating the structure of another display panel according to an embodiment of the present disclosure. Referring to FIGS. 4 and 13, the first display region 101 includes opening regions 111 and non-opening regions 112 each of which surrounds a respective one of the opening regions 111 (the second display region 102 is not shown in FIG. 13). Similarly, the second display region 102 includes opening regions 111 and non-opening regions 112 surrounding the opening regions 111. The opposing substrate 50 includes light-blocking layers 51. The orthographic projection of a light-blocking layer 51 on the light-emitting surface of the display panel covers a respective non-opening region 112. The opening regions 111 are light-transmitting regions. Light rays emitted by a backlight source may pass through the opening regions 110 to reach the outside of the display panel so that the preset luminance and light-emitting color are implemented. The non-opening regions 112 are light-blocking regions provided with opaque elements including metal wires and the light-blocking layers 51. The bosses include second bosses 32 disposed on the surface of the opposing substrate 50 facing the array substrate 40. The orthographic projection of a second boss 32 on the light-emitting surface of the display panel overlaps the orthographic projection of a respective light-blocking layer 51 on the light-emitting surface of the display panel. The first electrode 21 and the second electrode 22 are both disposed on the opposing substrate 50. In this embodiment of the present disclosure, the first electrode 21 and the second electrode 22 are disposed on the opposing substrate 50 directly. The relative positional relationship of the first electrode 21 and the second electrode 22 to the light-blocking layer 51 is not affected by factors including alignment deviation between the opposing substrate 50 and the array substrate 40. When the electrodes are made of a metal material, the case where the light-blocking layers 51 cannot completely cover the electrodes due to alignment accuracy is avoided. Further, in the direction perpendicular to the first substrate 41, the second boss 32 overlaps a light-blocking layer 51. When the first electrode 21 on the second boss 32 and the second electrode 22 on the second boss 32 are made of a metal material, the light-blocking layer 51 may block the first electrode 21 and the second electrode 22, preventing the first electrode 21 and the second electrode 22 from reflecting the ambient light to the human eye.

Exemplarily, referring to FIG. 13, the opposing substrate 50 further includes a second substrate 52 disposed opposite to the first substrate 41. The second substrate 52 serves as the base of the opposing substrate 50. Structures including the light-blocking layers 51 in the opposing substrate 50 may be formed on the second substrate 52.

Figure 14:
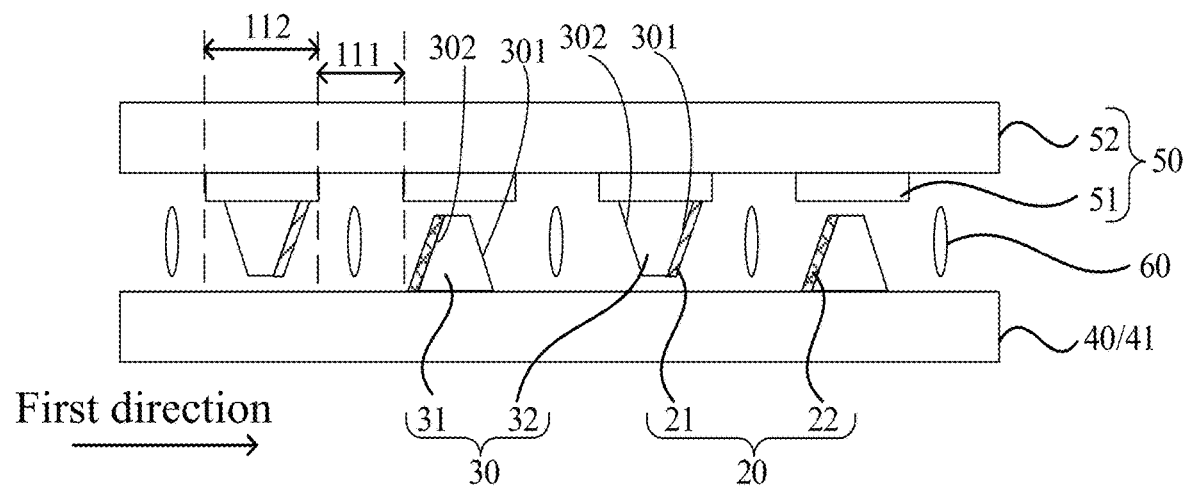
FIG. 14 is a section view illustrating the structure of another display panel according to an embodiment of the present disclosure.

FIG. 14 is a section view illustrating the structure of another display panel according to an embodiment of the present disclosure. Referring to FIG. 14, the bosses 30 include first bosses 31 and second bosses 32. The first bosses 31 are disposed on the surface of the array substrate 40 facing the opposing substrate 50. The second bosses 32 are disposed on the surface of the opposing substrate 50 facing the array substrate 40. An orthographic projection of a first boss 31 on the light-emitting surface of the display panel and an orthographic projection of a second boss 32 on the light-emitting surface of the display panel each overlap the orthographic projection of a respective light-blocking layer 51 on the light-emitting surface of the display panel. The first electrode 21 is disposed on a respective second boss 32. The second electrode 22 is disposed on a respective first boss 31. The first electrode 21 on the respective second boss 32 and the second electrode 22 on the respective first boss 31 form a horizontal electric field. Further, in the direction perpendicular to the first substrate 41, the first boss 31 and the second boss 32 each overlap a light-blocking layer 51. When the first electrode 21 on the respective second boss 32 and the second electrode 22 on the respective first boss 31 are made of a metal material, the light-blocking layers 51 may block the first electrode 21 and the second electrode 22, preventing the first electrode 21 and the second electrode 22 from reflecting the ambient light to the human eye.

Figure 15:
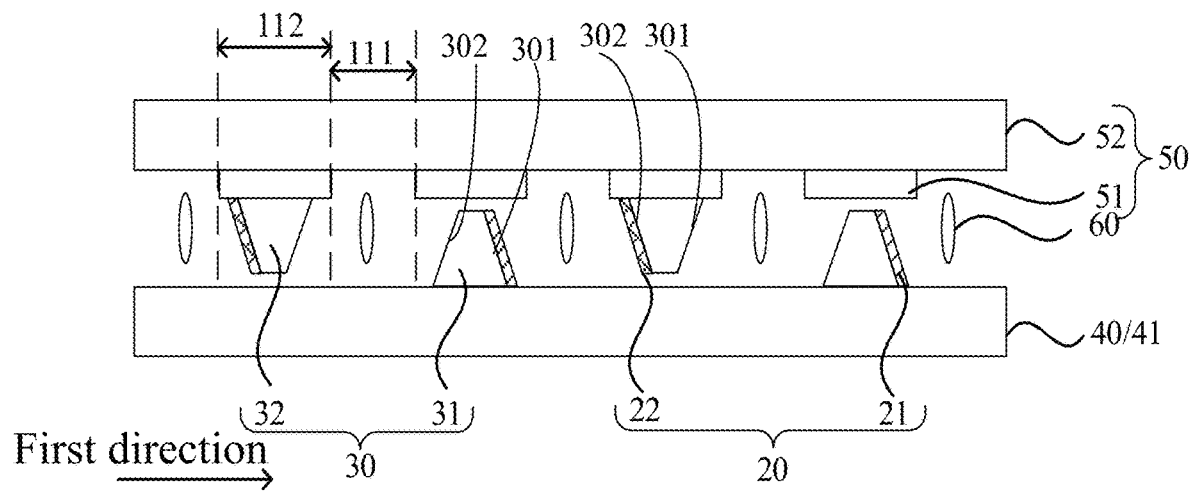
FIG. 15 is a section view illustrating the structure of another display panel according to an embodiment of the present disclosure.

FIG. 15 is a section view illustrating the structure of another display panel according to an embodiment of the present disclosure. Referring to FIG. 15, the first electrode 21 is disposed on a respective first boss 31; the second electrode 22 is disposed on a respective second boss 32. The first electrode 21 on the respective first boss 31 and the second electrode 22 on the respective second boss 32 form a horizontal electric field.

Figure 16:
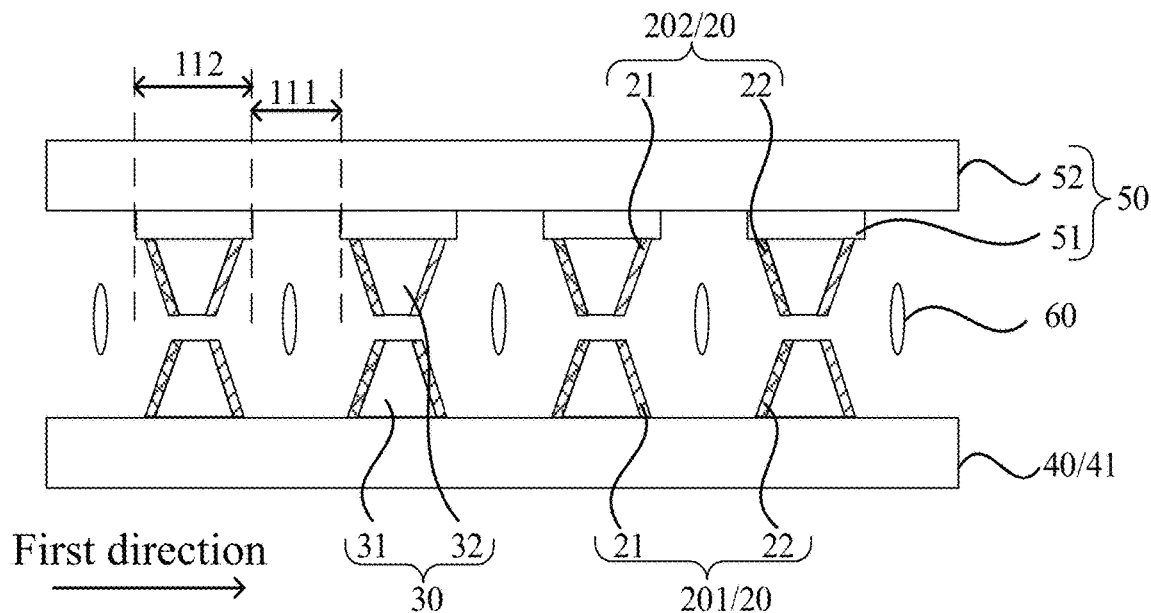
FIG. 16 is a section view illustrating the structure of another display panel according to an embodiment of the present disclosure.

FIG. 16 is a section view illustrating the structure of another display panel according to an embodiment of the present disclosure. Referring to FIG. 16, the electrode group 20 includes a first electrode group 201 and a second electrode group 202. A first electrode 21 in the first electrode group 201 and a second electrode 22 in the first electrode group 201 are both disposed on a respective first boss 31. A first electrode 21 in the second electrode group 202 and a second electrode 22 in the second electrode group 202 are both disposed on a respective second boss 32. In this embodiment of the present disclosure, the first electrode 21 in the first electrode group 201 and the second electrode 22 in the first electrode group 201 are both disposed on the first boss 31. A horizontal electric field is formed between the first electrode 21 in the first electrode group 201 and the second electrode 22 in the first electrode group 201. The first electrode 21 in the second electrode group 202 and the second electrode 22 in the second electrode group 202 are both disposed on the second boss 32. A horizontal electric field is formed between the first electrode 21 in the second electrode group 202 and the second electrode 22 in the second electrode group 202.

Optionally, referring to FIG. 16, the orthographic projection of the first electrode 21 in the first electrode group 201 on the light-emitting surface of the display panel overlaps the orthographic projection of the first electrode 21 in the second electrode group 202 on the light-emitting surface of the display panel. The orthographic projection of the second electrode 22 in the first electrode group 201 on the light-emitting surface of the display panel overlaps the orthographic projection of the second electrode 22 in the second electrode group 202 on the light-emitting surface of the display panel. In this embodiment of the present disclosure, in the direction perpendicular to the first substrate 41, the first electrode 21 in the first electrode group 201 overlaps the first electrode 21 in the second electrode group 202. The first electrode 21 in the first electrode group 201 and the first electrode 21 in the second electrode group 202 that overlap each other have the same voltage. The second electrode 22 in the first electrode group 201 overlaps the second electrode 22 in the second electrode group 202. The second electrode 22 in the first electrode group 201 and the second electrode 22 in the second electrode group 202 that overlap each other have the same voltage. Compared with the arrangement in which the electrodes (including the first electrode 21 and the second electrode 22) are merely disposed on the first boss 31 or the second boss 32, the heights of the electrodes forming a horizontal electric field are greater and the range of the horizontal electric field is increased. In another aspect, the first boss 31 and the second boss 32 are both provided with the first electrode 21 and the second electrode 22. Compared with the arrangement in which the electrodes are merely disposed on the first boss 31 or the second boss 32, the height of the first boss 31 and the height of the second boss 32 may be relatively small so that the requirement for the manufacturing process capability is relatively low.

Figure 17:
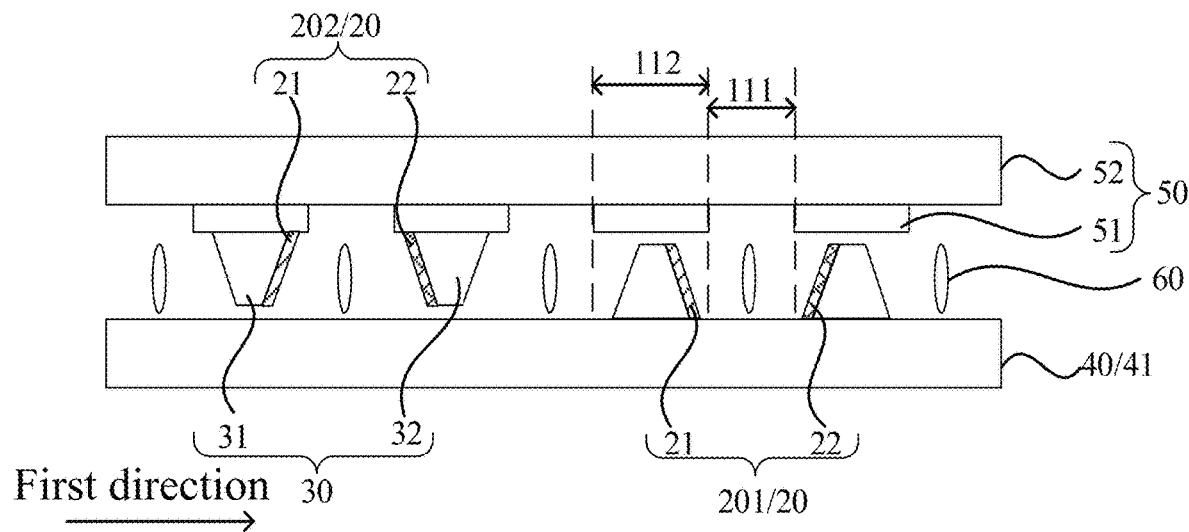
FIG. 17 is a section view illustrating the structure of another display panel according to an embodiment of the present disclosure.

FIG. 17 is a section view illustrating the structure of another display panel according to an embodiment of the present disclosure. Referring to FIG. 17, the first electrode 21 in the first electrode group 201 and the second electrode 22 in the first electrode group 201 are both disposed in the first boss 31. The first electrode 21 in the second electrode group 202 and the second electrode 22 in the second electrode group 202 are both disposed in the second boss 32. The orthographic projection of the first electrode 21 in the first electrode group 201 on the light-emitting surface of the display panel does not overlap the orthographic projection of the first electrode 21 in the second electrode group 202 on the light-emitting surface of the display panel. The orthographic projection of the second electrode 22 in the first electrode group 201 on the light-emitting surface of the display panel does not overlap the orthographic projection of the second electrode 22 in the second electrode group 202 on the light-emitting surface of the display panel. In the first direction, first electrode groups 201 alternate with second electrode groups 202 as follows: a first electrode group 201, a second electrode group 202, a first electrode group 201, a second electrode group 202, . . . .

Optionally, with continued reference to FIG. 6, the boss 30 further includes a top surface 303 and a bottom surface 304 that are both parallel to the light-emitting surface of the display panel. The first side surface 301 and the second side surface 302 are both connected to the top surface 303 and the bottom surface 304. The vertical distance H between the top surface 303 and the bottom surface 304 is greater than 2.7 microns. That is, the height of the boss 30 is greater than 2.7 microns. It is to be understood that a greater height of the boss 30 indicates a greater height of the first electrode 21 formed on at least one of the first side surface 301 or the second side surface 302 and a greater height of the second electrode 22 formed on at least one of the first side surface 301 or the second side surface 302, which increases the range of the horizontal electric field.

Optionally, referring to FIG. 6, the area of the top surface 303 of the boss 30 is smaller than the area of the bottom surface 304 of the boss 30. Referring to FIG. 7, the top surface 303 and the bottom surface 304 are both parallel to the plane in which the first substrate 41 is located. The bottom surface 304 of a first boss 31 is disposed between the top surface 303 of the first boss 31 and the array substrate 40. Referring to FIG. 13, the bottom surface 304 of a second boss 32 is disposed between the top surface 303 of the second boss 32 and the opposing substrate 50. In the first direction, a plurality of bosses 30 are arranged in a row. The first side surface 301 of a boss 30 is the side surface of the boss 30 facing the first direction; the second side surface 302 of the boss 30 is the side surface of the boss 30 facing away from the first direction. Specifically, referring to FIG. 7, in the first direction, a plurality of first bosses 31 are arranged in a row. The first side surface 301 of a first boss 31 is adjacent to the second side surface 302 of an adjacent first boss 31; the second surface 302 of the first boss 31 is adjacent to the first side surface 301 of another adjacent first boss 31. Referring to FIG. 13, in the first direction, a plurality of second bosses 32 are arranged in a row. The first side surface 301 of a second boss 32 is adjacent to the second side surface 302 of an adjacent second boss 32; the second surface 302 of the second boss 32 is adjacent to the first side surface 301 of another adjacent second boss 32.

Optionally, referring to FIG. 6, the boss 30 is in a shape of frustum of a pyramid. The section of the boss 30 in the first direction is trapezoidal. On one hand, when the boss is formed by a process like etching, the etching process is easily controlled. In this case, the velocity for etching the top of the layer to be etched is greater than the velocity for etching the bottom so that the frustum-shaped structure with a small top and a large bottom is formed without increasing process difficulty. On the other hand, the boss 30 is of a frustum shape. With sound stability, the boss 30 is not easy to fall off. Moreover, when an electrode is formed on a side surface of the boss 30 with a small top and a large bottom, the process difficulty is relatively low.

Figure 18:
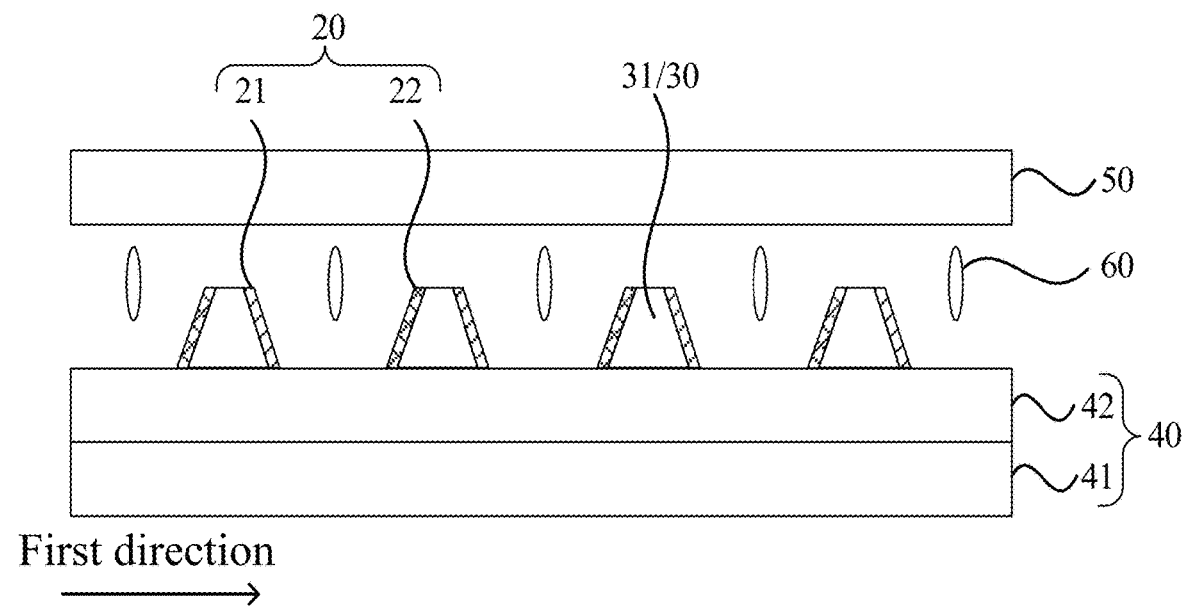
FIG. 18 is a section view illustrating the structure of another display panel according to an embodiment of the present disclosure.

FIG. 18 is a section view illustrating the structure of another display panel according to an embodiment of the present disclosure. Referring to FIG. 18, the array substrate 40 includes a first substrate 41 and a planarization layer 42. The planarization layer 42 is disposed between the first substrate 41 and the first bosses 31. The planarization layer 42 may be used for covering structures including a pixel driving circuit so as to provide a planar surface for the common electrode 121 and the pixel electrode 122 that are formed on the planarization layer 42 subsequently. In this embodiment of the present disclosure, when the first bosses 31 are disposed on the array substrate 40, the first bosses 31 are disposed on a side of the planarization layer 42 facing away from the first substrate 41. The planarization layer 42 and the first bosses 31 may be formed in the same process. When the planarization layer 42 is formed, the first bosses 31 are formed by using the same film process, with no need for providing a separate film process for the first bosses 31. Accordingly, the manufacturing process is simplified. In other embodiments, after the planarization layer 42 is formed on a side of the first substrate 41, the first bosses 31 are formed on a side of the planarization layer 42 facing away from the first substrate 41.

Figure 19:
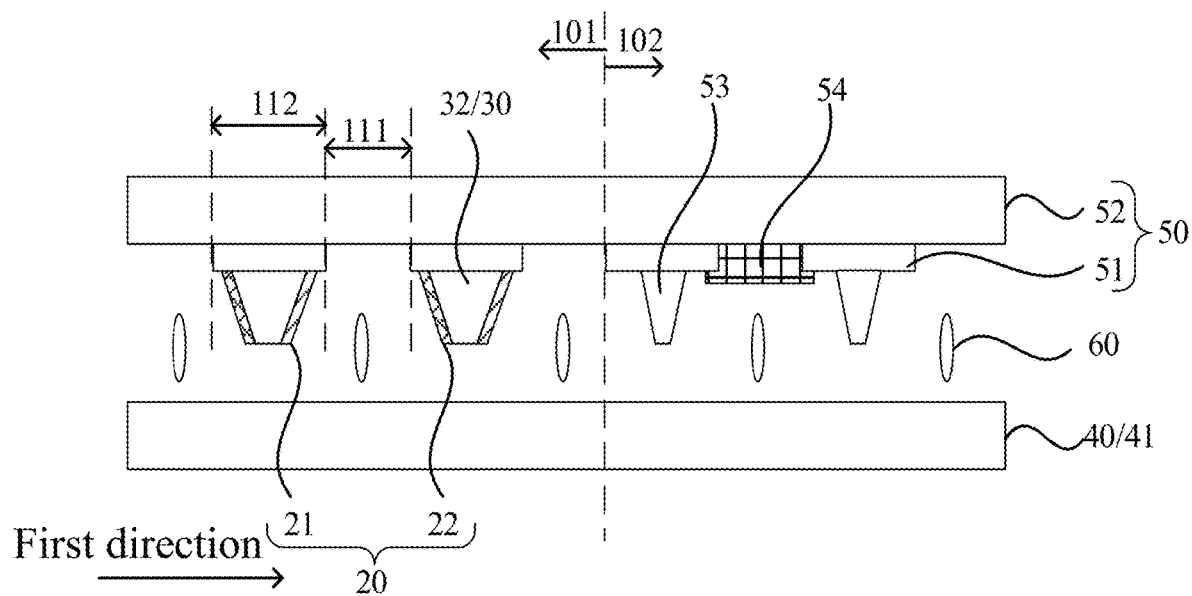
FIG. 19 is a section view illustrating the structure of another display panel according to an embodiment of the present disclosure.

FIG. 19 is a section view illustrating the structure of another display panel according to an embodiment of the present disclosure. Referring to FIG. 19, the opposing substrate 50 further includes support columns 53. The orthographic projection of a support column 53 on the light-emitting surface of the display panel overlaps the orthographic projection of a respective light-blocking layer 51 on the light-emitting surface of the display panel. After the cell alignment between the array substrate 40 and the opposing substrate 50, at least part of the support columns 53 abuts the array substrate 40 so as to maintain the distance between the array substrate 40 and the opposing substrate 50, that is, to maintain the thickness of the liquid-crystal cell. The second bosses 32 and the support columns 53 are formed in the same film process. On one hand, when the support columns 53 are formed, the second bosses 32 are formed by using the same film process, with no need for providing a separate film process for the second bosses 32. Accordingly, the manufacturing process is simplified. On the other hand, since the second bosses 32 and the support columns 53 are formed in the same film process, the second bosses 32 and the support columns 53 are both disposed between the light-blocking layers 51 and the array substrate 40. In this case, the second bosses 32 further perform the function of maintaining the thickness of the liquid-crystal cell.

Figure 20:
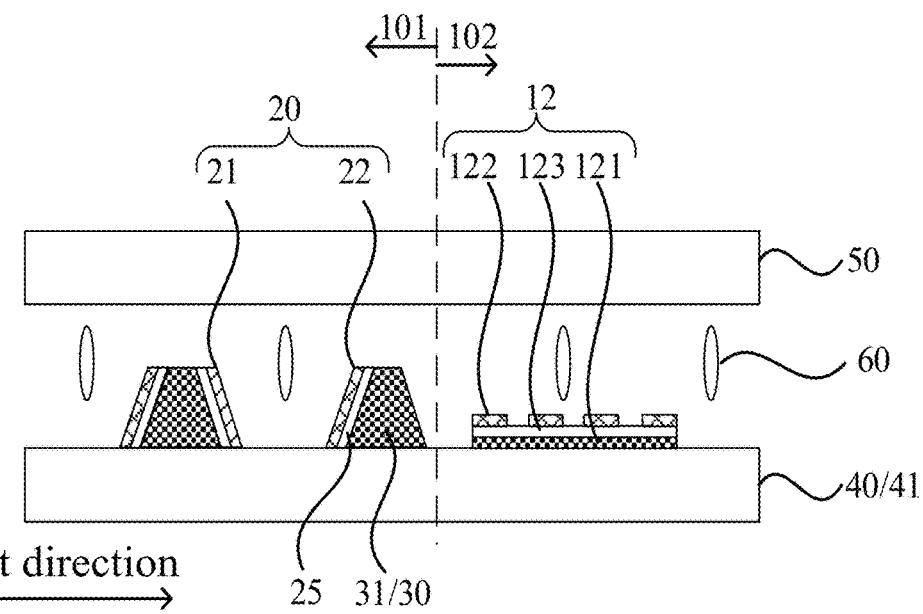
FIG. 20 is a section view illustrating the structure of another display panel according to an embodiment of the present disclosure.

FIG. 20 is a section view illustrating the structure of another display panel according to an embodiment of the present disclosure. Referring to FIG. 20, the second display region 102 includes a plurality of second sub-pixels 12 (FIG. 20 exemplarily illustrates one second sub-pixel 12). Each of the plurality of second sub-pixels 12 includes a common electrode 121 and a pixel electrode 122. The display panel includes an array substrate 40, an opposing substrate 50, and a liquid-crystal layer 60. The liquid-crystal layer 60 is disposed between the array substrate 40 and the opposing substrate 50. The common electrode 121 and the pixel electrode 122 are both disposed on the array substrate 40. The bosses 30 and all common electrodes 121 are formed in the same film process. In this embodiment of the present disclosure, when the common electrode 121 is formed, the bosses 30 are formed by using the same film process, with no need for providing a separate film process for the bosses 30. Accordingly, the manufacturing process is simplified. Further, the bosses 30 and the common electrode 121 are formed in the same film process using the same material. The bosses 30 include a conductive material. Accordingly, a storage capacitor may be formed between the boss 30 and the first electrode 21; a storage capacitor may be formed between the boss 30 and the second electrode 22. The storage capacitor formed between the boss 30 and the first electrode 21 may maintain the voltage on the first electrode 21 for some time; the storage capacitor formed between the boss 30 and the second electrode 22 may maintain the voltage on the second electrode 22 for some time. Thus in the stage of capturing, it is unnecessary to energize the first electrode 21 and the second electrode 22 at all times. Further, compared with the bosses 30 formed by using an insulating material, it is unnecessary to specifically form a third electrode 23 and a fourth electrode 24 in this arrangement. Accordingly, the number of layers is reduced and the manufacturing process is simplified.

It is to be noted that each embodiment in this disclosure is not limited to the arrangement in which the common electrode 121 and the pixel electrode 122 are disposed on the array substrate 40. In some embodiments, the pixel electrode 122 may be disposed on the array substrate 40 and the common electrode may be disposed on the opposing substrate 50. Correspondingly, structures formed in the same film process as the common electrode 121 are also disposed on the opposing substrate 50.

With continued reference to FIG. 2, in the first direction, first electrodes 21 and second electrodes 22 are arranged alternately. That is, in the first direction, a plurality of electrodes are disposed in the following manner: a first electrode 21, a second electrode 22, a first electrode 21, a second electrode 22, . . . .

Figure 21:
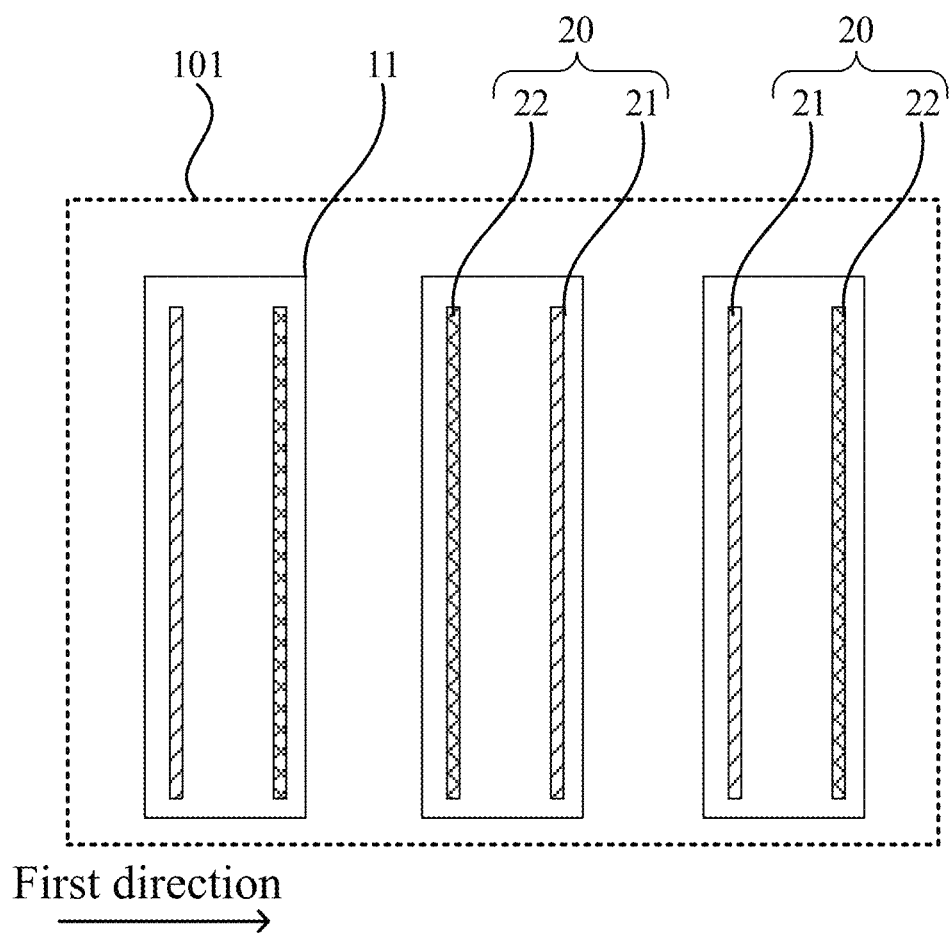
FIG. 21 is a top view illustrating the structure of another first display region according to an embodiment of the present disclosure.

FIG. 21 is a top view illustrating the structure of another first display region according to an embodiment of the present disclosure. Referring to FIG. 21, in the first direction, a plurality of electrode groups 20 are disposed in sequence, a first electrode 21 in one electrode group 20 is adjacent to a first electrode 21 in an adjacent electrode group 20, and a second electrode 22 in one electrode group 20 is adjacent to a second electrode 22 in an adjacent electrode group 20. That is, in the first direction, a plurality of electrodes are disposed in the following manner: a first electrode 21, a second electrode 22, a second electrode 22, a first electrode 21, a first electrode 21, a second electrode 22, . . . .

With continued reference to FIGS. 4 and 5, the first sub-pixels 11 include high-transmittance sub-pixels. A high-transmittance sub-pixel includes a first electrode 21 and a second electrode 22. The first sub-pixels 11 include high-transmittance sub-pixels whose positions are not provided with color resists. When passing through the high-transmittance sub-pixels, the ambient light is not filtered by color resists so that losses of light rays are little. Accordingly, the high-transmittance sub-pixels are taken as the imaging sub-pixels for implementing the function of capturing, which can improve the transmittance of the ambient light.

Exemplarily, referring to FIG. 19, the opposing substrate 50 may further include a plurality of color resists 54 including red color resists, green color resists, and blue color resists. The red color resists are used for filtering the light rays passing through the red color resists and making the light rays red. The green color resists are used for filtering the light rays passing through the green color resists and making the light rays green. The blue color resists are used for filtering the light rays passing through the blue color resists and making the light rays blue. A color resist 54 overlaps the opening region 111 in the second display region 102 so as to enable the display panel to perform color display.

In the case where the distance between the first electrode 21 and the second electrode 22 is unchanged, a greater voltage difference between the first electrode 21 and the second electrode 22 indicates a greater intensity of the horizontal electric field between the first electrode 21 and the second electrode 22, a stronger driving force of the horizontal electric field on the liquid-crystal molecules, and a better uniformity of the liquid-crystal molecules in the stage of capturing; a smaller voltage difference between the first electrode 21 and the second electrode 22 indicates a smaller intensity of the horizontal electric field between the first electrode 21 and the second electrode 22, a weaker driving force of the horizontal electric field on the liquid-crystal molecules, and a worse uniformity of the liquid-crystal molecules in the stage of capturing. In this embodiment of the present disclosure, in the stage of capturing, the difference value between the voltage applied to the first electrode 21 and the voltage applied to the second electrode 22 is greater than or equal to 10 V. In this case, the uniformity of the liquid-crystal molecules is enhanced in the stage of capturing; the periodical arrangement of the liquid-crystal molecules is further destroyed; the quality of imaging is enhanced in the stage of capturing.

In the display panel, the difference value between the voltage applied to the first electrode 21 and the voltage applied to the second electrode 22 is greater than or equal to 10 V. When the voltage applied to the first electrode 21 is greater than or equal to 0 V, the voltage applied to the second electrode 22 needs to be greater than or equal to 10 V. As for the display panel, a voltage higher than 10 V may affect the insulation performance of the insulating layers and the electrical performance of various elements. In a common display panel, the supply voltage is generally not more than 5.7 V. In this embodiment of the present disclosure, in the stage of capturing, the absolute value of the voltage applied to the first electrode 21 is equal to the absolute value of the voltage applied to the second electrode 22; the electrical polarity of the voltage applied to the first electrode 21 is opposite to the electrical polarity of the voltage applied to the second electrode 22. For example, the voltage applied to the first electrode 21 is +5 V and the voltage applied to the second electrode 22 is −5 V; thus the voltage on the first electrode 21 and the voltage on the second electrode 22 are not excessively great. Further, the absolute value of the voltage applied to the first electrode 21 is equal to the absolute value of the voltage applied to the second electrode 22; the electrical polarity of the voltage applied to the first electrode 21 is opposite to the electrical polarity of the voltage applied to the second electrode 22. In this case, when voltages are applied to the first electrode 21 and the second electrode 22 respectively, the difference value between the voltage applied to the first electrode 21 and the voltage applied to the second electrode 22 may reach the maximum value so that the uniformity of the liquid-crystal molecules is enhanced in the stage of capturing.

Optionally, in the stage of display, a common voltage is applied to the first electrode 21, and a pixel voltage is applied to the second electrode 22; alternatively, a pixel voltage is applied to the first electrode 21, and a common voltage is applied to the second electrode 22. In this embodiment of the present disclosure, in the state of display, a pixel electrode is applied to one of the first electrode 21 and the second electrode 22; a common electrode is applied to the other one of the first electrode 21 and the second electrode 22. Accordingly, the liquid-crystal molecules rotate under the driving of the electric field generated by the common voltage and the pixel voltage and control the transmittance of the first sub-pixels 11 in the stage of display so that the first sub-pixels 11 in the first display region 101 cooperate with the second sub-pixels 12 in the second display region 102 to emit light in the stage of display.

Figure 22:
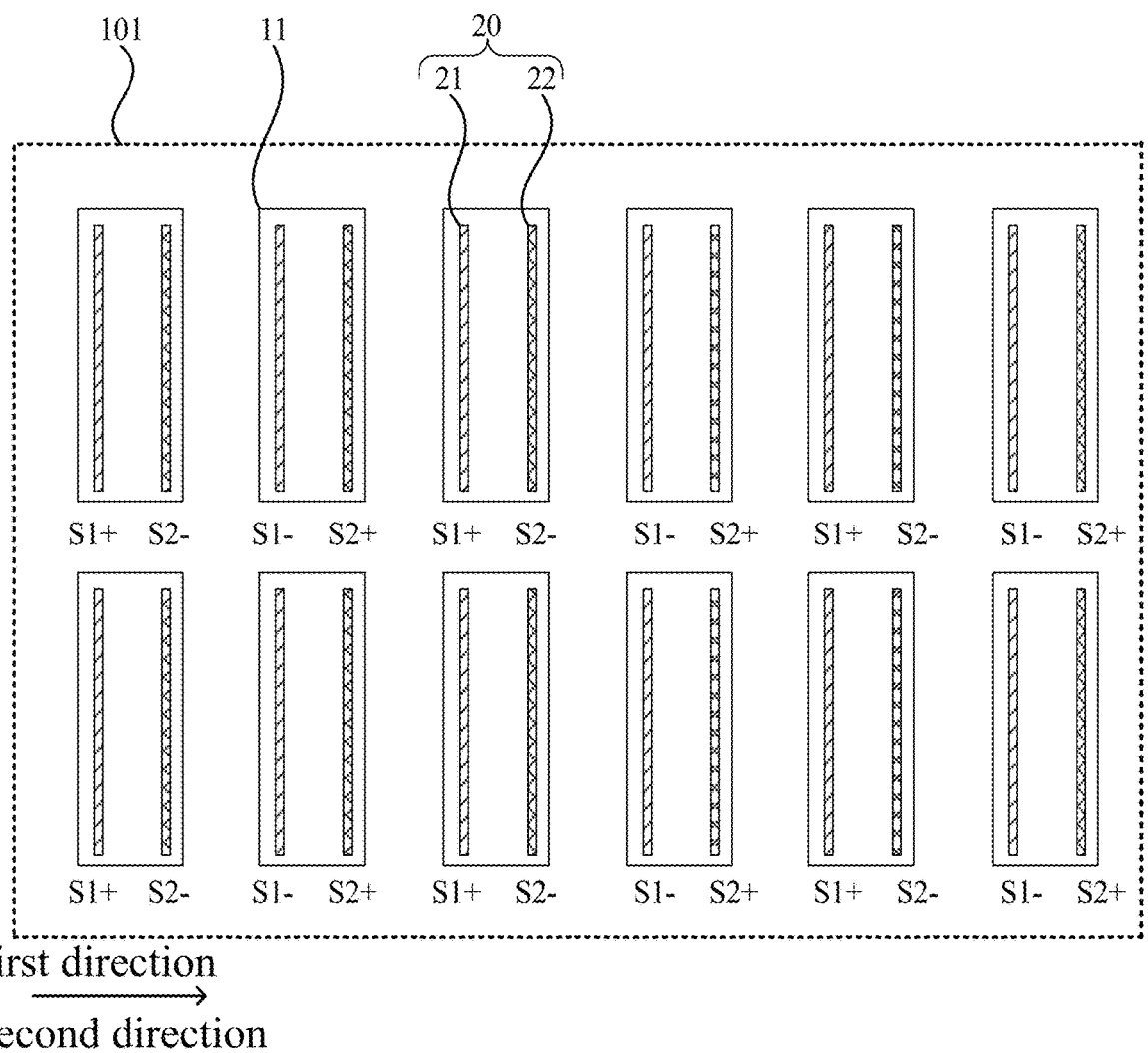
FIG. 22 is a diagram illustrating that electrical signals are applied to first electrodes and second electrodes according to an embodiment of the present disclosure.

FIG. 22 is a diagram illustrating that electrical signals are applied to first electrodes and second electrodes according to an embodiment of the present disclosure. Referring to FIG. 22, the first display region 101 includes at least one first sub-pixel row. The at least one first sub-pixel row includes the plurality of first sub-pixels 11 in a second direction. The included angle between the first direction and the second direction is greater than or equal to 0° and less than 90°. It is to be noted that the first electrode 21 and the second electrode 22 are disposed in the first direction. The plurality of first sub-pixels 11 in the at least one first sub-pixel row are disposed in the second direction. For simplicity, in each embodiment of the present disclosure, the first direction is parallel to the second direction. In fact, the first direction may not be parallel to the second direction, as long as the included angle between the first direction and the second direction is greater than or equal to 0° and less than 90°. In the stage of capturing, first signals with opposite electrical polarities are applied to first electrodes 21 in two adjacent electrode groups 20 disposed in the same first sub-pixel row; second signals with opposite electrical polarities are applied to second electrodes 22 in two adjacent electrode groups 20 disposed in the same first sub-pixel row.

Exemplarily, referring to FIG. 22, in the first direction, the first electrodes 21 alternate with the second electrodes 22. In the stage of capturing, electrical signals sequentially applied to a plurality of first electrodes 21 are a positive first signal S1+, a negative first signal S1−, a positive first signal S1+, a negative first signal S1−, . . . ; electrical signals sequentially applied to a plurality of second electrodes 22 are a positive second signal S2+, a negative second signal S2−, a positive second signal S2+, a negative second signal S2−, . . . A positive electrical signal indicates an electrical signal whose voltage is positive. A negative electrical signal indicates an electrical signal whose voltage is negative.

Exemplarily, referring to FIG. 22, in the stage of capturing, electrical signals sequentially applied to a plurality of first electrodes 21 and a plurality of second electrodes 22 are a positive first signal S1+, a negative second signal S2−, a negative first signal S1−, a positive second signal S2+, a positive first signal S1+, a negative second signal S2−, . . . . A horizontal electric field is formed between a first electrode 21 to which a positive first signal S1+ is applied and a second electrode 22 to which a negative second signal S2− is applied. A horizontal electric field is formed between a first electrode 21 to which a negative first signal S1− is applied and a second electrode 22 to which a positive second signal S2+ is applied.

Optionally, the first signals include data voltage signals, and the second signals include source voltage signals. A data voltage signal is a voltage signal processed by a multiplexer in the stage of capturing. A source voltage signal is a voltage signal directly output by a driver chip but not processed by the multiplexer in the stage of capturing. It is to be noted that a pixel voltage applied to a first electrode 21 or a second electrode 22 is a voltage processed by the multiplexer. Different from the data voltage signal, the pixel voltage is a voltage signal processed by the multiplexer in the stage of display.

Figure 23:
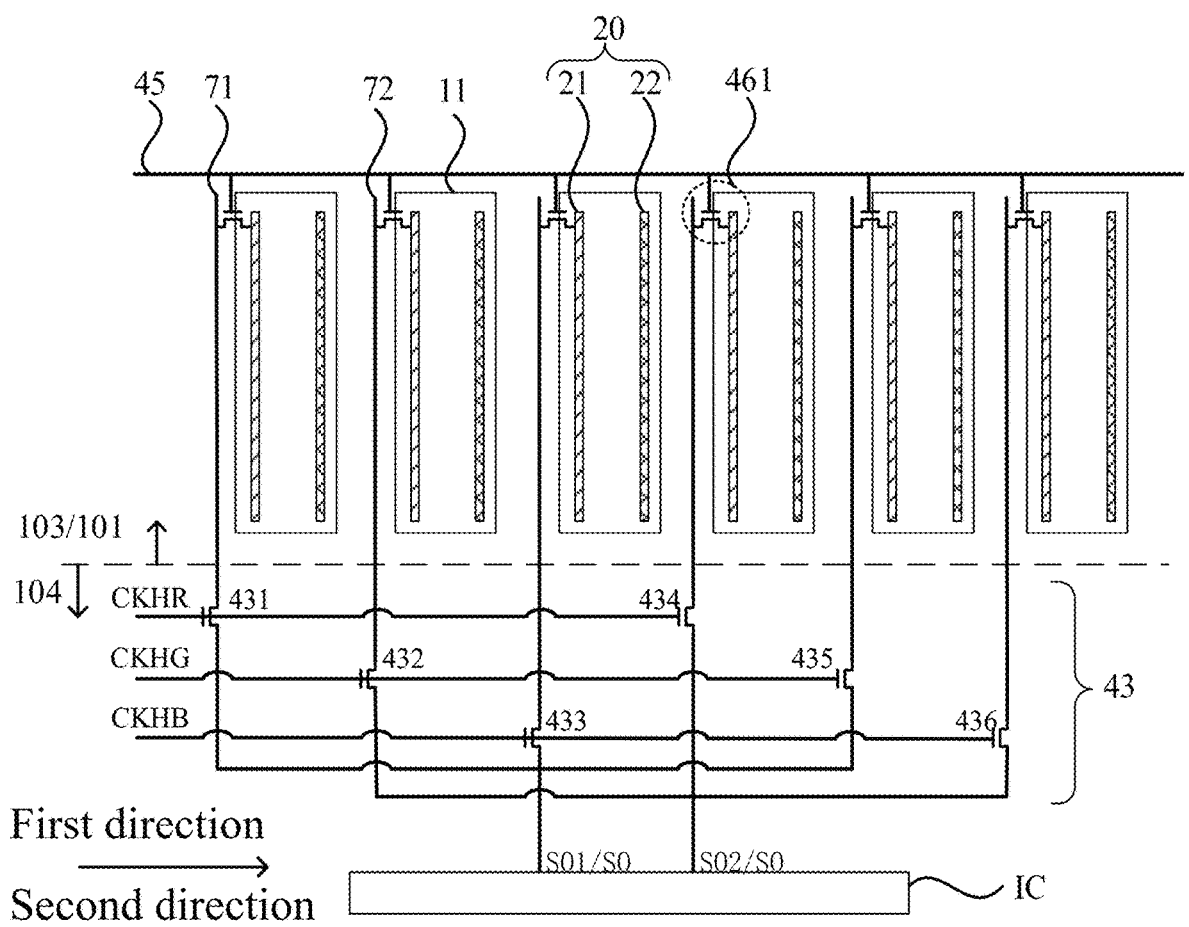
FIG. 23 is a top view illustrating the structure of another display panel according to an embodiment of the present disclosure.

FIG. 23 is a top view illustrating the structure of another display panel according to an embodiment of the present disclosure. Referring to FIGS. 1 and 23, the display panel includes a step region 104 disposed at the periphery of the display region 103. Generally, the area of the array substrate 40 as shown in FIG. 7 is greater than the area of the opposing substrate 50. In the direction perpendicular to the plane in which the first substrate 41 is located, the opposing substrate 50 cannot completely cover the array substrate 40. The region that is on the array substrate 40 and is not covered by the opposing substrate 50 corresponds to the step region 104. The display panel further includes a multiplexer 43 disposed in the step region 104. The display panel further includes first connection lines 71 and second connection lines 72. A first connection line 71 and a second connection line 72 are electrically connected to the first electrodes 21 in two adjacent electrode groups. In the stage of capturing, the electrical polarity of the first signal on the first connection line 71 is opposite to the electrical polarity of the first signal on the second connection line 72. The first connection lines 71 and the second connection lines 72 are all electrically connected to the multiplexer 43. In this embodiment of the present disclosure, the first connection lines 71 and the second connection lines 72 are all electrically connected to the multiplexer 43. In the stage of capturing, the first signals with opposite polarities are applied to the first connection line 71 and the second connection line 72. Accordingly, data voltage signals with opposite electrical polarities are applied to the first electrodes 21 in two adjacent electrode groups 20 disposed in the same first sub-pixel row.

Exemplarily, referring to FIG. 23, a driver chip IC includes a plurality of source terminals SO. The source terminals SO include a first source terminal SO1 and a second source terminal SO2. The multiplexer 43 includes a first selector switch 431, a second selector switch 432, a third selector switch 433, a fourth selector switch 434, a fifth selector switch 435, and a sixth selector switch 436. The gate of the first selector switch 431 and the gate of the fourth selector switch 434 are both electrically connected to a first clock control terminal CKHR. The gate of the second selector switch 432 and the gate of the fifth selector switch 435 are both electrically connected to a second clock control terminal CKHG. The gate of the third selector switch 433 and the gate of the sixth selector switch 436 are both electrically connected to a third clock control terminal CKHB. The first pole of the first selector switch 431, the first pole of the third selector switch 433, and the first pole of the fifth selector switch 435 are all electrically connected to the first connection line 71. The second pole of the first selector switch 431, the second pole of the third selector switch 433, and the second pole of the fifth selector switch 435 are all electrically connected to the first source terminal SO1. The first pole of the second selector switch 432, the first pole of the fourth selector switch 434, and the first pole of the sixth selector switch 436 are all electrically connected to the second connection line 72. The second pole of the second selector switch 432, the second pole of the fourth selector switch 434, and the second pole of the sixth selector switch 436 are all electrically connected to the second source terminal SO2. When the first clock control terminal CKHR turns on the first selector switch 431 and the fourth selector switch 434, the first source terminal SO1 applies a voltage signal to the first connection line 71 electrically connected to the first selector switch 431 and the second source terminal SO2 applies a voltage signal to the second connection line 72 electrically connected to the fourth selector switch 434. When the second clock control terminal CKHG turns on the second selector switch 432 and the fifth selector switch 435, the first source terminal SO1 applies a voltage signal to the second connection line 72 electrically connected to the second selector switch 432 and the second source terminal SO2 applies a voltage signal to the first connection line 71 electrically connected to the fifth selector switch 435. When the third clock control terminal CKHB turns on the third selector switch 433 and the sixth selector switch 436, the first source terminal SO1 applies a voltage signal to the first connection line 71 electrically connected to the third selector switch 433 and the second source terminal SO2 applies a voltage signal to the second connection line 72 electrically connected to the sixth selector switch 436. It is to be understood that every three first electrodes 21 may share the same source terminal SO so as to reduce the number of the source terminals SO that are used.

Optionally, referring to FIG. 23, the display panel further includes a plurality of scanning lines 45 (FIG. 23 illustrates the example of one scanning line 45). At least part of the scanning lines 45 are disposed in the first display region 101. The scanning lines 45 extend in the second direction. The display panel further includes first switch transistors 461 disposed in the first display region 101. The gate of a first switch transistor 461 is electrically connected to a respective scanning line 45. The first pole of the first switch transistor 461 is electrically connected to a respective first electrode 21. The second pole of the first switch transistor 461 is electrically connected to a respective first connection line 71 or a respective second connection line 72. In this embodiment of the present disclosure, the first electrode 21 is electrically connected to the first connection line 71 or the second connection line 72 through the first switch transistor 461. In the stage of display, the second electrodes 22 receive common voltages. The first switch transistor 461 turns on under the action of an effective electrical level provided by the scanning line 45. Pixel voltages transmitted on the first connection line 71 and the second connection line 72 are transmitted to the first electrodes 21 through the first switch transistors 461 that turn on. The liquid-crystal molecules rotate under the action of the electric field formed by a first electrode 21 and a second electrode 22 so as to perform a normal screen display. In the stage of capturing, the first switch transistor 461 turns on under the action of the effective electrical level provided by the scanning line 45. The first signals with opposite polarities are applied to the first connection line 71 and the second connection line 72. Accordingly, data voltage signals with opposite electrical polarities are applied to two adjacent first electrodes 21 disposed in the same first sub-pixel row.

Figure 24:
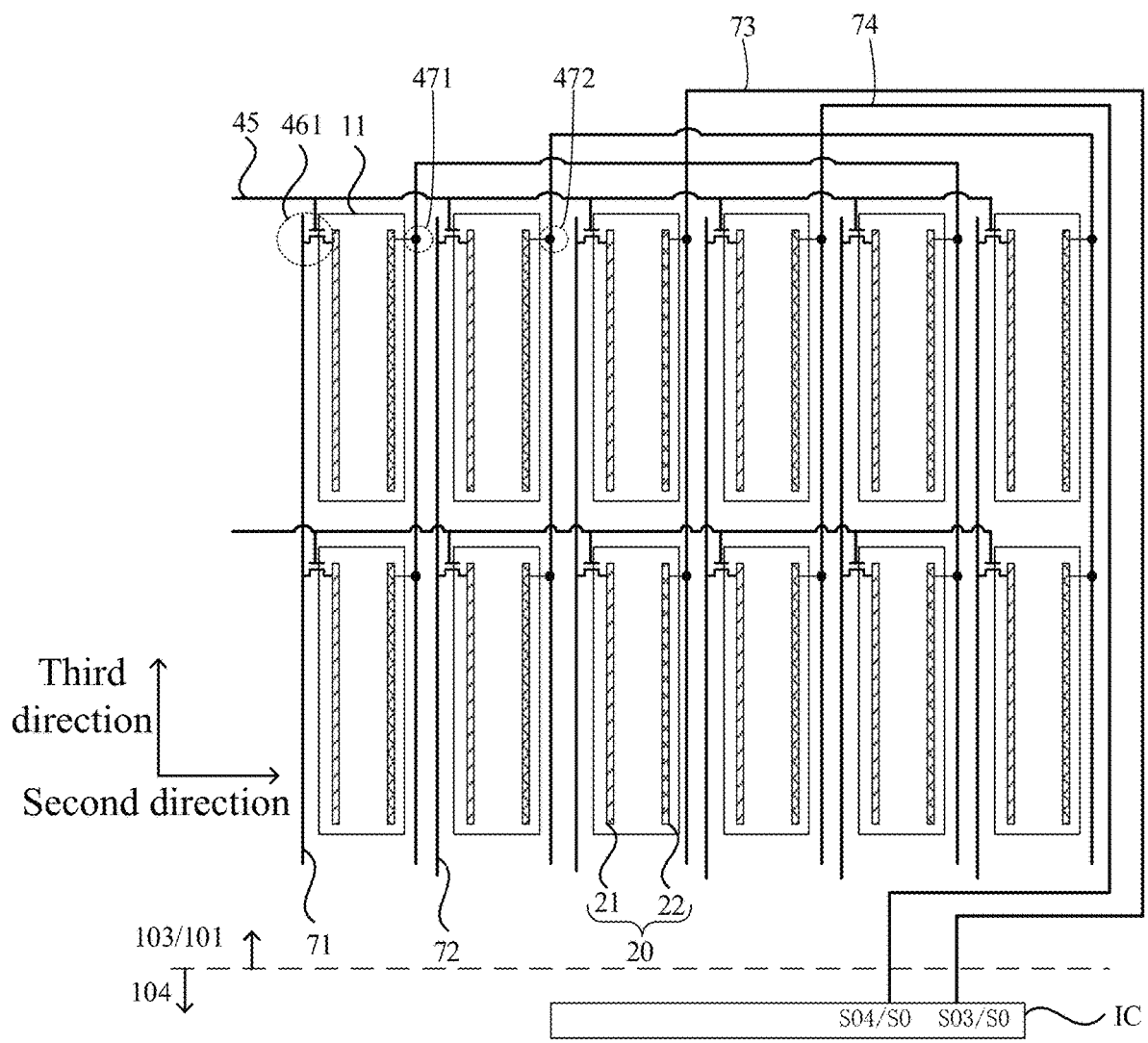
FIG. 24 is a top view illustrating the structure of another display panel according to an embodiment of the present disclosure.

FIG. 24 is a top view illustrating the structure of another display panel according to an embodiment of the present disclosure. It is to be noted that to clearly illustrate the connection relationship of second electrodes 22 and the signal transmission relationship of second electrodes 22, FIG. 24 omits part of the connection relationship of first electrodes 21 and part of the signal transmission relationship of first electrodes 21. Referring to FIG. 24, the display panel further includes third connection lines 73 and fourth connection lines 74. A third connection line 73 and a fourth connection line 74 are electrically connected to the second electrodes 22 in two adjacent electrode groups 20. In the stage of capturing, the electrical polarity of the second signal on the third connection line 73 is opposite to the electrical polarity of the second signal on the fourth connection line 74. The third connection lines 73 and the fourth connection lines 74 are all electrically connected to a driver chip IC. In this embodiment of the present disclosure, the third connection lines 73 and the fourth connection lines 74 are all electrically connected to the driver chip IC. In the stage of capturing, the second signals with opposite electrical polarities are applied to the third connection line 73 and the fourth connection line 74. Accordingly, data voltage signals with opposite electrical polarities are applied to two adjacent second electrodes 22 disposed in the same first sub-pixel row. In the stage of display, common voltages are applied to the third connection line 73 and the fourth connection line 74 respectively so that the second electrodes 22 receive common voltages.

Exemplarily, referring to FIG. 24, the driver chip IC includes a plurality of source terminals SO. The source terminals SO include a third source terminal SO3 and a fourth source terminal SO4. A second electrode 22 in an odd-numbered column is electrically connected to the third source terminal SO3 through the third connection line 73. The third source terminal SO3 applies a voltage signal to the third connection line 73 and thus to the second electrode 22 in an odd-numbered column. A second electrode 22 in an even-numbered column is electrically connected to the fourth source terminal SO4 through the fourth connection line 74. The fourth source terminal SO4 applies a voltage signal to the fourth connection line 74 and thus to the second electrode 22 in an even-numbered column.

Optionally, referring to FIG. 24, each first sub-pixel 11 includes one second electrode 22. A second electrode 22 is electrically connected to the third connection line 73 through a first via 471. A second electrode 22 is electrically connected to the fourth connection line 74 through a second via 472. The first via 471 and the second via 472 are both disposed in the first display region 101. In the second direction, the first via 471 and the second via 472 are both disposed between two adjacent first sub-pixels 11. In this embodiment of the present disclosure, the first via 471 is disposed between the gap of two adjacent first sub-pixels 11, and the second via 471 is disposed between the gap of two adjacent first sub-pixels 11. The first via 471 and the second via 472 do not occupy the space of the first sub-pixels 11 and do not affect the light-emitting display of the first sub-pixels 11.

Figure 25:
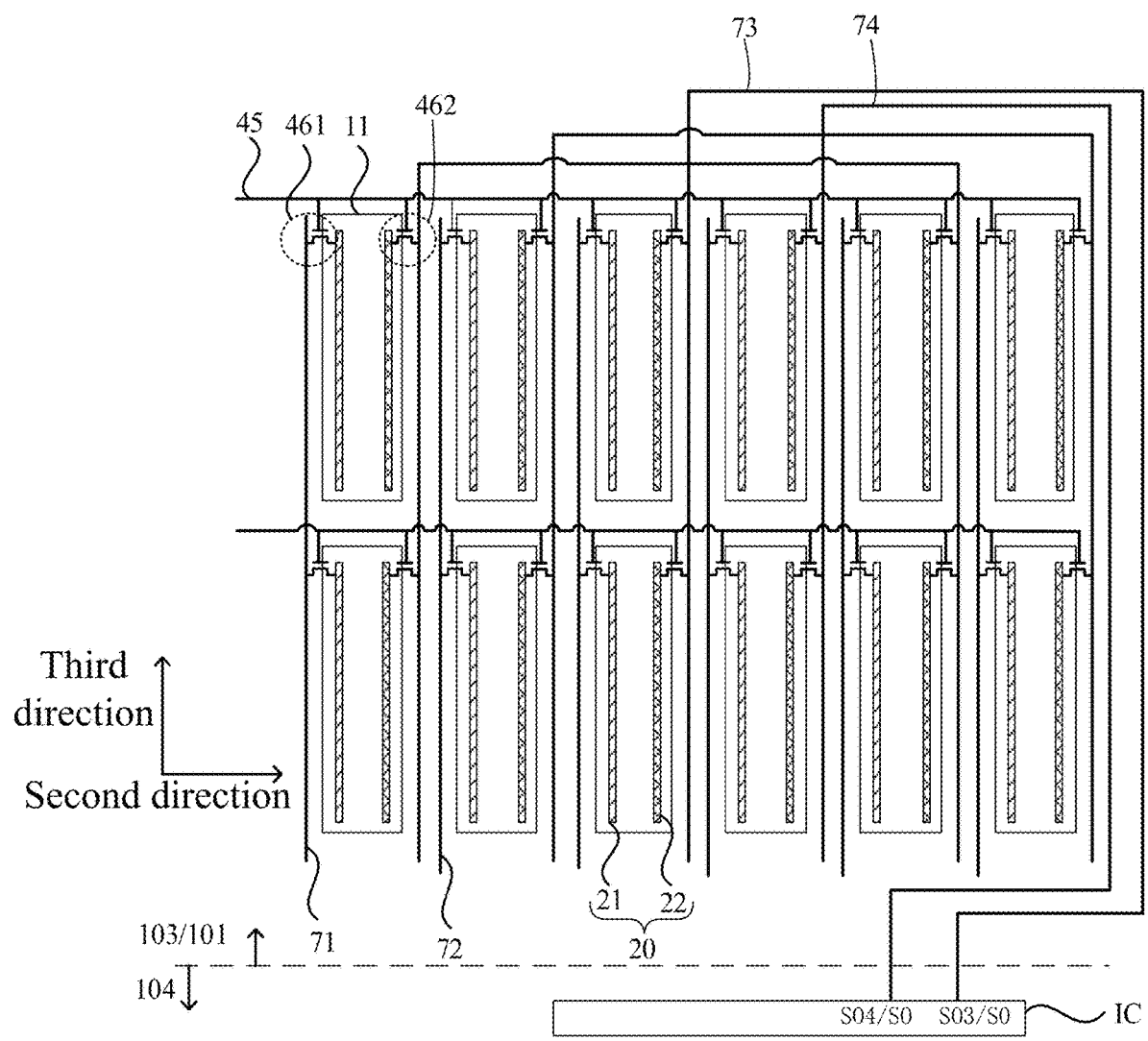
FIG. 25 is a top view illustrating the structure of another display panel according to an embodiment of the present disclosure.

FIG. 25 is a top view illustrating the structure of another display panel according to an embodiment of the present disclosure. Referring to FIG. 25, the display panel further includes a plurality of scanning lines 45. At least part of the scanning lines 45 are disposed in the first display region 101. The scanning lines 45 extend in the second direction. The display panel further includes second switch transistors 462. The gate of a second switch transistor 462 is electrically connected to a respective scanning line 45. The first pole of the second switch transistor 462 is electrically connected to a respective second electrode 22. The second pole of the second switch transistor 462 is electrically connected to a respective third connection line 73 or a respective fourth connection line 74. In this embodiment of the present disclosure, the second electrode 22 is electrically connected to the third connection line 73 or the fourth connection line 74 through the second switch transistor 462. In the stage of display, the effective electrical level provided by the scanning line 45 turns on the second switch transistors 462 in the same first sub-pixel row. Common voltages transmitted on the third connection line 73 and the fourth connection line 74 are transmitted to the second electrodes 22 through the second switch transistors 462 that turn on. Further, the second electrode 22 is electrically connected to the third connection line 73 or the fourth connection line 74 through the second switch transistor 462. When the second switch transistors 462 in one first sub-pixel row turn on, the second switch transistors 462 in other first sub-pixel rows are controlled to turn off. Accordingly, in the stage of display and the stage of capturing, only the second electrodes 462 in one first sub-pixel row need to be driven, but not all the second electrodes 22 need to be driven.

Further, referring to FIG. 25, the gate of the first switch transistor 461 and the gate of the second switch transistor 462 are electrically connected to the same scanning line 45. In the stage of capturing, the effective electrical level provided by the scanning line 45 simultaneously turns on the first switch transistors 461 and the second switch transistors 462 in the same first sub-pixel row. The first electrodes 21 and the second electrodes 22 in the same first sub-pixel row are charged simultaneously. When the first electrodes 21 and the second electrodes 22 in one first sub-pixel row are charged, the first electrodes 21 and the second electrodes 22 in other first sub-pixel rows are not charged. Accordingly, the first electrodes 21 and the second electrodes 22 in a plurality of first sub-pixel rows are charged row by row; the first electrodes 21 and the second electrodes 22 in the same first sub-pixel row are refreshed synchronously; thus the problem of image flashing is avoided.

Figure 26:
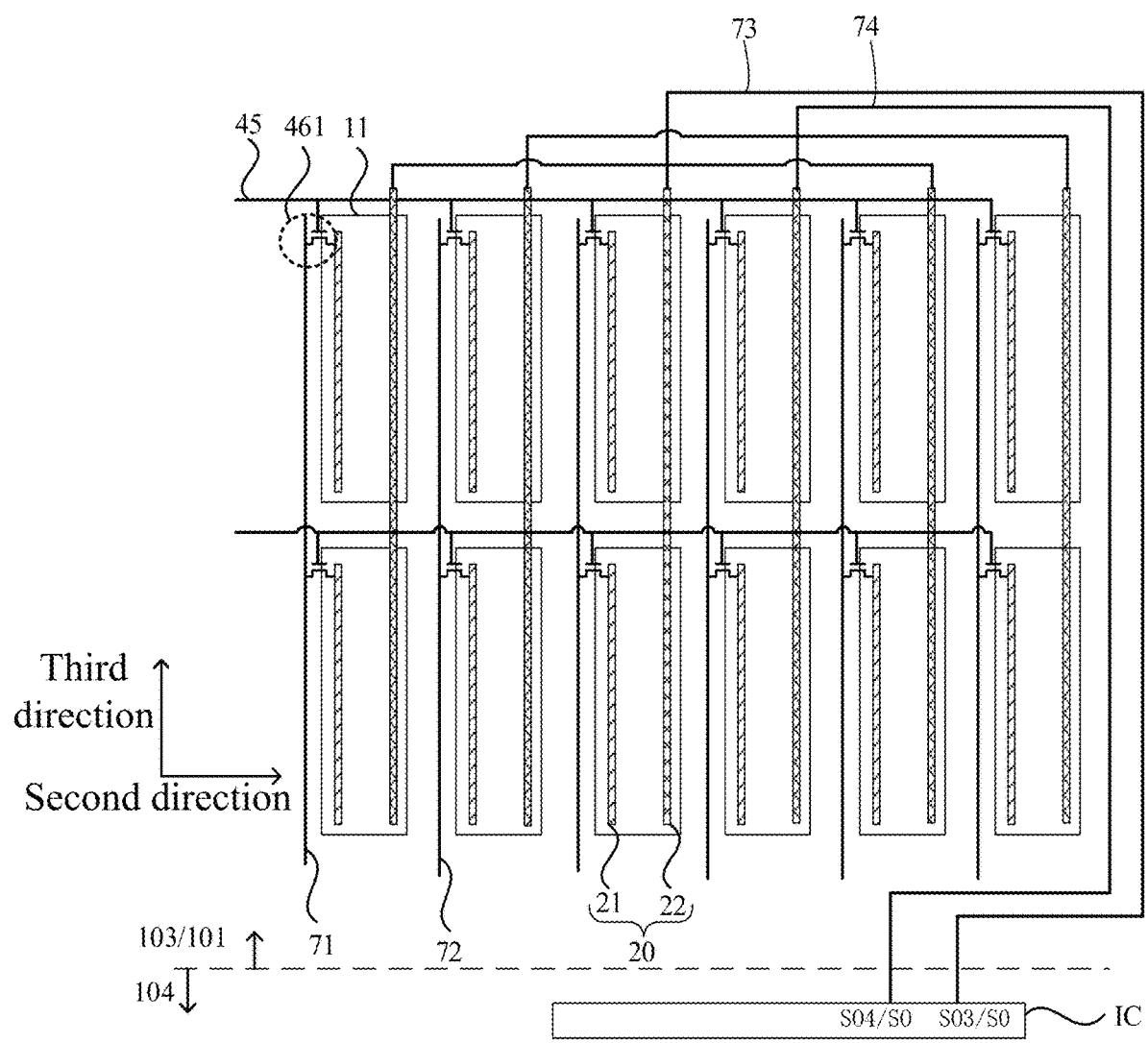
FIG. 26 is a top view illustrating the structure of another display panel according to an embodiment of the present disclosure.

Exemplarily, referring to FIG. 25, in the stage of display, the effective electrical level provided by the scanning line 45 simultaneously turns on the first switch transistors 461 and the second switch transistors 462 in the same first sub-pixel row. Pixel voltages transmitted on the first connection line 71 and the second connection line 72 are transmitted to the first electrodes 21 through the first switch transistors 461 that turn on. Common voltages transmitted on the third connection line 73 and the fourth connection line 74 are transmitted to the second electrodes 22 through the second switch transistors 462 that turn on. FIG. 26 is a top view illustrating the structure of another display panel according to an embodiment of the present disclosure. Referring to FIG. 26, a plurality of first sub-pixel rows are disposed in a third direction. The third direction intersects the first direction and the second direction. In one embodiment, the second direction may be perpendicular to the third direction. In another embodiment, the second direction may be not perpendicular to the third direction, and the included angle between the second direction and the third direction is greater than 0° and less than 90°. In the third direction, first sub-pixels 11 disposed in one column in the plurality of first sub-pixels 11 use the same second electrode 22. In this embodiment of the present disclosure, in the third direction, first sub-pixels 11 disposed in one column use the same second electrode 22. Accordingly, it is unnecessary to provide multiple connection vias for the first sub-pixels 11 disposed in one column in the third direction. This reduces the space occupied by the connection vias in the first display region 101, increases the space occupied by the first sub-pixels 11 in the first display region 101, and enhances the transmittance of the first display region 101. Further, the second electrode 22 shared by first sub-pixels 11 disposed in one column in the third direction is connected to the third connection line 73 or the fourth connection line 74. Accordingly, the connection via between the second electrode 22 and the third connection line 73 or the fourth connection line 74 is disposed outside the first display region 101 so as to enhance the transmittance of the first display region 101.

Figure 27:
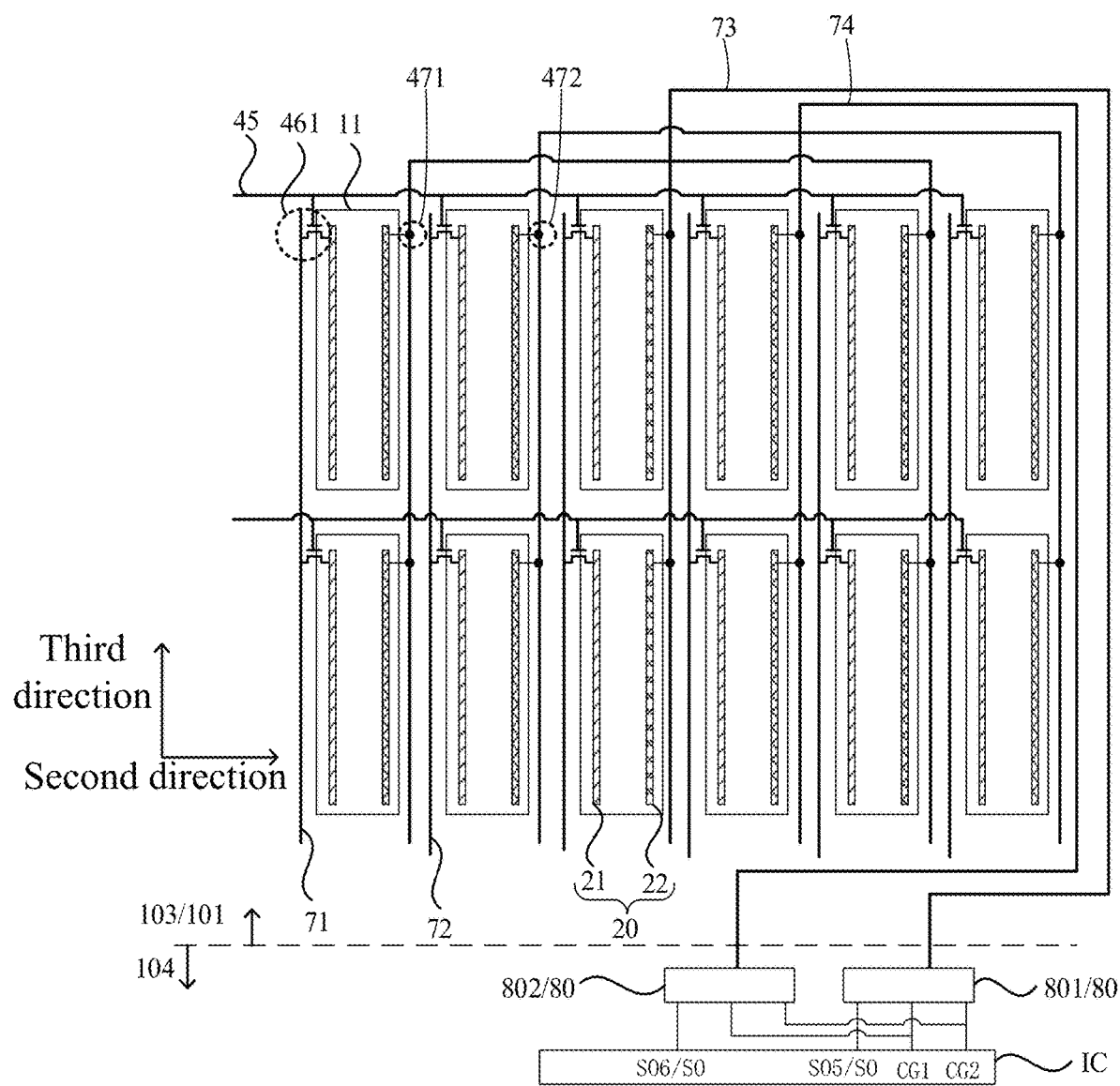
FIG. 27 is a top view illustrating the structure of another display panel according to an embodiment of the present disclosure.
Figure 28:
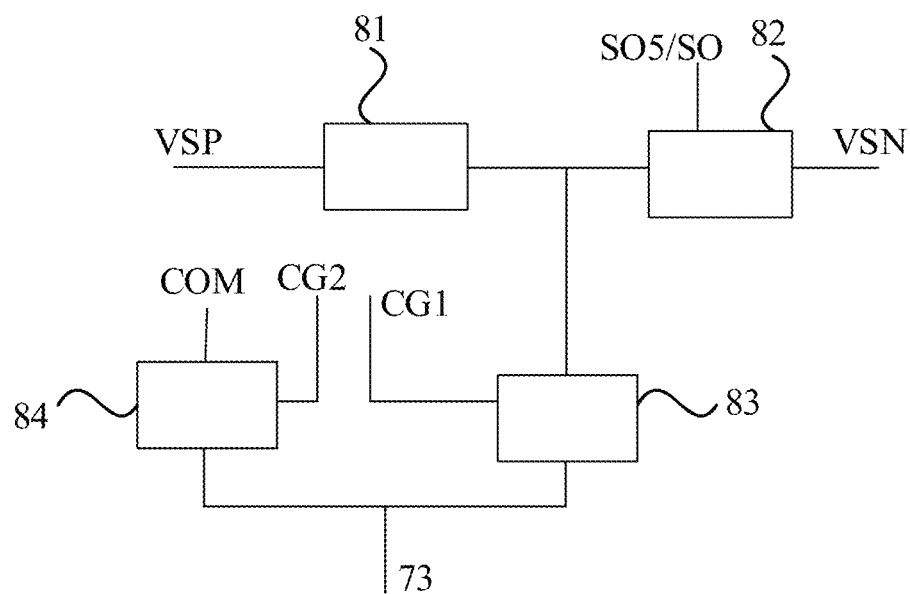
FIG. 28 is a circuit diagram of a signal control circuit according to an embodiment of the present disclosure.

FIG. 27 is a top view illustrating the structure of another display panel according to an embodiment of the present disclosure. FIG. 28 is a circuit diagram of a signal control circuit according to an embodiment of the present disclosure. Referring to FIGS. 27 and 28, the driver chip IC includes a first control terminal CG1, a second control terminal CG2, and source terminals SO. The display panel further includes signal control circuits 80. A signal control circuit 80 includes a first voltage input unit 81, a second voltage input unit 82, a switch unit 83, and a common voltage input unit 84. The first end of the first voltage input unit 81 is electrically connected to a first power supply terminal VSP. The second end of the first voltage input unit 81 is electrically connected to the first end of the switch unit 83. The control terminal of the second voltage input unit 82 is electrically connected to a source terminal SO. The first end of the second voltage input unit 82 is electrically connected to the first end of the switch unit 83. The second end of the second voltage input unit 82 is electrically connected to a second power supply terminal VSN. The control terminal of the switch unit 83 is electrically connected to the first control terminal CG1. The second end of the switch unit 83 is electrically connected to the third connection lines 73 or the fourth connection lines 74 (FIG. 28 illustrates the example in which the signal control circuit 80 drives the third connection lines 73). The control terminal of the common voltage input unit 84 is electrically connected to the second control terminal CG2. The first end of the common voltage input unit 84 is electrically connected to the second end of the switch unit 83. The second end of the common voltage input unit 84 is electrically connected to a common voltage terminal COM. In the stage of capturing, the transmittance of the first display region 101 needs to be as great as possible, that is, the ambient light passing through the first display region 101 needs to be as much as possible. Accordingly, the voltage difference between the first electrode 21 and the second electrode 22 is relatively great, thereby increasing the requirement of the driving circuit that drives the first electrode 21 and the second electrode 22. In this embodiment of the present disclosure, the signal control circuits 80 are used for driving the third connection lines 73 and the fourth connection lines 74. The signal control circuits 80 are specially-provided driving circuits with strong driving capability so that the capability of driving the third connection lines 73 and the fourth connection lines 74 is enhanced.

Exemplarily, referring to FIGS. 27 and 28, a plurality of source terminals SO include a fifth source terminal SO5 and a sixth source terminal SO6. The display panel includes two signal control circuits 80, that is, a first signal control circuit 801 and a second signal control circuit 802. The first control terminal CG1, the second control terminal CG2, and the fifth source terminal SO5 are all electrically connected to the first signal control circuit 801. The first signal control circuit 801 is electrically connected to the third connection line 73 for driving the third connection line 73. The first control terminal CG1, the second control terminal CG2, and the sixth source terminal SO6 are all electrically connected to the second signal control circuit 802. The second signal control circuit 802 is electrically connected to the fourth connection line 74 for driving the fourth connection line 74. The first signal control circuit 801 and the second signal control circuit 802 may have the same circuit configuration or different circuit configurations.

Exemplarily, referring to FIG. 28, in the stage of capturing, the fifth source terminal SO5 and the sixth source terminal SO6 output signals with opposite electrical polarities so that signals with opposite electrical polarities are applied to the third connecting line 73 and the fourth connecting line 74 respectively. Further, signals with opposite electrical polarities are applied to two adjacent first electrodes 21 disposed in the same first sub-pixel row respectively. The signals output by the fifth source terminal SO5 and the sixth source terminal SO6 may be data voltage signals flipped as the frame is reversed. Accordingly, data voltage signals with opposite electrical polarities are applied to two adjacent first electrodes 21 disposed in the same first sub-pixel row respectively, and the phase of a voltage difference of the first electrode 21 to the second electrode 22 is reversed as the frame is reversed. It is to be noted that a frame in the stage of capturing refers to the time for completing a full charge for all the first electrodes 21 and the second electrodes 22.

Exemplarily, referring to FIG. 28, the voltage output by the first power supply terminal VSP is greater than the voltage output by the second power supply terminal VSN. For example, the voltage output by the first power supply terminal VSP is +5 V; the voltage output by the second power supply terminal VSN is −5 V. Alternatively, the voltage output by the first power supply terminal VSP is +5.7 V; the voltage output by the second power supply terminal is −5.7 V. The common voltage terminal COM outputs a common voltage. The common voltage, for example, may be 0 V. The operation process of a signal control circuit 80 (for example, a signal control circuit 80 that drives the third connection line 73) includes a positive voltage output process, a negative voltage output process, and a common voltage output process. In the positive voltage output process, the first control terminal CG1 controls the switch unit 83 to turn on; the second control terminal CG2 controls the common voltage input unit 84 to turn off; the fifth source terminal SO5 controls the second voltage input unit 82 to turn off; an electrical signal output by the first source terminal VSP is transmitted to the first end of the switch unit 83 through the first end of the first voltage input unit 81 and is transmitted to the third connection line 73 through the second end of the switch unit 83. In the negative voltage output process, the first control terminal CG1 controls the switch unit 83 to turn on; the second control terminal CG2 controls the common voltage input unit 84 to turn off; the fifth source terminal SO5 controls the second voltage input unit 82 to turn on; an electrical signal output by the second source terminal VSN is transmitted to the first end of the switch unit 83 through the first end of the second voltage input unit 82 and is transmitted to the third connection line 73 through the second end of the switch unit 83. In the common voltage output process, the first control terminal CG1 controls the switch unit 83 to turn off; the second control terminal CG2 controls the common voltage input unit 84 to turn on; a common voltage output by the common voltage terminal COM is transmitted to the third connection line 73 through the second end of the common voltage input unit 84.

Figure 29:
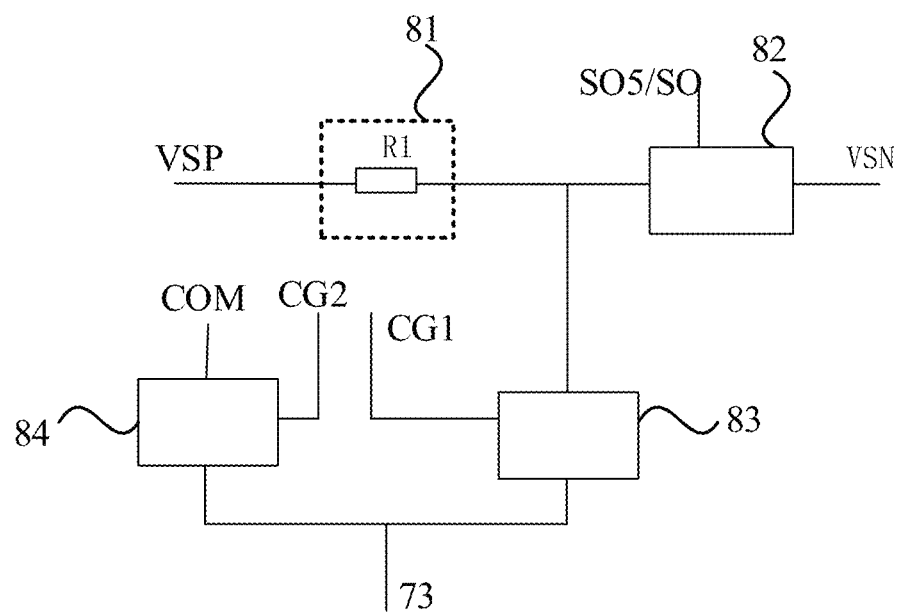
FIG. 29 is a circuit diagram of another signal control circuit according to an embodiment of the present disclosure.

FIG. 29 is a circuit diagram of another signal control circuit according to an embodiment of the present disclosure. Referring to FIG. 29, the first voltage input unit 81 includes a first resistor R1. The first end of the first resistor R1 is electrically connected to the first power supply terminal VSP. The second end of the first resistor R1 is electrically connected to the first end of the switch unit 83. In this embodiment of the present disclosure, the first voltage input unit 81 includes the first resistor R1. With a simple structure, the first voltage input unit 81 does not need to be provided with a control terminal. Accordingly, the circuit structure of the signal control circuit 80 is simplified. This embodiment of the present disclosure provides the first resistor R1 so as to reduce the current in circuits and prevent an excessive current from causing short circuits when the first power supply terminal VSP and the second power supply terminal VSN turn on. With this arrangement, the resistance of the first resistor R1 may be greater than 1000 ohms.

Figure 30:
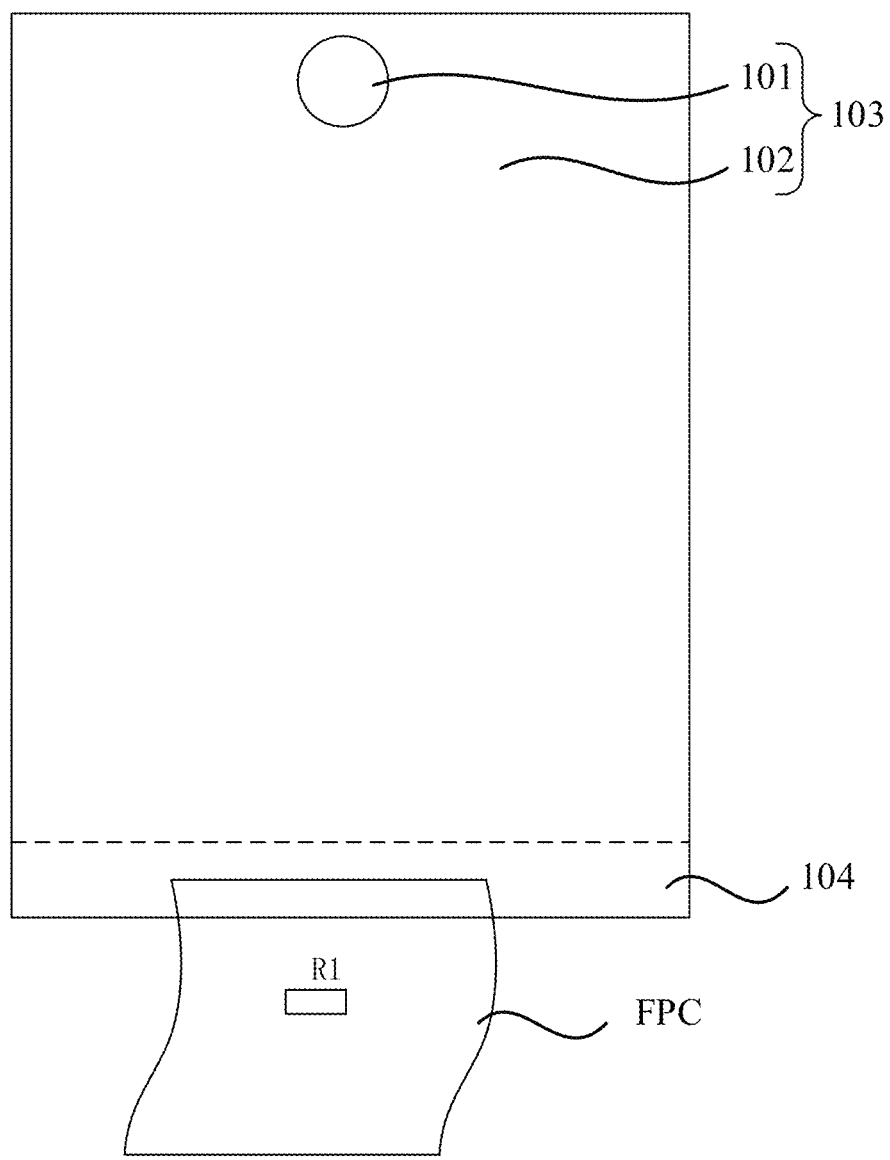
FIG. 30 is a top view illustrating the structure of another display panel according to an embodiment of the present disclosure.

FIG. 30 is a top view illustrating the structure of another display panel according to an embodiment of the present disclosure. Referring to FIGS. 29 and 30, the display panel includes a step region 104 disposed at the periphery of the display region 103. The display panel further includes a flexible printed circuit board FPC bound to the step region 104. A first resistor R1 is disposed on the flexible printed circuit board FPC. In this embodiment of the present disclosure, the first resistor R1 is disposed on the flexible printed circuit board FPC. On one hand, the first resistor R1 is prevented from occupying the space of the step region 104. On the other hand, it is convenient to replace the first resistor R1 so as to achieve the debugging and maintenance of a signal control circuit 80.

Exemplarily, the resistance value of the first resistor R1 is greater than or equal to 100000 ohms and smaller than or equal to 1000000 ohms.

Figure 31:
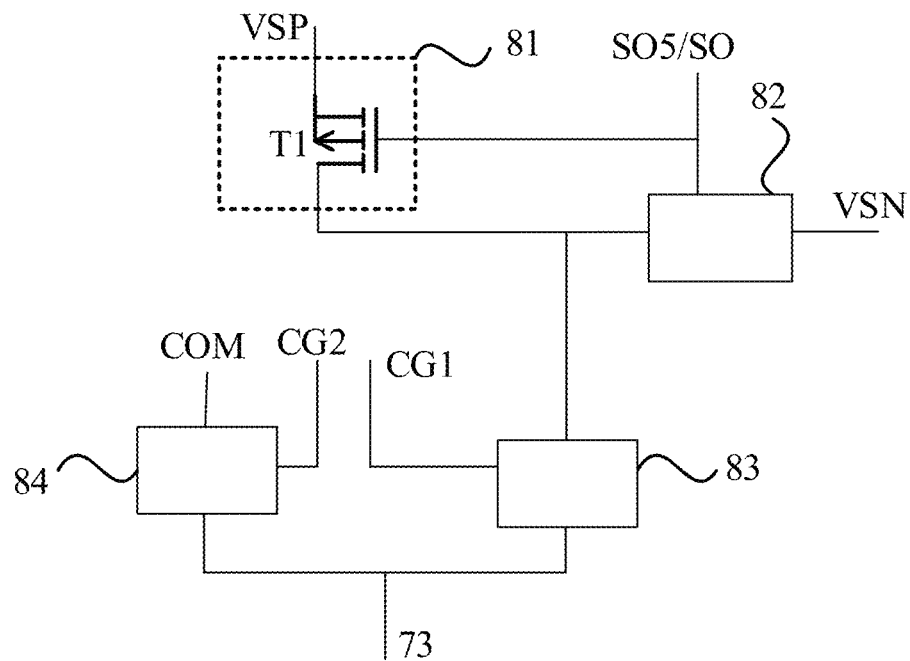
FIG. 31 is a circuit diagram of another signal control circuit according to an embodiment of the present disclosure.

FIG. 31 is a circuit diagram of another signal control circuit according to an embodiment of the present disclosure. Referring to FIG. 31, the first voltage input unit 81 includes a first transistor T1. The gate of the first transistor T1 is electrically connected to a source terminal SO (for example, the fifth source terminal S05). The first pole of the first transistor T1 is electrically connected to the first power supply terminal VSP. The second pole of the first transistor T1 is electrically connected to the first end of the switch unit 83. In this embodiment of the present disclosure, the first voltage input unit 81 includes the first transistor T1. The gate of the first transistor T1 and the control end of the second voltage input unit 82 are both electrically connected to the source end SO. When the first transistor T1 turns on, the second voltage input unit 82 turns off and an electrical signal output by the first power supply terminal VSP is transmitted through the first transistor T1 to the first end of the switch unit 83. When the first transistor T1 turns off, the second voltage input unit 82 turns on and an electrical signal output by the second power supply terminal VSN is transmitted through the second voltage input unit 82 to the first end of the switch unit 83.

Figure 32:
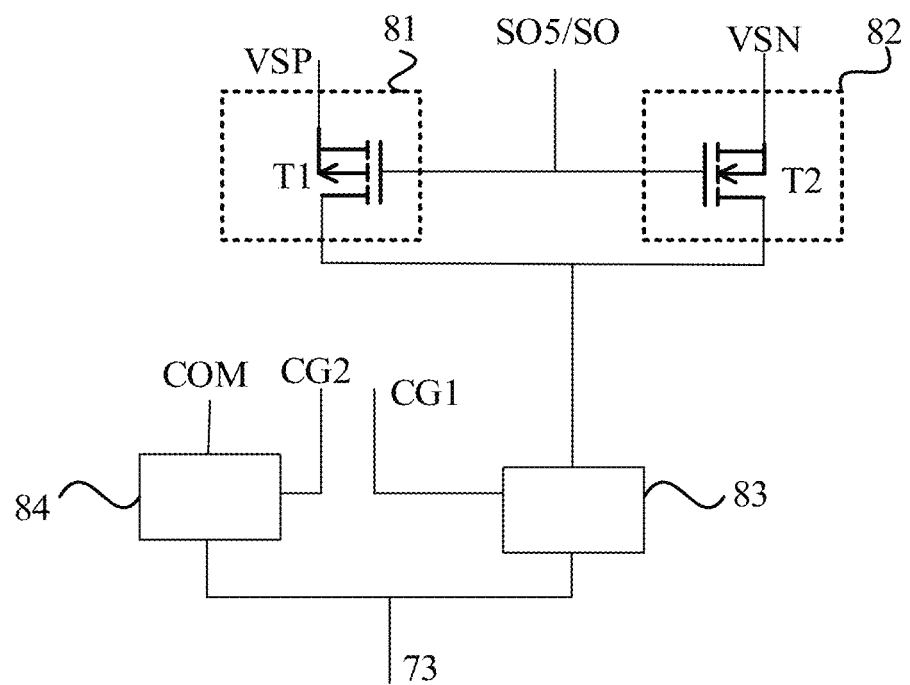
FIG. 32 is a circuit diagram of another signal control circuit according to an embodiment of the present disclosure.

FIG. 32 is a circuit diagram of another signal control circuit according to an embodiment of the present disclosure. Referring to FIG. 32, the second voltage input unit 82 includes a second transistor T2. The gate of the second transistor T2 is electrically connected to a source terminal SO (for example, the fifth source terminal S05). The first pole of the second transistor T2 is electrically connected to the first end of the switch unit 83. The second pole of the second transistor T2 is electrically connected to the second power supply terminal VSN. In this embodiment of the present disclosure, when the source terminal SO applies an effective electrical level to the gate of the second transistor T2, the second transistor T2 is controlled to turn on and an electrical signal output by the second power supply terminal VSN is transmitted through the second transistor T2 to the first end of the switch unit 83.

Figure 33:
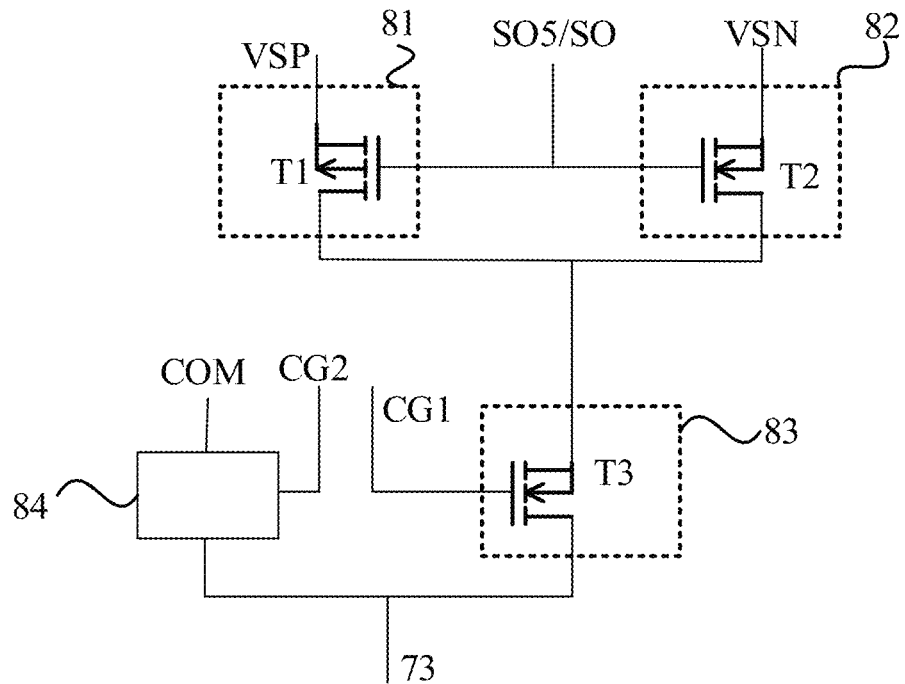
FIG. 33 is a circuit diagram of another signal control circuit according to an embodiment of the present disclosure.

FIG. 33 is a circuit diagram of another signal control circuit according to an embodiment of the present disclosure. Referring to FIG. 33, the switch unit 83 includes a third transistor T3. The gate of the third transistor T3 is electrically connected to the first control terminal CG1. The first pole of the third transistor T3 is electrically connected to the second end of the first voltage input unit 81. The first pole of the third transistor T3 is electrically connected to the second end of the second voltage input unit 82. The second pole of the third transistor T3 is electrically connected to the third connection lines 73 or the fourth connection lines 74 (for example, the signal control circuit 80 drives the third connection lines 73). In this embodiment of the present disclosure, when the first control terminal CG1 applies an effective electrical level to the gate of the third transistor T3, the third transistor T3 is controlled to turn on and an electrical signal output by the first power supply terminal VSP is transmitted through the third transistor T3 to the third connection line 73 or the fourth connection line 74.

Figure 34:
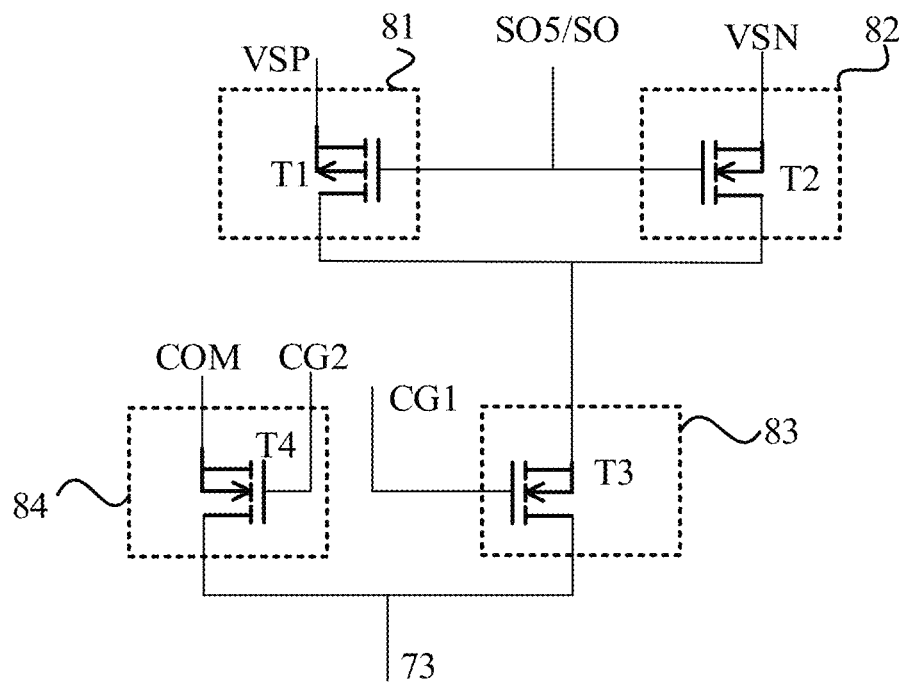
FIG. 34 is a circuit diagram of another signal control circuit according to an embodiment of the present disclosure.

FIG. 34 is a circuit diagram of another signal control circuit according to an embodiment of the present disclosure. Referring to FIG. 34, the common voltage input unit 84 includes a fourth transistor T4. The gate of the fourth transistor T4 is electrically connected to the second control terminal CG2. The first pole of the fourth transistor T4 is electrically connected to the second end of the switch unit 83. The second pole of the fourth transistor T4 is electrically connected to the common voltage terminal COM. In this embodiment of the present disclosure, when the second control terminal CG2 applies an effective electrical level to the gate of the fourth transistor T4, the fourth transistor T4 is controlled to turn on and a common voltage output by the common voltage terminal COM is transmitted through the fourth transistor T4 to the third connection line 73 or the fourth connection line 74.

Exemplarily, referring to FIG. 34, the third transistor T3 and the fourth transistor T4 are each an N-type transistor. In the stage of capturing, a first electrical level is applied to the first control terminal CG1 to control the third transistor T3 to turn on and a second electrical level is applied to the second control terminal CG2 to control the fourth transistor T4 to turn off. In the stage of display, a second electrical level is applied to the first control terminal CG1 to control the third transistor T3 to turn off and a first electrical level is applied to the second control terminal CG2 to control the fourth transistor T4 to turn on. The first electrical level is greater than the second electrical level. Comparatively, the first electrical level is a high electrical level and the second electrical level is a low electrical level. In this embodiment of the present disclosure, in the stage of capturing, a high electrical level is applied to the first control terminal CG1, and a low electrical level is applied to the second control terminal CG2; in this case, the third transistor T3 is controlled to turn on and the fourth transistor T4 is controlled to turn off. In the stage of display, a low electrical level is applied to the first control terminal CG1, and a high electrical level is applied to the second control terminal CG2; in this case, the third transistor T3 is controlled to turn off and the fourth transistor T4 is controlled to turn on.

In another embodiment, the third transistor T3 and the fourth transistor T4 may be each a P-type transistor. In the stage of capturing, a second electrical level is applied to the first control terminal CG1 to control the third transistor T3 to turn on and a first electrical level is applied to the second control terminal CG2 to control the fourth transistor T4 to turn off. In the stage of display, a first electrical level is applied to the first control terminal CG1 to control the third transistor T3 to turn off and a second electrical level is applied to the second control terminal CG2 to control the fourth transistor T4 to turn on. The first electrical level is greater than the second electrical level. Comparatively, the first electrical level is a high electrical level and the second electrical level is a low electrical level.

Figure 35:
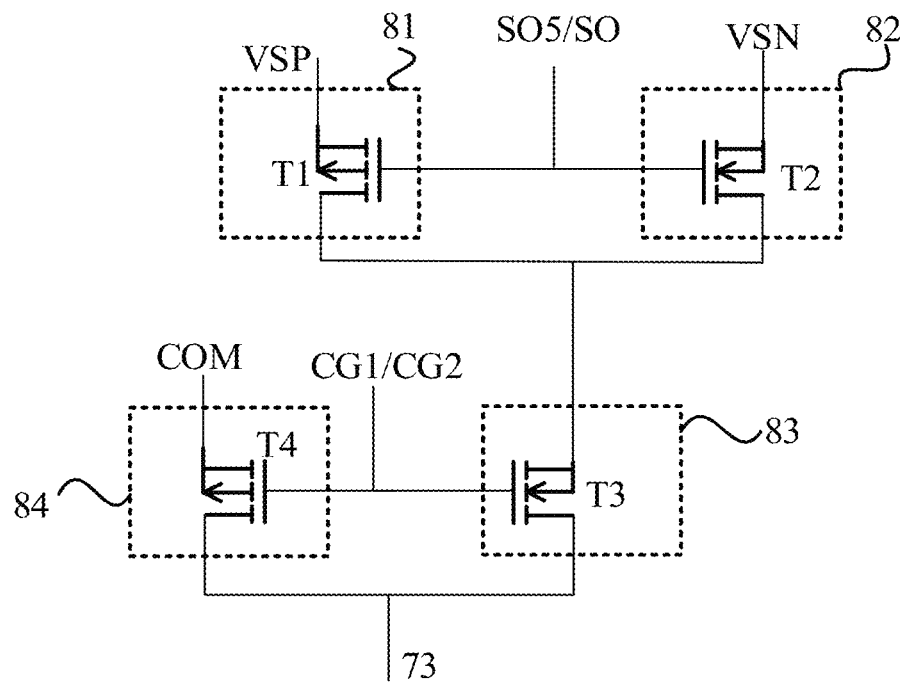
FIG. 35 is a circuit diagram of another signal control circuit according to an embodiment of the present disclosure.

FIG. 35 is a circuit diagram of another signal control circuit according to an embodiment of the present disclosure. Referring to FIG. 35, the third transistor T3 is an N-type transistor, and the fourth transistor T4 is a P-type transistor; alternatively, the third transistor T3 is a P-type transistor, and the fourth transistor T4 is an N-type transistor. The first control terminal CG1 is electrically connected to the second control terminal CG2. In this embodiment of the present disclosure, one of the third transistor T3 and the fourth transistor T4 is a P-type transistor; the other one of the third transistor T3 and the fourth transistor T4 is an N-type transistor. The first control terminal CG1 is electrically connected to the second control terminal CG2. Accordingly, the first control terminal CG1 and the second control terminal CG2 may be combined into one port, thus reducing the occupation of ports on the driver chip IC.

Optionally, referring to FIG. 35, the third transistor T3 is an N-type transistor, and the fourth transistor T4 is a P-type transistor. In the stage of capturing, a first electrical level is applied to the first control terminal CG1 to control the third transistor T3 to turn on and control the fourth transistor T4 to turn off; an electrical signal output by the first power supply terminal VSP or an electrical signal output by the second power supply terminal VSN is transmitted through the third transistor T3 to the third connection line 73 or the fourth connection line 74. In the stage of display, a second electrical level is applied to the first control terminal CG1 to control the third transistor T3 to turn off and control the fourth transistor T4 to turn on; a common voltage output by the common voltage terminal COM is transmitted through the fourth transistor T4 to the third connection line 73 or the fourth connection line 74. The first electrical level is greater than the second electrical level. Comparatively, the first electrical level is a high electrical level and the second electrical level is a low electrical level.

In another embodiment, the third transistor T3 may be a P-type transistor, and the fourth transistor T4 may be an N-type transistor. The first control terminal CG1 is electrically connected to the second control terminal CG2. In this case, in the stage of capturing, a second electrical level is applied to the first control terminal CG1 to control the third transistor T3 to turn on and control the fourth transistor T4 to turn off. In the stage of display, a first electrical level is applied to the first control terminal CG1 to control the third transistor T3 to turn off and control the fourth transistor T4 to turn on. The first electrical level is greater than the second electrical level. Comparatively, the first electrical level is a high electrical level and the second electrical level is a low electrical level.

Exemplarily, referring to any one of FIGS. 32 to 35, the gate of the first transistor T1 and the gate of the second transistor T2 are both electrically connected to the same source terminal SO. The first transistor T1 is a P-type transistor and the second transistor T2 is an N-type transistor. In other embodiments, the first transistor T1 may be an N-type transistor and the second transistor T2 may be a P-type transistor.

Figure 36:
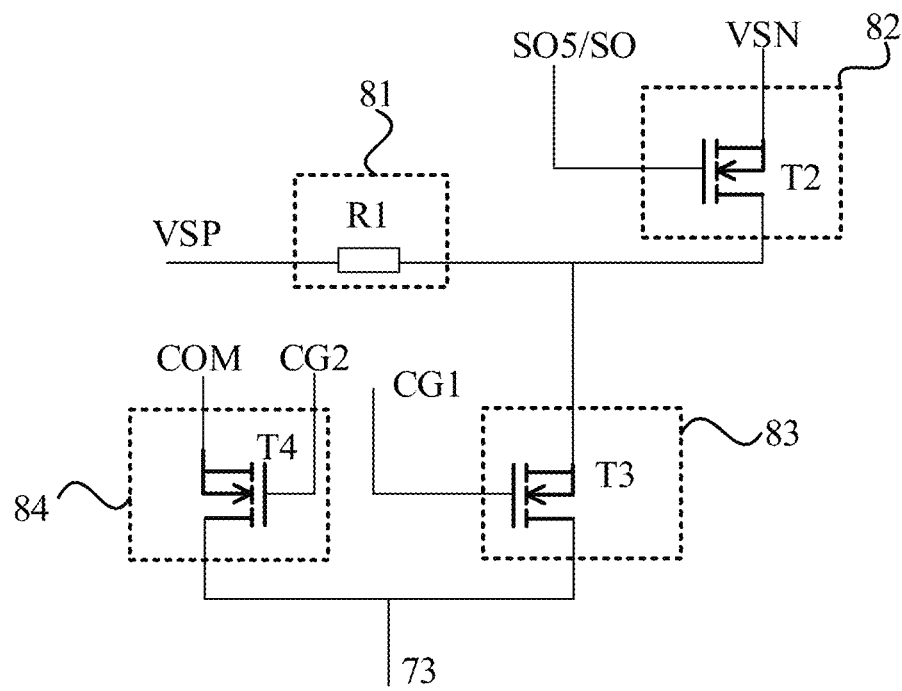
FIG. 36 is a circuit diagram of another signal control circuit according to an embodiment of the present disclosure.

FIG. 36 is a circuit diagram of another signal control circuit according to an embodiment of the present disclosure. Referring to FIG. 36, the first voltage input unit 81 includes a first resistor R1. The first end of the first resistor R1 is electrically connected to the first power supply terminal VSP. The second end of the first resistor R2 is electrically connected to the first end of the switch unit 83. The second transistor T2, the third transistor T3, and the fourth transistor T4 are each an N-type transistor. In other embodiments, the second transistor T2, the third transistor T3, and the fourth transistor T4 may be each a P-type transistor. In this embodiment of the present disclosure, the second transistor T2, the third transistor T3, and the fourth transistor T4 are of the same type. All the transistors in the signal control circuit 80 are of the same type. Accordingly, all the transistors in the signal control circuit 80 may be formed by using the same material in the same film process, which reduces the process difficulty of the signal control circuit 80.

Exemplarily, referring to FIG. 35, the operation process of the signal control circuit 80 is described herein (for example, a signal control circuit 80 that drives the third connection line 73). In the stage of capturing, in the positive voltage output process, a first electrical level is applied to the first control terminal CG1 to control the third transistor T3 to turn on and control the fourth transistor T4 to turn off; a second electrical level is applied to the fifth source terminal SO5 to control the first transistor T1 to turn on and control the second transistor T2 to turn off; an electrical signal output by the first power supply terminal VSP is transmitted through the first pole of the first transistor T1 to the first pole of the third transistor T3 and then through the second pole of the third transistor T3 to the third connection line 73. In the stage of capturing, in the negative voltage output process, a first electrical level is applied to the first control terminal CG1 to control the third transistor T3 to turn on and control the fourth transistor T4 to turn off; a first electrical level is applied to the fifth source terminal SO5 to control the first transistor T1 to turn off and control the second transistor T2 to turn on; an electrical signal output by the second power supply terminal VSN is transmitted through the first pole of the second transistor T2 to the first pole of the third transistor T3 and then through the second pole of the third transistor T3 to the third connection line 73. In the stage of display, a second electrical level is applied to the first control terminal CG1 to control the third transistor T3 to turn off and control the fourth transistor T4 to turn on; a common voltage output by the common voltage terminal COM is transmitted through the second pole of the fourth transistor T4 to the third connection line 73.

Exemplarily, referring to FIG. 36, the operation process of the signal control circuit 80 is described herein (for example, a signal control circuit 80 that drives the third connection line 73). In the stage of capturing, in the positive voltage output process, a first electrical level is applied to the first control terminal CG1 to control the third transistor T3 to turn on; a second electrical level is applied to the second control terminal CG2 to control the fourth transistor T4 to turn off; a second electrical level is applied to the fifth source terminal SO5 to control the second transistor T2 to turn off; an electrical signal output by the first power supply terminal VSP is transmitted through the first end of the first resistor R1 to the first pole of the third transistor T3 and then through the second pole of the third transistor T3 to the third connection line 73. In the stage of capturing, in the negative voltage output process, a first electrical level is applied to the first control terminal CG1 to control the third transistor T3 to turn on; a second electrical level is applied to the second control terminal CG2 to control the fourth transistor T4 to turn off; a second electrical level is applied to the fifth source terminal SO5 to control the second transistor T2 to turn on; an electrical signal output by the second power supply terminal VSN is transmitted through the first pole of the second transistor T2 to the first pole of the third transistor T3 and then through the second pole of the third transistor T3 to the third connection line 73. It is to be noted that the electrical signal output by the first power supply terminal VSP is transmitted to the first pole of the third transistor T3 after passing through the first resistor R1 while the electrical signal output by the second power supply terminal VSN is transmitted to the first pole of the third transistor T3 without passing through the first resistor R1. Accordingly, the voltage of the first pole of the third transistor T3 is represented by the voltage of the electrical signal output by the second power supply terminal VSN. In the stage of display, a second electrical level is applied to the first control terminal CG1 to control the third transistor T3 to turn off, and a first electrical level is applied to the second control terminal CG2 to control the fourth transistor T4 to turn on; a common voltage output by the common voltage terminal COM is transmitted through the second pole of the fourth transistor T4 to the third connection line 73.

With continued reference to FIG. 27, the signal control circuits 80 are disposed in the step region 104. Accordingly, the signal control circuits 80 do not occupy the space of the display region 103 and do not reduce the screen-to-body ratio of the display panel. On the other hand, since the signal control circuits 80 are disposed in the step region 104, the signal control circuits 80 are relatively close to the driver chip IC, which is convenient for the signal control circuits 80 to be electrically connected to the first control terminal CG1 of the driver chip IC, the second control terminal CG2 of the driver chip IC, and the source terminals SO of the driver chip IC.

Exemplarily, referring to FIG. 27, the driver chip IC is disposed in the step region 104, that is, the driver chip IC is bound to the step region 104 of the display panel. In other embodiments, the driver chip IC may be disposed on the flexible printed circuit board FPC. The flexible printed circuit board FPC is bound to the step region 104. The driver chip IC is electrically connected to other circuit parts in the display panel through the flexible printed circuit board FPC.

Figure 37:
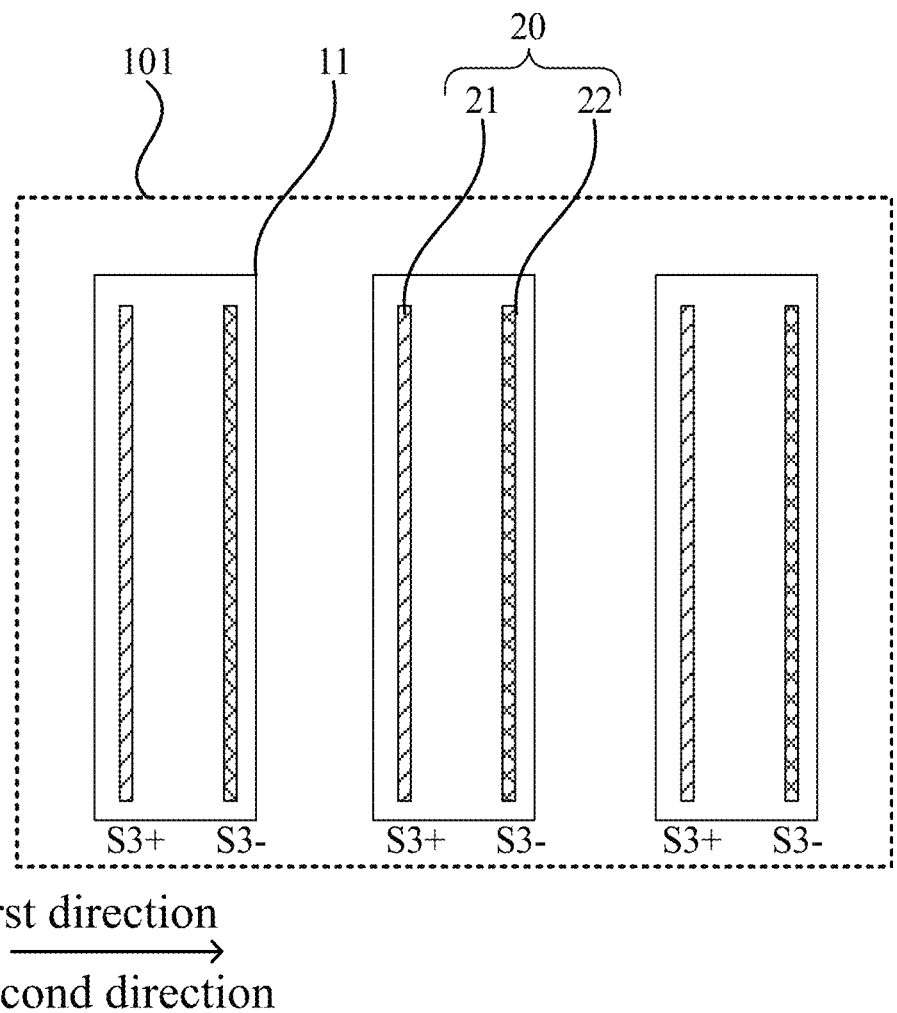
FIG. 37 is another diagram illustrating that electrical signals are applied to first electrodes and second electrodes according to an embodiment of the present disclosure.

FIG. 37 is another diagram illustrating that electrical signals are applied to first electrodes and second electrodes according to an embodiment of the present disclosure. Referring to FIG. 37, the first display region 101 includes at least one first sub-pixel row (FIG. 37 illustrates the example of one first sub-pixel row). The at least one first sub-pixel row includes the plurality of first sub-pixels 11 disposed in a second direction. The included angle between the first direction and the second direction is greater than or equal to 0° and less than 90°. In the stage of capturing, in the same electrode group 20, third signals with opposite electrical polarities are applied to a first electrode 21 and a second electrode 22 that are adjacent to each other in the same first sub-pixel row.

Exemplarily, referring to FIG. 37, in the first direction, the first electrodes 21 alternate with the second electrodes 22. In the stage of capturing, signals sequentially applied to a plurality of first electrodes 21 and a plurality of second electrodes 22 are a positive third signal S3+, a negative third signal S3−, a positive third signal S3+, a negative third signal S3−, . . . . A horizontal electric field is formed between a first electrode 21 to which a positive third signal S3+ is applied and a second electrode 22 to which a negative third signal S3− is applied.

Optionally, the third signals include data voltage signals. A data voltage signal is a voltage signal processed by a multiplexer in the stage of capturing.

Figure 38:
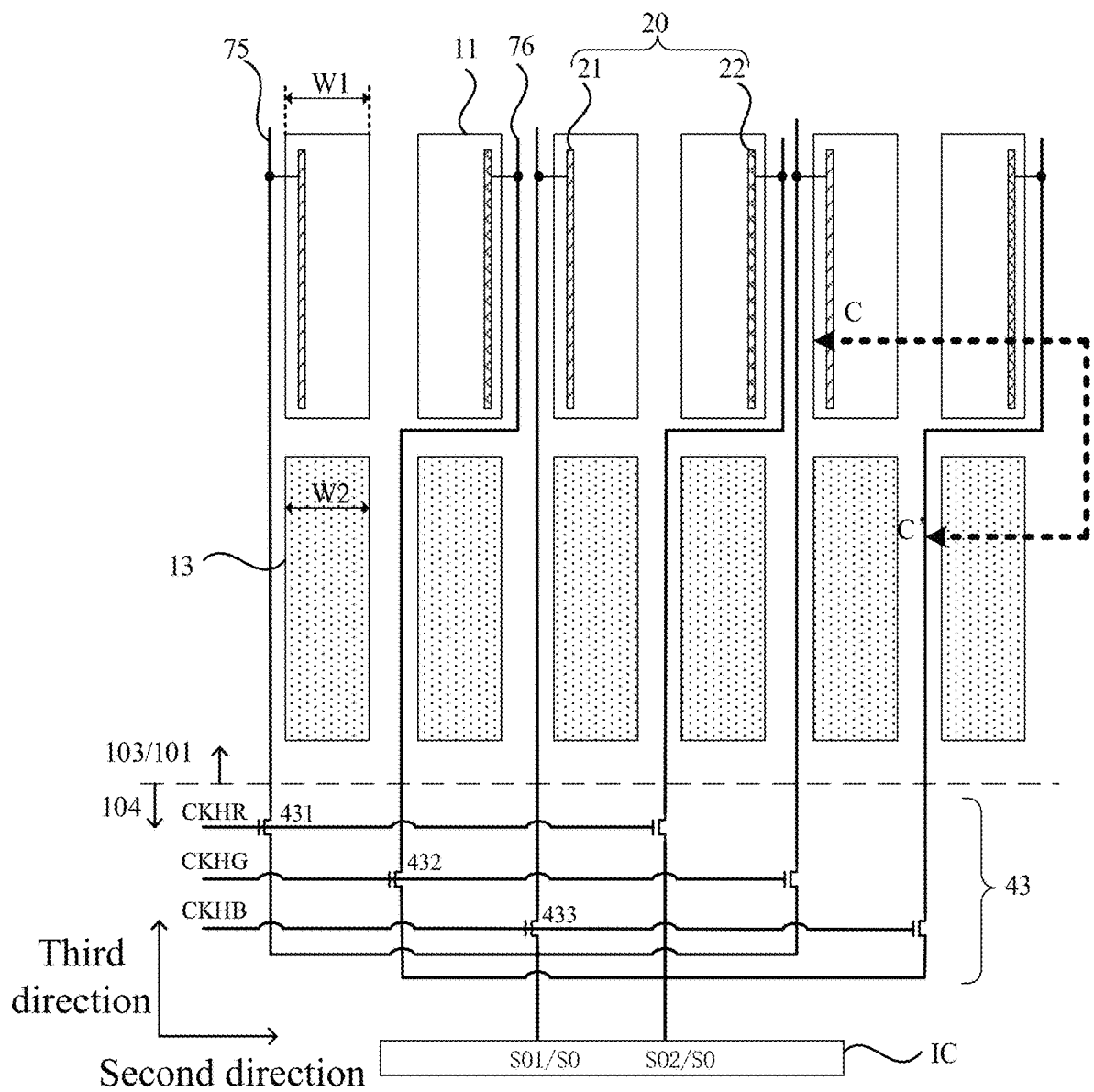
FIG. 38 is a top view illustrating the structure of another display panel according to an embodiment of the present disclosure.
Figure 39:
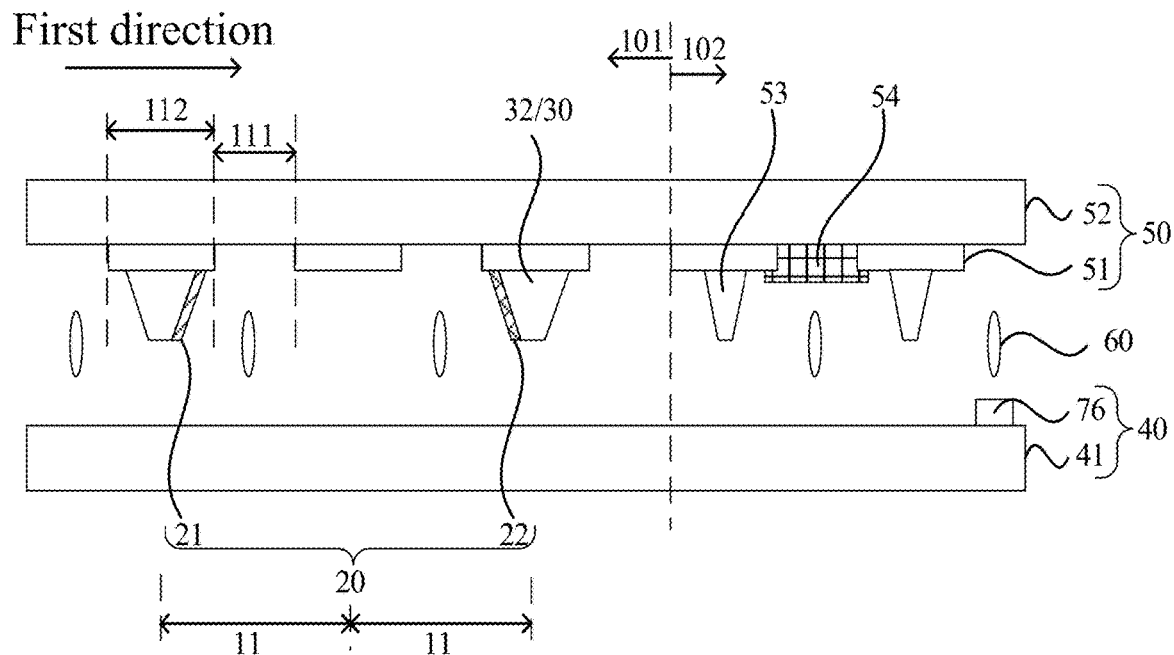
FIG. 39 is a section view taken along CC' of FIG. 38.

FIG. 38 is a top view illustrating the structure of another display panel according to an embodiment of the present disclosure. FIG. 39 is a section view taken along CC' of FIG. 38. Referring to FIGS. 38 and 39, the display panel further includes a step region 104 and a multiplexer 43. The step region 104 disposed at the periphery of the display region 103. The multiplexer 43 is disposed in the step region 104. The display panel further includes fifth connection lines 75 and sixth connection lines 76. A fifth connection line 75 is electrically connected to the first electrode 21. A sixth connection line 76 is electrically connected to the second electrode 22. In the stage of capturing, the electrical polarity of the third signal on the fifth connection line 75 is opposite to the electrical polarity of the third signal on the sixth connection line 76. The fifth connection lines 75 and the sixth connection lines 76 are all electrically connected to the multiplexer 43. In this embodiment of the present disclosure, the fifth connection lines 75 and the sixth connection lines 76 are all electrically connected to the multiplexer 43. In the stage of capturing, the third signals with opposite polarities are applied to the fifth connection line 75 and the sixth connection line 76. Accordingly, data voltage signals with opposite electrical polarities are applied to the first electrode 21 and the second electrode 22 in the same electrode group 20. In the stage of display, a common voltage may be applied to one of the first electrode 21 and the second electrode 22 in the same electrode group 20; a pixel voltage is applied to the other one of the first electrode 21 and the second electrode 22 in the same electrode group 20.

Exemplarily, referring to FIG. 38, in the stage of display, a pixel voltage is applied to the first electrode 21; a common voltage is applied to the second electrode 22. The first display region 101 further includes a plurality of third sub-pixels 13. The transmittance of the plurality of first sub-pixels 11 is greater than the transmittance of the plurality of third sub-pixels 13. The third sub-pixels 13 include red sub-pixels, green sub-pixels, and blue sub-pixels that are disposed in the second direction. The pixel voltage provided for the first electrode 21 may be adjusted based on the display data of the red sub-pixel and the green sub-pixel that are adjacent to the first electrode 21, or be adjusted based on the display data of the blue sub-pixel and the red sub-pixel that are adjacent to the first electrode 21, or be adjusted based on the display data of the green sub-pixel and the blue sub-pixel that are adjacent to the first electrode 21.

Optionally, referring to FIGS. 38 and 39, the first display region 101 further includes a plurality of third sub-pixels 13. The transmittance of the plurality of first sub-pixels 11 is greater than the transmittance of the plurality of third sub-pixels 13. The first sub-pixel 11 is a high-transmittance sub-pixel in the first display region 101 with relatively high transmittance and is used for transmitting the imaging light. The third sub-pixel 13 is a display sub-pixel in the first display region 101 and is used for image display. In the second direction, the width of the first sub-pixel 11 is W1. In the second direction, the width of the third sub-pixel 13 is W2. W1 is smaller than or equal to W2. Two first sub-pixels 11 are disposed between the first electrode 21 and the second electrode 22 in the same electrode group 20. In this embodiment of the present disclosure, one first sub-pixel 11 includes the first electrode 21; another first sub-pixel 11 includes the second electrode 22. The first electrode 21 and the second electrode 22 in the same electrode group 20 occupy two first sub-pixels 11. It is to be understood that in the case where the voltage difference between the first electrode 21 and the second electrode 22 is fixed, a longer distance between the first electrode 21 and the second electrode 22 indicates a smaller strength of the electric field formed by the first electrode 21 and the second electrode 22 and a shorter distance between the first electrode 21 and the second electrode 22 indicates a greater strength of the electric field formed by the first electrode 21 and the second electrode 22. The first electrode 21 and the second electrode 22 in the same electrode group 20 occupy two first sub-pixels 11. Since the distance between the first electrode 21 and the second electrode 22 is relatively short, the strength of the electric field formed by the first electrode 21 and the second electrode 22 is relatively great and the capability of driving the liquid-crystal molecules are relatively strong. It is to be further noted that the arrangement in which the width of the first sub-pixel 11 is greater than the width of the third sub-pixel 13 in the second direction may increase the area ratio of the first sub-pixels 11 in the first display region 101 and enhance the light transmittance of the first display region 101.

Figure 40:
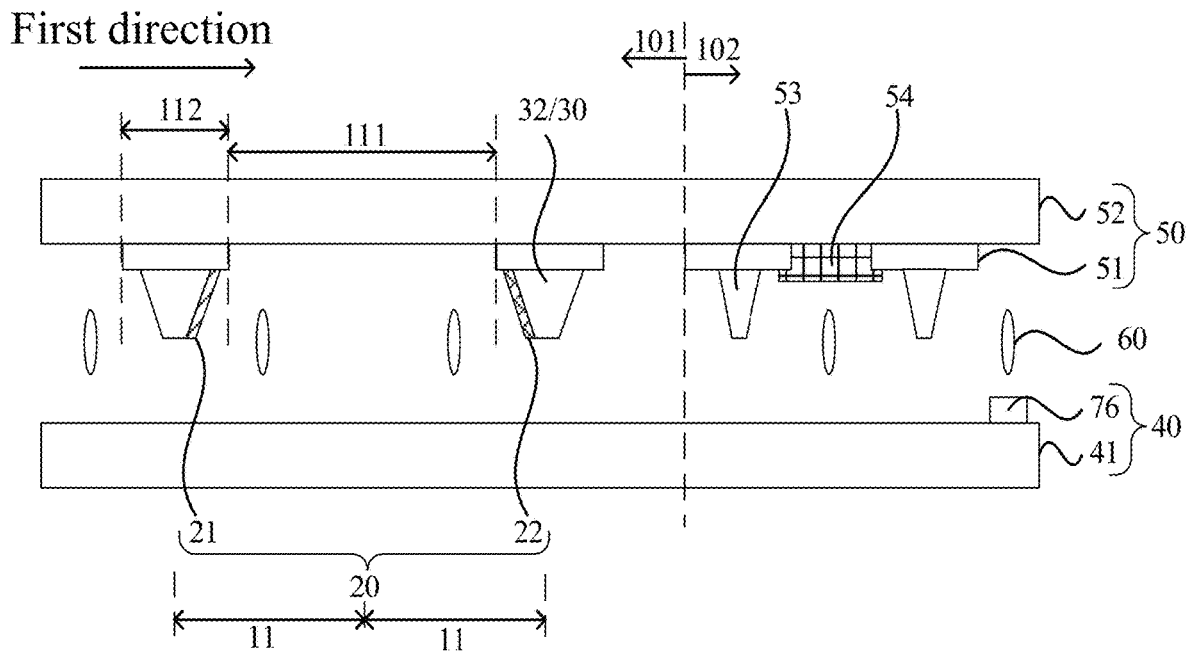
FIG. 40 is a section view illustrating the structure of another display panel according to an embodiment of the present disclosure.

FIG. 40 is a section view illustrating the structure of another display panel according to an embodiment of the present disclosure. Referring to FIG. 40, the first display region 101 and the second display region 102 each include opening regions 111 and non-opening regions 112 each of which surrounds a respective one of the opening regions 111. The display panel includes an array substrate 40, an opposing substrate 50, and a liquid-crystal layer 60. The liquid-crystal layer 60 is disposed between the array substrate 40 and the opposing substrate 50. The opposing substrate 50 includes light-blocking layers 51. The orthographic projection of a light-blocking layer 51 on the light-emitting surface of the display panel covers a non-opening region 112. In the first display region 101, an opening region 111 overlaps two first sub-pixels 11 disposed in the second direction. In this embodiment of the present disclosure, in a first sub-pixel row, no light-blocking layer 51 is disposed between two first sub-pixels 11 disposed in the second direction. Accordingly, the light-transmitting area of the first display region 101 is increased and the transmittance of the first display region 101 is enhanced.

Figure 41:
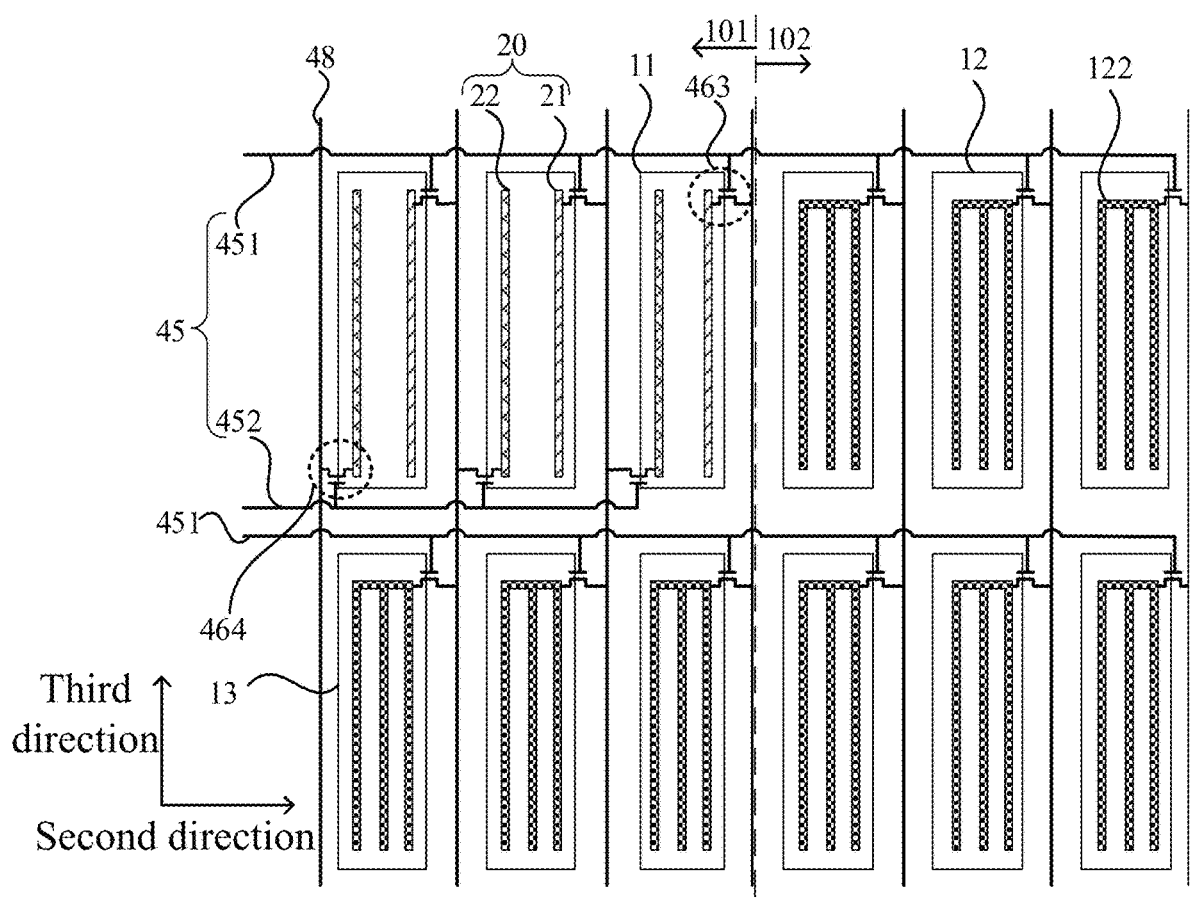
FIG. 41 is a top view illustrating the structure of another display panel according to an embodiment of the present disclosure.

FIG. 41 is a top view illustrating the structure of another display panel according to an embodiment of the present disclosure. Referring to FIG. 41, in the second direction (for example, the second direction to which the first direction is parallel, with the first electrodes 21 and the second electrodes 22 disposed in the first direction), the first electrodes 21 alternate with the second electrodes 22. The display panel further includes a plurality of data lines 48. At least part of the data lines 48 are disposed in the first display region 101. The data lines 48 are disposed in the second direction. The data lines 48 may also disposed in the third direction. A first electrode 21 is electrically connected to a data line 48. A second electrode 22 is electrically connected to a data line 48. A first electrode 21 in the electrode group 20 and a second electrode 22 in an adjacent electrode group 20 are electrically connected to the same data line 48. A second electrode 22 and a first electrode 21 in an adjacent electrode group 20 are electrically connected to the same data line 48. In the stage of capturing, in the second direction, the third signals with opposite electrical polarities are applied to adjacent data lines 48. In this embodiment of the present disclosure, the first electrode 21 and the second electrodes 22 are both electrically connected to the data lines 48. The data lines also serve as the connection lines of the first electrodes 21 and the second electrodes 22 so that electrical signals may be applied to the first electrode 21 and the second electrodes 22 through the original data lines 48 in the display panel. In the stage of capturing, third signals with opposite polarities are applied to adjacent data lines 48. Accordingly, data voltage signals with opposite electrical polarities are applied to the first electrode 21 and the second electrode 22 that are disposed in the same electrode group 20. In the stage of display, a common voltage may be applied to one of the first electrode 21 and the second electrode 22 in the same electrode group 20; a pixel voltage is applied to the other one of the first electrode 21 and the second electrode 22 in the same electrode group 20.

Exemplarily, referring to FIG. 41, in the stage of display, a pixel voltage is applied to the first electrode 21; a common voltage is applied to the second electrode 22. The first display region 101 further includes a plurality of third sub-pixels 13. The transmittance of a first sub-pixel 11 is greater than the transmittance of a third sub-pixel 13. The third sub-pixels 13 include red sub-pixels, green sub-pixels, and blue sub-pixels that are disposed in the second direction. The pixel voltage provided for the first electrode 21 may be adjusted based on the display data of the red sub-pixel and the green sub-pixel that are adjacent to the first electrode 21, or be adjusted based on the display data of the blue sub-pixel and the red sub-pixel that are adjacent to the first electrode 21, or be adjusted based on the display data of the green sub-pixel and the blue sub-pixel that are adjacent to the first electrode 21.

Optionally, referring to FIG. 41, the second display region 102 includes a plurality of second sub-pixels 12. A second sub-pixel 12 includes a pixel electrode 122. The display panel further includes a plurality of scanning lines 45, third switch transistors 463, and fourth switch transistors 464. The scanning lines 45 extend in the second direction and include first scanning lines 451 and second scanning lines 452. At least part of the first scanning lines 451 are disposed in the first display region 101. The second scanning lines 452 are disposed in the first display region 101. The gate of a third switch transistor 463 is electrically connected to a respective first scanning line 451. The first pole of the third switch transistor 463 is electrically connected to a respective data line 48. The second pole of the third switch transistor 463 is electrically connected to a respective first electrode 21 in the electrode group 20 or a respective pixel electrode 122. Specifically, the second pole of the third switch transistor 463 corresponding to the first sub-pixel 11 is electrically connected to the first electrode 21. The second pole of the third switch transistor 463 corresponding to the second sub-pixel 12 or the third sub-pixel 13 is electrically connected to the pixel electrode 122. The gate of a fourth switch transistor 464 is electrically connected to a respective second scanning line 452. The first pole of the fourth switch transistor 464 is electrically connected to a respective data line 48. The second pole of the fourth switch transistor 464 is electrically connected to a respective second electrode 22 in the adjacent electrode group 20. In this embodiment of the present disclosure, the first electrode 21 is electrically connected to the data line 48 through the third switch transistor 463. The second electrode 22 is electrically connected to the data line 48 through the fourth switch transistor 464. In the stage of capturing, the effective electrical level provided by the first scanning line 451 turns on the third switch transistor 463. The data line 48 provides a positive third signal S3+ for the first electrode 21. Alternatively, the data line 48 provides a negative third signal S3− for the first electrode 21. Based on the mode of progressive scanning, after the effective electrical level is provided by the first scanning line 451, the effective electrical level provided by the second scanning line 452 turns on the fourth switch transistor 464. The data line 48 provides a negative third signal S3− for the second electrode 22. Alternatively, the data line 48 provides a positive third signal S3+ for the second electrode 22.

It is to be noted that in the stage of capturing, the data line 48 in the second display region 102 does not need to provide a data voltage signal. In the stage of display, the effective electrical level provided by the first scanning line 451 turns on the third switch transistor 463. The data line 48 in the first display region 101 provides pixel voltage for the first electrode 21. The data line 48 in the second display region provides a pixel voltage for the pixel electrode 122. The pixel voltage provided for the first electrode 21 may be a fixed value or may be adjusted according to the pixel voltage of at least one of the second sub-pixel 12 or the third sub-pixel 13. In this case, the luminance of the first sub-pixel 11 matches the luminance of at least one of the surrounding second sub-pixel 12 or the surrounding third sub-pixel 13, which avoids color fading. Based on the mode of progressive scanning, after the effective electrical level is provided by the first scanning line 451, the effective electrical level provided by the second scanning line 452 turns on the fourth switch transistor 464. The data line 48 in the first display region 101 provides a common voltage for the second electrode 22.

Optionally, referring to FIG. 41, in the stage of capturing, when a scanning turning-on signal (that is, the effective electrical level) is applied to the first scanning line 451, turns on the third switch transistor 463, and a first capturing voltage is applied to the data line 48. When the scanning turning-on signal is applied to the second scanning line 452, turns on the fourth switch transistor 464, and a second capturing voltage is applied to the data line 48. The absolute value of the first capturing voltage is equal to the absolute value of the second capturing voltage, and the electrical polarity of the first capturing voltage is opposite to the electrical polarity of the second capturing voltage.

Exemplarily, referring to FIG. 41, in the current frame, in the stage of capturing, the effective electrical level provided by the first scanning line 451 turns on the third switch transistors 463. The voltage provided by the data line 48 for the first electrode 21 is 5.7 V. Then the effective electrical level provided by the second scanning line 452 turns on the fourth switch transistors 464. The voltage provided by the data line 48 for the second electrode 22 is −5.7 V. In the next frame, in the stage of capturing, the effective electrical level provided by the first scanning line 451 turns on the third switch transistors 463. The voltage provided by the data line 48 for the first electrode 21 is −5.7 V. Then the effective electrical level provided by the second scanning line 452 turns on the fourth switch transistors 464. The voltage provided by the data line 48 for the second electrode 22 is 5.7 V.

Exemplarily, the data lines 48 are electrically connected to the multiplexer 43 (not shown in FIG. 43) and connected to two source terminals SO in the driver chip IC (shown in FIG. 41) through six connection ends of the multiplexer 43.

Figure 42:
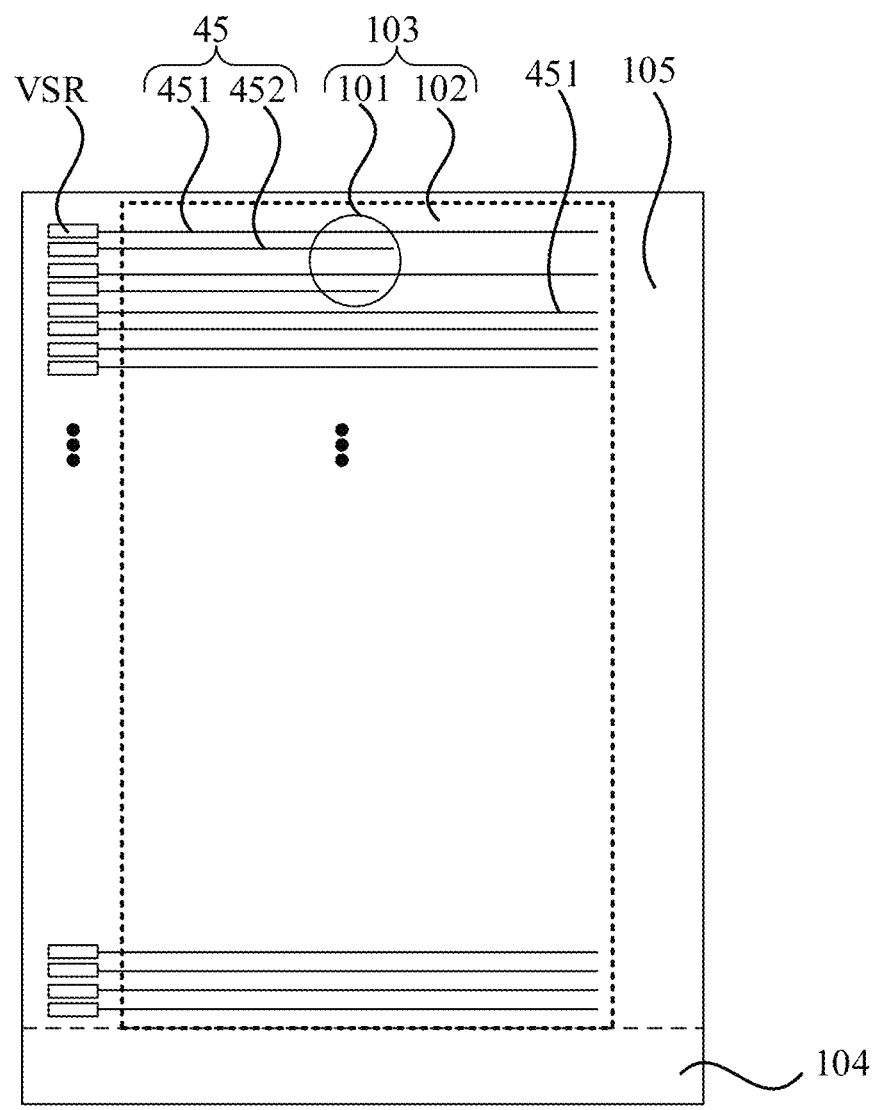
FIG. 42 is a top view illustrating the structure of another display panel according to an embodiment of the present disclosure.

FIG. 42 is a top view illustrating the structure of another display panel according to an embodiment of the present disclosure. Referring to FIG. 42, the display panel includes a plurality of shift registers VSR that are cascaded. A shift register VSR is electrically connected to a scanning line 45 for providing an effective electrical level for the scanning line 45. In a pixel driving circuit, when the transistor electrically connected to a scanning line 45 is a P-type transistor, the effective electrical level on the scanning line 45 is a low electrical level; when the transistor electrically connected to the scanning line 45 is an N-type transistor, the effective level on the scanning line 45 is a high electrical level. The pixel driving circuit is used for driving sub-pixels (including the first sub-pixels 11, the second sub-pixels 12, and the third sub-pixels 13) to emit light. The number of the shift registers VSR is equal to the sum of the number of the first scanning lines 451 and the number of the second scanning lines 452. In this embodiment of the present disclosure, a shift register VSR is electrically connected to a first scanning line 45 or a second scanning line 452 for providing an effective electrical level for the first scanning line 451 or the second scanning line 452. In addition to the shift registers VSR electrically connected to the first scanning lines 451, the shift registers VSR electrically connected to the second scanning lines 452 are added. Each shift register VSR is cascaded in sequence so that the line-by-line scanning of the scanning lines 45 is implemented.

Exemplarily, the second sub-pixels 12 and the third sub-pixels 13 are all used for light-emitting display and are color visual sub-pixels. The first sub-pixels 11 are used for transmitting the ambient light and are not color visual sub-pixels. In another aspect, the first sub-pixels 11 may also serve as white visual sub-pixels for enhancing the display luminance in the stage of display. The display panel includes 2400 rows of color visual sub-pixels. The first display region 101 corresponds to the color visual sub-pixels from row M to row (M+60). M is a positive integer. In the sub-pixel rows of the color visual sub-pixels from row (M+1) to row (M+60), 120 shift registers VSR need to be provided. Among the shift registers VSR, 60 shift registers VSR need to be electrically connected to the second scanning lines 452 in the first display region 101.

Exemplarily, referring to FIG. 42, the display panel includes a display region 103 and a non-display region 105. The non-display region 105 includes a step region 104. The shift registers VSR are disposed in the region outside the step region 104 in the non-display region 105.

Figure 43:
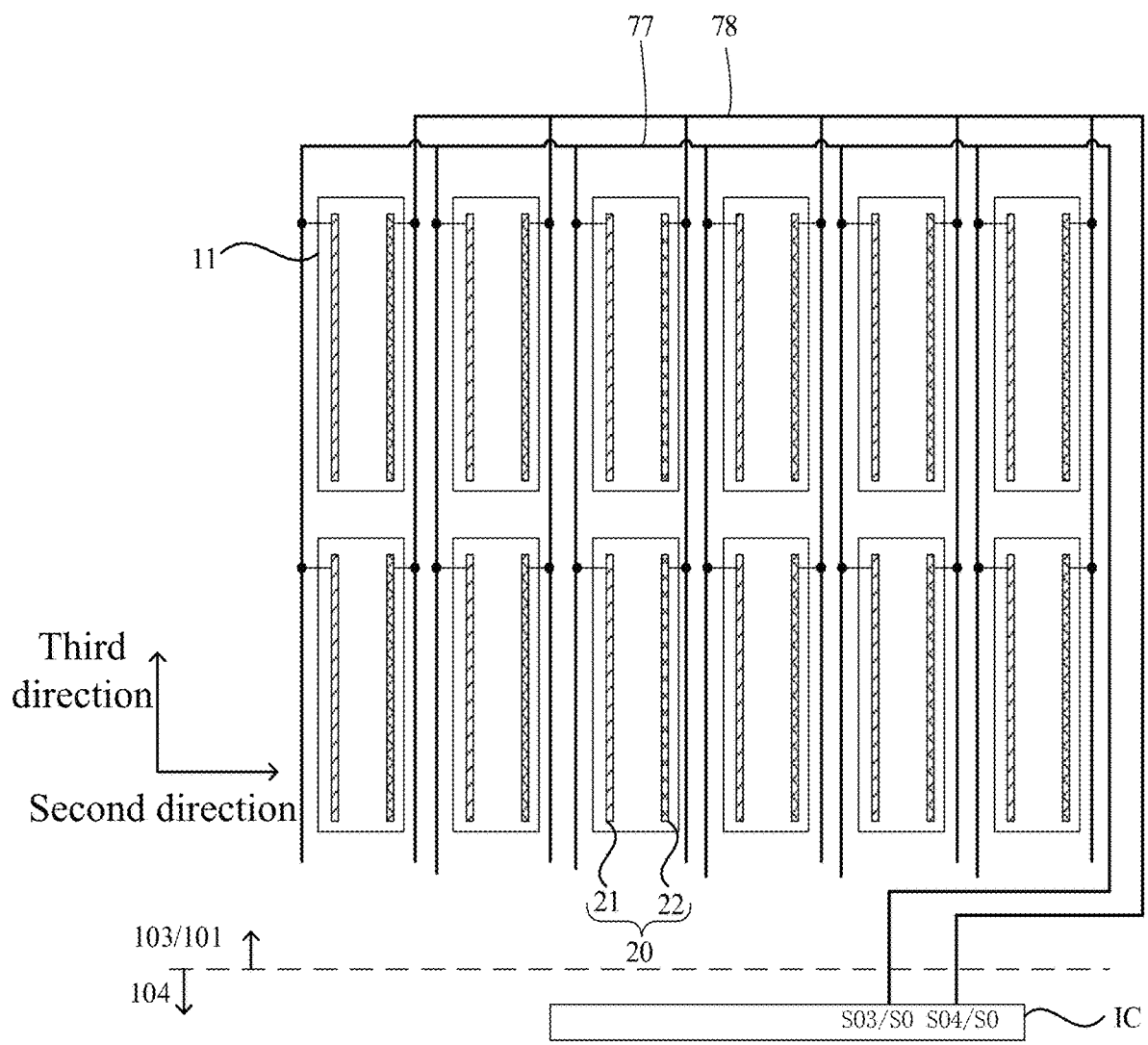
FIG. 43 is a top view illustrating the structure of another display panel according to an embodiment of the present disclosure.

FIG. 43 is a top view illustrating the structure of another display panel according to an embodiment of the present disclosure. Referring to FIG. 43, the display panel further includes seventh connection lines 77 and eighth connection lines 78. The seventh connection line 77 is electrically connected to the first electrodes 21. The eighth connection line 78 is electrically connected to second electrodes 22. In the stage of capturing, the electrical polarity of the third signal on the seventh connection line 77 is opposite to the electrical polarity of the third signal on the eighth connection line 78. The input terminal of the seventh connection line 77 and the input terminal of the eighth connection line 78 are both electrically connected to a driver chip IC. In this embodiment of the present disclosure, the input terminal of the seventh connection line 77 and the input terminal of the eighth connection line 78 are both electrically connected to the driver chip IC; in the stage of capturing, third signals with opposite polarities are applied to the seventh connection line 77 and the eighth connection line 78. Accordingly, third signals with opposite polarities are applied to the first electrode 21 and the second electrode 22 that are disposed in the same electrode group 20.

Figure 44:
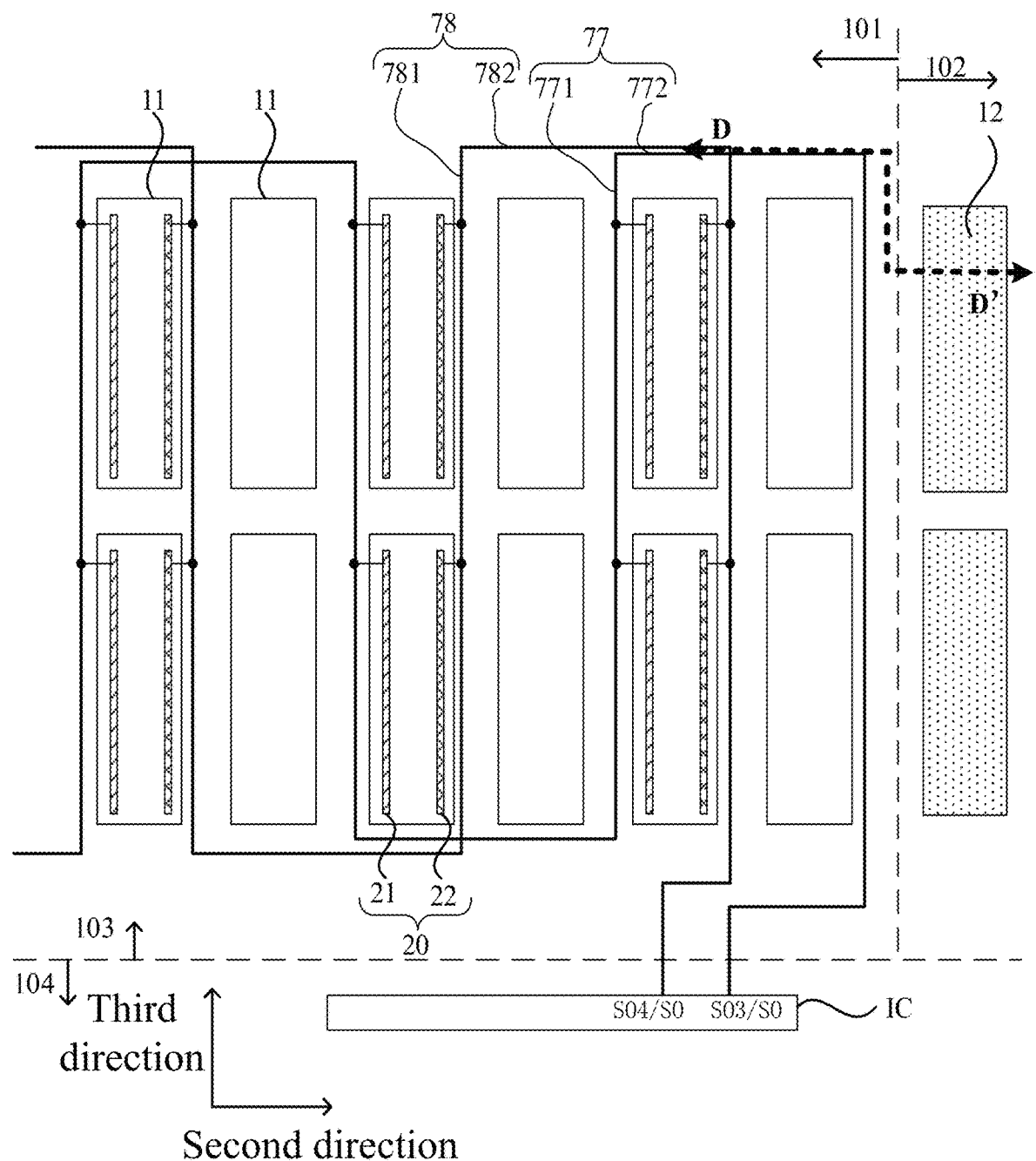
FIG. 44 is a top view illustrating the structure of another display panel according to an embodiment of the present disclosure.
Figure 45:
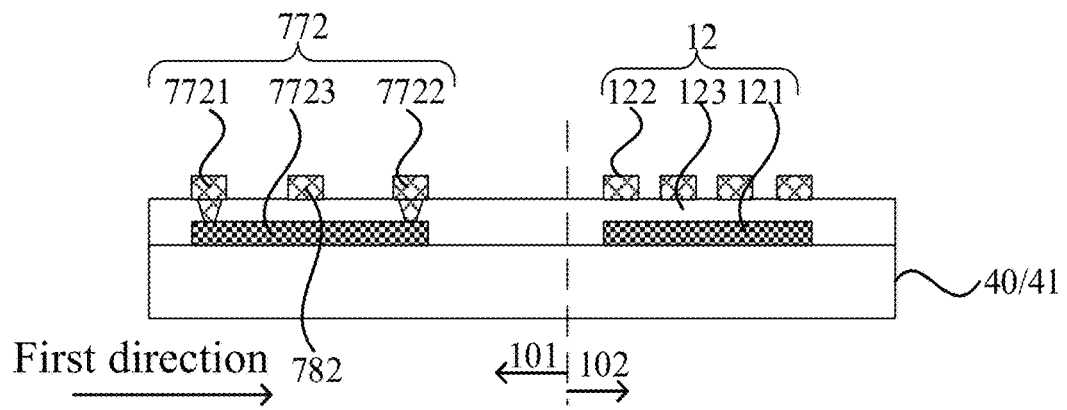
FIG. 45 is a section view taken along DD' of FIG. 44.

FIG. 44 is a top view illustrating the structure of another display panel according to an embodiment of the present disclosure. FIG. 45 is a section view taken along DD' of FIG. 44. Referring to FIGS. 44 and 45, the seventh connection line 77 includes a first sub-segment 771 and a second sub-segment 772 that are connected end to end. The first sub-segment 771 extends in the third direction. The first sub-segment 771 may be disposed between adjacent sub-pixels in the second direction or be disposed on one side of a sub-pixel column. The second sub-segment 772 extends in the first direction. The second sub-segment 772 may be disposed between adjacent sub-pixels in the third direction or be disposed on one side of a sub-pixel row (including the first sub-pixel row). The third direction intersects the first direction. The eighth connection line 78 includes a third sub-segment 781 and a fourth sub-segment 782 that are connected end to end. The third sub-segment 781 extends in the third direction. The third sub-segment 781 may be disposed between adjacent sub-pixels in the second direction or be disposed on one side of a sub-pixel column. The fourth sub-segment 782 extends in the first direction. The fourth sub-segment 782 may be disposed between adjacent sub-pixels in the third direction or be disposed on one side of a sub-pixel row (including the first sub-pixel row). In this embodiment of the present disclosure, the seventh connection line 77 and the eighth connection line 78 are each of a bow shape. Accordingly, only one seventh connection line 77 is required for connecting all the first electrodes 21, and only one eighth connection line 78 is required for connecting all the second electrodes 22, which reduces the number of connection lines. In this case, the light-transmitting area of the first display region 101 is increased and the transmittance of the first display region 101 is enhanced.

Optionally, the second sub-segment 772 overlaps the fourth sub-segment 782. However, to clearly illustrate the second sub-segment 772 and the fourth sub-segment 782, the second sub-segment 772 and the fourth sub-segment 782 that overlap each other are illustrated in the drawings by staggering a certain distance. Referring to FIGS. 44 and 45, the second display region 102 includes a plurality of second sub-pixels 12. A second sub-pixel 12 includes a common electrode 121 and a pixel electrode 122. The first sub-segment 771, the third sub-segment 781, and the fourth sub-segment 782 are disposed in the same layer as the pixel electrode 122. The second sub-segment 772 includes a first secondary sub-segment 7721, a second secondary sub-segment 7722, and a bridge 7723. The bridge 7723 is connected to the first secondary sub-segment 7721 and the second secondary sub-segment 7722. The first secondary sub-segment 7721 and the second secondary sub-segment 7721 are disposed in the same layer as the pixel electrode 122 and do not overlap the fourth sub-segment 782. The bridge 7723 is disposed in the same layer as the common electrode 121 and overlaps the fourth sub-segment 782. In this embodiment of the present disclosure, the bridge 7723 is disposed for the second sub-segment 772 at the position where the second sub-segment 772 overlaps the fourth sub-segment 782. The bridge 7723 is disposed in a different layer from the fourth sub-segment 782 and overlaps the fourth sub-segment 782. Accordingly, the second sub-segment 772 is prevented from being electrically connected to the fourth sub-segment 782; thus the seventh connection line 77 is prevented from being electrically connected to the eighth connection line 78.

Figure 46:
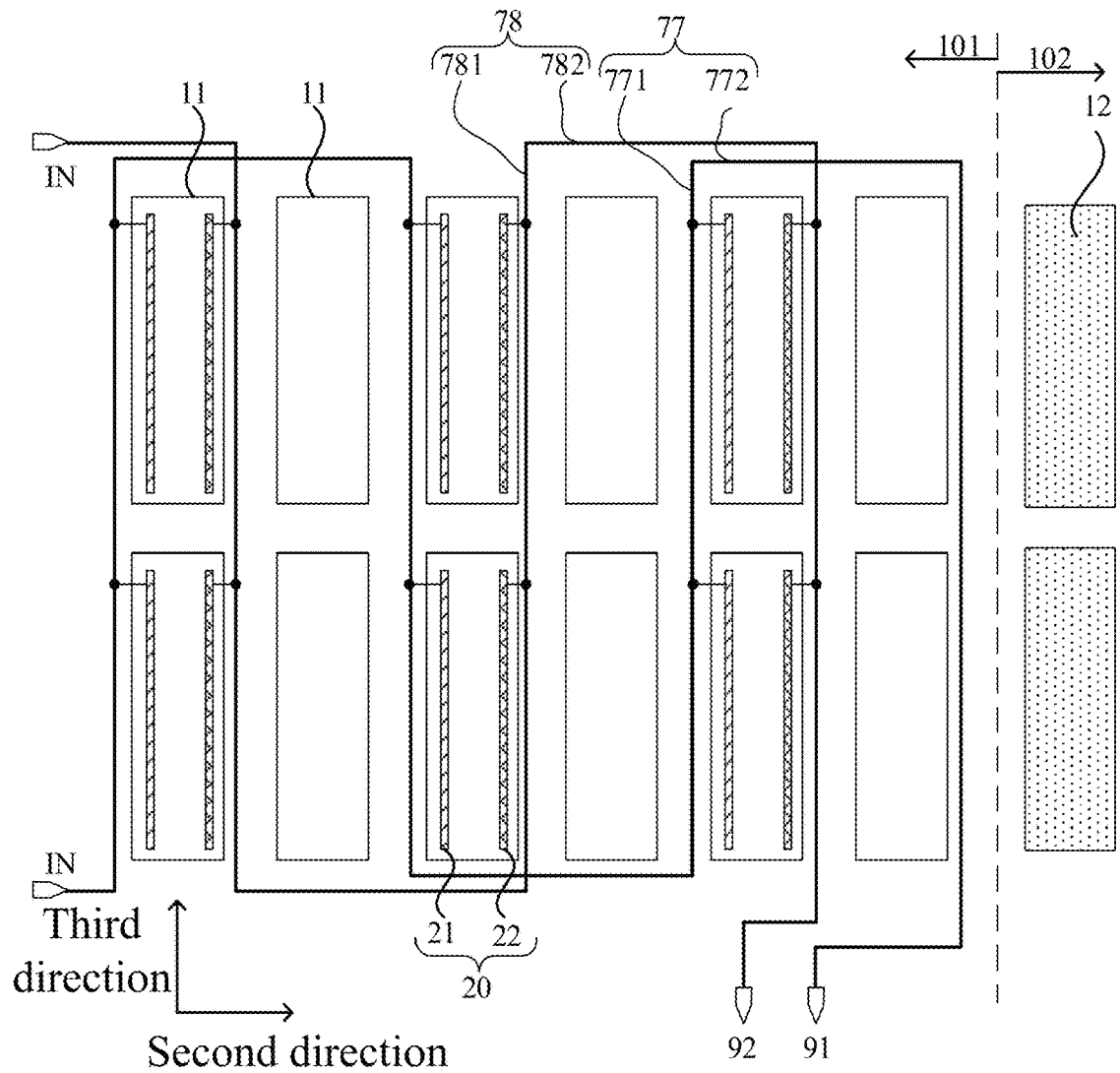
FIG. 46 is a top view illustrating the structure of another display panel according to an embodiment of the present disclosure.

FIG. 46 is a top view illustrating the structure of another display panel according to an embodiment of the present disclosure. Referring to FIG. 46, the output terminal of the seventh connection line 77 is electrically connected to a first detection voltage terminal 91. The output terminal of the eighth connection line 78 is electrically connected to a second detection voltage terminal 92. In the stage of detection, a detection voltage signal is applied to the input terminal IN of the seventh connection line 77; a detection voltage signal is applied to the input terminal IN of the eighth connection line 78. The first detection voltage terminal 91 detects the detection voltage signal on the seventh connection line 77 to determine whether the seventh connection line 77 is open-circuited. The second detection voltage terminal 92 detects the detection voltage signal on the eighth connection line 78 to determine whether the eighth connection line 78 is open-circuited. In this embodiment of the present disclosure, the output terminal of the seventh connection line 77 is electrically connected to the first detection voltage terminal 91; the output terminal of the eighth connection line 78 is electrically connected to the second detection voltage terminal 92. Accordingly, before the driver chip IC is bound, the first detection voltage terminal 91 may be used for determining whether the seventh connection line 77 is open-circuited. For example, when the voltage value detected by the first detection voltage terminal 91 is smaller than a first preset value or the voltage cannot be detected, the seventh connection line 77 is judged to be open-circuited. When the voltage value detected by the first detection voltage terminal 91 is greater than the first preset value or the voltage value can be detected, the seventh connection line 77 is judged to be not open-circuited. Similarly, the second detection voltage terminal 92 may be used for determining whether the eighth connection line 78 is open-circuited. For example, when the voltage value detected by the second detection voltage terminal 92 is smaller than the first preset value or the voltage cannot be detected, the eighth connection line 78 is judged to be open-circuited. When the voltage value detected by the second detection voltage terminal 92 is greater than the first preset value or the voltage value can be detected, the eighth connection line 78 is judged to be not open-circuited. Accordingly, the open circuit of the seventh connection line 77 and the open circuit of the eighth connection line 78 may be detected by the first detection voltage terminal 91 and the second detection voltage terminal 92 so as to avoid the occurrence of binding the driver chip IC to a defective display panel and save the cost.

Exemplarily, referring to any one of FIGS. 44 to 46, a first sub-pixel 11 is disposed between two adjacent electrode groups 20 in the same first sub-pixel row. That is, one electrode group 20 is disposed at intervals of one first sub-pixel.

Exemplarily, referring to FIG. 6, a plurality of bosses 30 are disposed in the first display region 101 of the display panel. The first side surface 301 of a boss 30 and the second side surface 302 of the boss 30 provide inclined surfaces for the first electrode 21 and the second electrode 22. The first electrode 21 and the second electrode 22 are disposed on the first side surface 301 of the boss 30 and the second side surface 302 of the boss 30 respectively. The first electrode 21 and the second electrode 22 have a certain risk of disconnection. That is, when the first electrode 21 and the second electrode 22 are formed on the side surfaces of the boss 30, a risk of an open circuit exists due to the limit of the process. With continued reference to FIG. 46, before the driver chip IC is bound and the seventh connection line 77 and the eighth connection line 78 are judged to be not open-circuited, the first detection voltage terminal 91 is used for determining whether a first electrode 21 is open-circuited and the second detection voltage terminal 92 is used for determining whether a second electrode 22 is open-circuited. Exemplarily, when the voltage value detected by the first detection voltage terminal 91 is greater than a second preset value, at least one first electrode 21 among the first electrodes 21 connected to the seventh connection line 77 is open-circuited. The second preset value is greater than the first preset value. When the voltage value detected by the first detection voltage terminal 91 is greater than or equal to the first preset value and smaller than or equal to the second preset value, the first electrodes 21 connected to the seventh connection line 77 are judged to be not open-circuited. Exemplarily, when the voltage value detected by the second detection voltage terminal 92 is greater than the second preset value, at least one second electrode 22 among the second electrodes 22 connected to the eighth connection line 78 is open-circuited. When the voltage value detected by the second detection voltage terminal 92 is greater than or equal to the first preset value and smaller than or equal to the second preset value, the second electrodes 22 the eighth connection line 78 are judged to be not open-circuited.

Figure 47:
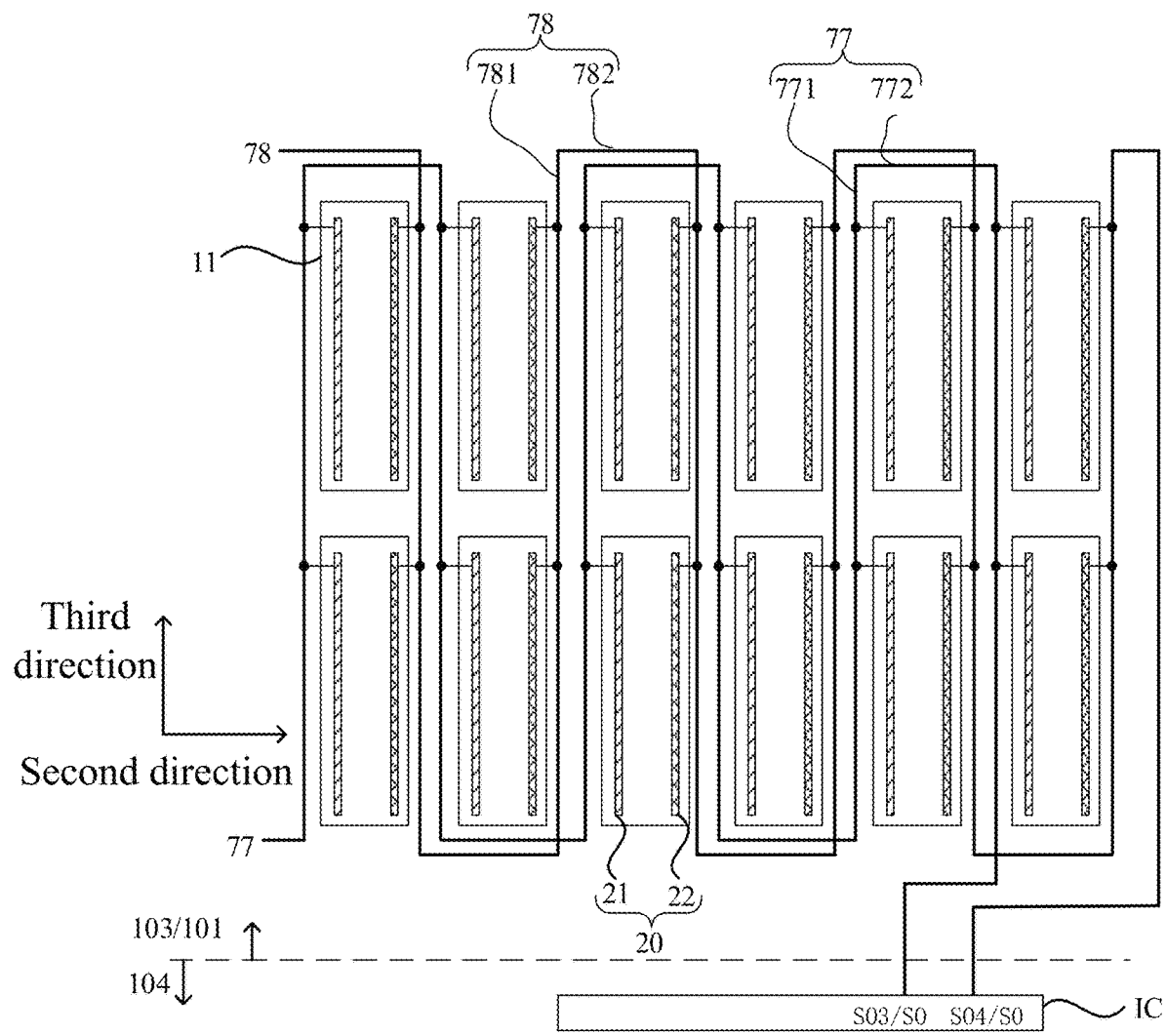
FIG. 47 is a top view illustrating the structure of another display panel according to an embodiment of the present disclosure.

FIG. 47 is a top view illustrating the structure of another display panel according to an embodiment of the present disclosure. Referring to FIG. 47, any one of the first sub-pixels 11 includes a first electrode 21 and a second electrode 22. In the second direction, the first sub-segment 771 and the third sub-segment 781 are disposed between any two adjacent first sub-pixels 11. In the third direction, the second sub-segment 772 and the fourth sub-segment 782 are disposed at the end of any column of first sub-pixels 11. The seventh connection line 77 is of a bow shape. One seventh connection line 77 is connected to all the first electrodes 21. The eighth connection line 78 is of a bow shape. One eighth connection line 78 is connected to all the second electrodes 22.

Exemplarily, referring to any one of FIGS. 44 to 47, a first electrode 21 is electrically connected to the third source terminal SO3 through the seventh connection line 77. The third source terminal SO3 applies a voltage signal to the third source terminal SO3 and thus to the first electrode 21. A second electrode 22 is electrically connected to the fourth source terminal SO4 through the eighth connection line 78. The fourth source terminal SO4 applies a voltage signal to the eighth connection line 78 and thus to the second electrode 22.

Figure 48:
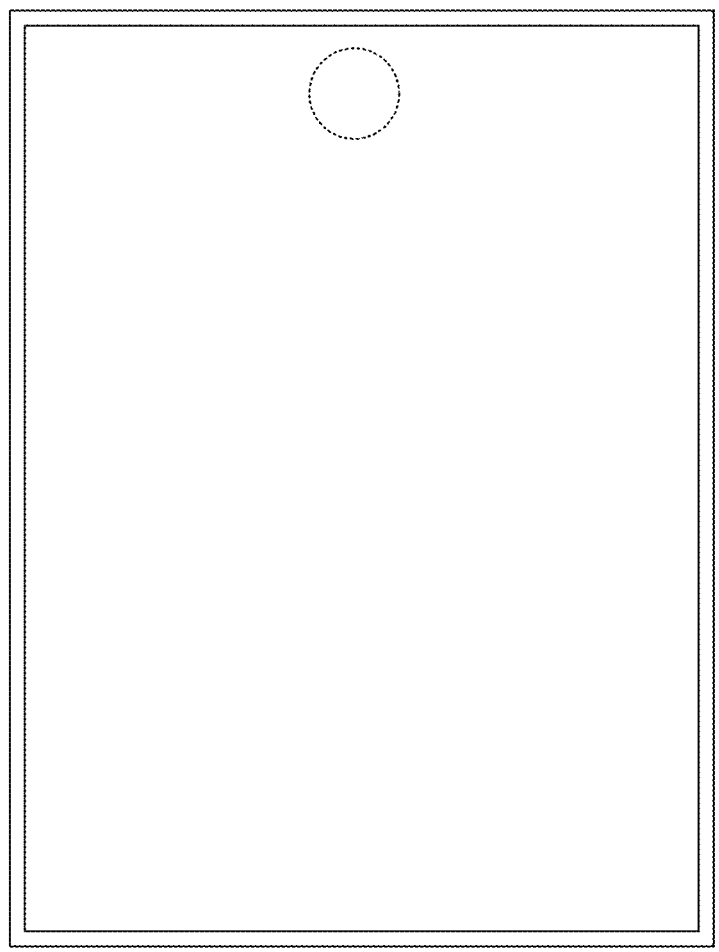
FIG. 48 is a diagram illustrating the structure of a display device according to an embodiment of the present disclosure.

It is to be noted that in another embodiment, the seventh connection line 77 and the eighth connection line 78 may be further electrically connected to the signal control circuits 80. The signal control circuits 80 are used for driving the seventh connection line 77 and the eighth connection line 78. The signal control circuits 80 are specially-provided driving circuits with strong driving capability so that the capability of driving the seventh connection line 77 and the eighth connection line 78 is enhanced An embodiment of the present disclosure further provides a display device. FIG. 48 is a diagram illustrating the structure of a display device according to an embodiment of the present disclosure. Referring to FIG. 48, the display device includes any one of the display panels provided by embodiments of the present disclosure. The display device may be, for example, a mobile phone, a tablet personal computer, a vehicle-mounted display device, and a smart wearable device.

It is to be noted that the above are merely preferred embodiments of the present disclosure and technical principles used therein. It will be understood by those skilled in the art that the present disclosure is not limited to the embodiments described herein. Those skilled in the art can make various apparent modifications, adaptations, combinations, and substitutions without departing from the scope of the present disclosure. Therefore, while the present disclosure has been described in detail through the preceding embodiments, the present disclosure is not limited to the preceding embodiments and may include more other equivalent embodiments without departing from the concept of the present disclosure. The scope of the present disclosure is determined by the scope of the appended claims.

What is claimed is:

1. A display panel, comprising a first display region and a second display region, wherein light transmittance of the first display region is greater than light transmittance of the second display region, wherein the first display region comprises a plurality of first sub-pixels; at least one of the plurality of first sub-pixels comprises an electrode group; the electrode group comprises a first electrode and a second electrode; in a first direction, an orthographic projection of the first electrode at least partially overlaps an orthographic projection of the second electrode; the first direction is parallel to a light-emitting surface of the display panel;

in a stage of capturing, a voltage difference between the first electrode and the second electrode is greater than zero volts; and a phase of a voltage difference of the first electrode to the second electrode is reversed as a frame is reversed.

2. The display panel according to claim 1, further comprising a plurality of bosses, wherein the plurality of bosses are disposed in the first display region; in the first direction, one of the plurality of bosses comprises a first side surface and a second side surface that are disposed opposite to each other; and in a same electrode group, the first electrode at least partially covers the first side surface and the second electrode at least partially covers the second side surface, or the first electrode at least partially covers the second side surface and the second electrode at least partially covers the first side surface.

3. The display panel according to claim 2, comprising an array substrate, an opposing substrate, and a liquid-crystal layer, wherein the liquid-crystal layer is disposed between the array substrate and the opposing substrate, and the plurality of bosses are disposed on at least one of the array substrate or the opposing substrate; and the first electrode is disposed on at least one of the array substrate or the opposing substrate, and the second electrode is disposed on at least one of the array substrate or the opposing substrate.

4. The display panel according to claim 1, wherein the plurality of first sub-pixels comprise high-transmittance sub-pixels, and one of the high-transmittance sub-pixels comprises the first electrode and the second electrode.

5. The display panel according to claim 1, wherein in the stage of capturing, a difference value between a voltage applied to the first electrode and a voltage applied to the second electrode is greater than or equal to 10 V.

6. The display panel according to claim 1, wherein the first display region comprises at least one first sub-pixel row, the at least one first sub-pixel row comprises the plurality of first sub-pixels in a second direction, and an included angle between the first direction and the second direction is greater than or equal to 0° and less than 90°; and in the stage of capturing, first signals with opposite electrical polarities are applied to first electrodes in two adjacent electrode groups disposed in a same first sub-pixel row of the at least one first sub-pixel row, and second signals with opposite electrical polarities are applied to second electrodes in two adjacent electrode groups disposed in a same first sub-pixel row of the at least one first sub-pixel row.

7. The display panel according to claim 6, wherein the first signals comprise data voltage signals, and the second signals comprise source voltage signals.

8. The display panel according to claim 6, further comprising:

a step region and a multiplexer, wherein the step region is disposed at a periphery of a display region comprising the first display region and the second display region, and the multiplexer is disposed in the step region; and first connection lines and second connection lines, wherein one first connection line of the first connection lines and one second connection line of the second connection lines are electrically connected to the first electrodes in two adjacent electrode groups; and in the stage of capturing, an electrical polarity of a first signal on the one first connection line is opposite to an electrical polarity of a first signal on the one second connection line, and the first connection lines and the second connection lines are all electrically connected to the multiplexer.

9. The display panel according to claim 6, further comprising third connection lines and fourth connection lines, wherein one third connection line of the third connection lines and one fourth connection line of the fourth connection lines are electrically connected to the second electrodes in two adjacent electrode groups; and in the stage of capturing, an electrical polarity of a second signal on the one third connection line is opposite to an electrical polarity of a second signal on the one fourth connection line; and the third connection lines and the fourth connection lines are all electrically connected to a driver chip.

10. The display panel according to claim 9, further comprising:

a plurality of scanning lines, wherein at least part of the plurality of scanning lines are disposed in the first display region, and the plurality of scanning lines extend in the second direction; and second switch transistors, wherein a gate of one of the second switch transistors is electrically connected to a respective one of the plurality of scanning lines, a first pole of one of second switch transistor is electrically connected to a respective second electrode, and a second pole of one of second switch transistor is electrically connected to a respective third connection line or a respective fourth connection line.

11. The display panel according to claim 9, wherein a plurality of first sub-pixel rows are disposed in a third direction, and the third direction intersects both the first direction and the second direction; and in the third direction, first sub-pixels disposed in one column in the plurality of first sub-pixels use a same second electrode.

12. The display panel according to claim 9, wherein the driver chip comprises a first control terminal, a second control terminal, and a source terminal;

the display panel further comprises a signal control circuit, and the signal control circuit comprises a first voltage input unit, a second voltage input unit, a switch unit, and a common voltage input unit;

a first end of the first voltage input unit is electrically connected to a first power supply terminal, and a second end of the first voltage input unit is electrically connected to a first end of the switch unit;

a control terminal of the second voltage input unit is electrically connected to the source terminal, a first end of the second voltage input unit is electrically connected to the first end of the switch unit, and a second end of the second voltage input unit is electrically connected to a second power supply terminal;

a control terminal of the switch unit is electrically connected to the first control terminal, and a second end of the switch unit is electrically connected to the third connection lines or the fourth connection lines; and a control terminal of the common voltage input unit is electrically connected to the second control terminal, a first end of the common voltage input unit is electrically connected to the second end of the switch unit, and a second end of the common voltage input unit is electrically connected to a common voltage terminal.

13. The display panel according to claim 12, wherein the switch unit comprises a third transistor, wherein a gate of the third transistor is electrically connected to the first control terminal, a first pole of the third transistor is electrically connected to the second end of the first voltage input unit, and a second pole of the third transistor is electrically connected to the third connection lines or the fourth connection lines.

14. The display panel according to claim 1, wherein the first display region comprises at least one first sub-pixel row, the at least one first sub-pixel row comprises the plurality of first sub-pixels disposed in a second direction, and an included angle between the first direction and the second direction is greater than or equal to 0° and less than 90°; and in the stage of capturing, in a same electrode group, third signals with opposite electrical polarities are applied to a first electrode and a second electrode that are adjacent to each other in a same first sub-pixel row of the at least one first sub-pixel row.

15. The display panel according to claim 14, further comprising:

a step region and a multiplexer, wherein the step region is disposed at a periphery of a display region comprising the first display region and the second display region, and the multiplexer is disposed in the step region; and fifth connection lines and sixth connection lines, wherein one fifth connection line of the fifth connection lines is electrically connected to the first electrode; one sixth connection line of the sixth connection lines is electrically connected to the second electrode; and in the stage of capturing, an electrical polarity of a third signal on the one fifth connection line is opposite to an electrical polarity of a third signal on the one sixth connection line, wherein the fifth connection lines and the sixth connection lines are all electrically connected to the multiplexer.

16. The display panel according to claim 14, further comprising a plurality of data lines, wherein at least part of the plurality of data lines are disposed in the first display region, the plurality of data lines are disposed in the second direction, and the first electrode in the electrode group and a second electrode in an adjacent electrode group are electrically connected to a same data line of the plurality of data lines; and in the stage of capturing, in the second direction, the third signals with opposite electrical polarities are applied to adjacent ones of the plurality of data lines.

17. The display panel according to claim 16, wherein the second display region comprises a plurality of second sub-pixels, one of the plurality of second sub-pixels comprises a common electrode and a pixel electrode, and the display panel further comprises:

a plurality of scanning lines extending in the second direction and comprising first scanning lines and second scanning lines, wherein at least part of the first scanning lines are disposed in the first display region, and the second scanning lines are disposed in the first display region;

third switch transistors, wherein a gate of one of the third switch transistors is electrically connected to a respective one of the first scanning lines, a first pole of one of third switch transistor is electrically connected to a respective one of the plurality of data lines, and a second pole of one of third switch transistor is electrically connected to a respective first electrode in the electrode group or a respective pixel electrode; and fourth switch transistors, wherein a gate of one of the fourth switch transistors is electrically connected to a respective one of the second scanning lines, a first pole of one of the fourth switch transistor is electrically connected to a respective data line, and a second pole of one of fourth switch transistor is electrically connected to a respective second electrode in the adjacent electrode group.

18. The display panel according to claim 14, further comprising seventh connection lines and eighth connection lines, wherein one seventh connection line of the seventh connection lines is electrically connected to the first electrode, one eighth connection line of the eighth connection lines is electrically connected to the second electrode; and in the stage of capturing, an electrical polarity of a third signal on the one seventh connection line is opposite to an electrical polarity of a third signal on the one eighth connection line; and an input terminal of the seventh connection line and an input terminal of the eighth connection line are both electrically connected to a driver chip.

19. The display panel according to claim 18, wherein an output terminal of the one seventh connection line is electrically connected to a first detection voltage terminal, and an output terminal of the one eighth connection line is electrically connected to a second detection voltage terminal; and in a stage of detection, a detection voltage signal is applied to both the input terminal of the one seventh connection line and the input terminal of the one eighth connection line; the first detection voltage terminal detects the detection voltage signal on the one seventh connection line to determine whether the one seventh connection line is open-circuited; and the second detection voltage terminal detects the detection voltage signal on the one eighth connection line to determine whether the one eighth connection line is open-circuited.

20. A display device, comprising a display panel, wherein the display panel comprises a first display region and a second display region, wherein light transmittance of the first display region is greater than light transmittance of the second display region, wherein the first display region comprises a plurality of first sub-pixels; at least one of the plurality of first sub-pixels comprises an electrode group; the electrode group comprises a first electrode and a second electrode; in a first direction, an orthographic projection of the first electrode at least partially overlaps an orthographic projection of the second electrode; the first direction is parallel to a light-emitting surface of the display panel;

in a stage of capturing, a voltage difference between the first electrode and the second electrode is greater than zero volts; and a phase of a voltage difference of the first electrode to the second electrode is reversed as a frame is reversed.

* * * * *